US012710026B2

(12) United States Patent
Karni et al.

(10) Patent No.: US 12,710,026 B2
(45) Date of Patent: Aug. 18, 2026

(54) SYSTEMS, METHODS, AND VEHICLES FOR TRANSPORTING LARGE CARGO ONTO AND OFF A TRANSPORT VEHICLE

(71) Applicant: ZSM HOLDINGS LLC, Dover, DE (US)

(72) Inventors: Etan D. Karni, Boulder, CO (US); Neal P. Toomey, Seattle, WA (US)

(73) Assignee: ZSM Holding LLC, Dover, DE (US)

( * ) Notice: Subject to any disclaimer, the term of this patent is extended or adjusted under 35 U.S.C. 154(b) by 0 days.

(21) Appl. No.: 18/886,661

(22) Filed: Sep. 16, 2024

(65) Prior Publication Data

US 2025/0003393 A1 Jan. 2, 2025

Related U.S. Application Data

(63) Continuation of application No. 17/640,873, filed as application No. PCT/US2020/049782 on Sep. 8, 2020, now Pat. No. 12,092,076.

(Continued)

(51) Int. Cl.
*B64D 9/00* (2006.01)
*B60P 3/40* (2006.01)

(Continued)

(52) U.S. Cl.
CPC ................ *F03D 13/40* (2016.05); *B60P 3/40* (2013.01); *B60P 7/08* (2013.01); *B64D 9/00* (2013.01);

(Continued)

(58) Field of Classification Search
CPC ... F03D 13/40; B60P 3/40; B60P 7/08; B64D 9/00; B64D 2009/006; B64F 1/32; F05B 2260/02
See application file for complete search history.

(56) References Cited

U.S. PATENT DOCUMENTS 3,920,205 A * 11/1975 Bell .......................... B64C 1/22 414/545
8,408,861 B2 4/2013 Rawdon et al.

(Continued)

FOREIGN PATENT DOCUMENTS

| | | | |
|---|---|---|---|
| DE | 102006027453 | A1 | 2/2007 |
| EP | 0196923 | A1 | 10/1986 |
| WO | 2013097858 | A1 | 7/2013 |

OTHER PUBLICATIONS

Extended European Search Report for Application No. 20860120.3 dated Jul. 25, 2023 (9 pages).

(Continued)

*Primary Examiner* — Tye William Abell
(74) *Attorney, Agent, or Firm* — Barnes & Thornburg LLP

(57) ABSTRACT

Systems, methods, and vehicles for loading and unloading cargo from a long-distance transport vehicle, such as an aircraft, are described. The systems and methods include operating a plurality of vehicles to unload large cargo from the aircraft and transporting the large cargo to an installation site. In some instances, the vehicles hold the payload the entire time, including while loading aircraft, during flight, unloading the aircraft, and moving the payload to the installation site. Alternatively, the vehicles can drive on the plane to load the payload to a designated area, and equivalent vehicles can drive on the plane after the payload has been flown to unload the payload and moving the payload to the installation site. Various vehicles and systems, and components thereof, along with methods of operating the same, are also provided.

20 Claims, 23 Drawing Sheets

Related U.S. Application Data

(60) Provisional application No. 62/896,529, filed on Sep. 5, 2019, provisional application No. 62/896,527, filed on Sep. 5, 2019.

(51) Int. Cl.

| | |
|---|---|
| ***B60P 7/08*** | (2006.01) |
| ***B64F 1/32*** | (2006.01) |
| ***F03D 13/40*** | (2016.01) |

(52) U.S. Cl.

CPC .......... *B64F 1/32* (2013.01); *B64D 2009/006* (2013.01); *F05B 2260/02* (2013.01)

(56) References Cited

U.S. PATENT DOCUMENTS

| | | | | |
|---|---|---|---|---|
| 9,120,417 | B2 | 9/2015 | Randall | |
| 9,340,286 | B2 | 5/2016 | Panzram et al. | |
| 10,059,450 | B2 * | 8/2018 | Levron | B64D 9/00 |
| 12,092,076 | B2 | 9/2024 | Karni et al. | |
| 2006/0108477 | A1 | 5/2006 | Helou, Jr. | |
| 2007/0025832 | A1 | 2/2007 | Rawdon et al. | |
| 2008/0056869 | A1 * | 3/2008 | Cullum | B60P 1/6454 414/480 |
| 2013/0039767 | A1 | 2/2013 | Schrickel et al. | |
| 2015/0108276 | A1 * | 4/2015 | Panzram | B64D 9/00 244/137.1 |
| 2016/0017861 | A1 | 1/2016 | Sigurdsson | |
| 2017/0030102 | A1 * | 2/2017 | Pedersen | F03D 13/20 |
| 2022/0333579 | A1 | 10/2022 | Karni et al. | |

OTHER PUBLICATIONS

PCT International Search Report and Written Opinion completed by the ISA/US on Oct. 22, 2020 and issued in connection with PCT/US2020/049782.

U.S. Appl. No. 17/640,873, filed Mar. 7, 2022, Systems, Methods, and Vehicles for Transporting Large Cargo Onto and Off a Transport Vehicle, Radia, Inc.

European Examination Report for Application No. 20860120.3, dated Jan. 20, 2025 (6 pages).

No Author Listed. TII Scheuerle, Blade Lifter. Website. Accessed Dec. 22, 2025. URL: <https://www.tii-group.com/tii-scheuerle/our-solutions/spmt/scheuerle-bladelifter>, 6 pages.

No Author Listed. “Blade Lifter | A pioneer system for wind turbine blades transport”. Website. Accessed Dec. 22, 2025. URL: <https://www.youtube.com/watch?v=BGV3KMOZ-Cg>, 2 pages.

* cited by examiner 712
718
718b
718a
U
V
S
R
$A_R$
722ac
715
722b
713
713w
722
722A 812
318
318b
318c
318a
822A
822p
822f
822b
822w
822

10
11A
11Ah
121
118
117
119
118e
118s
$A_R$
11B
114
118p
118m
115
S
112
113
$A_R$
R
118Bt
113
115
118s

SYSTEMS, METHODS, AND VEHICLES FOR TRANSPORTING LARGE CARGO ONTO AND OFF A TRANSPORT VEHICLE

CROSS REFERENCE TO RELATED APPLICATIONS

This application is a continuation of U.S. patent application Ser. No. 17/640,873, filed Mar. 7, 2022, which is a U.S. national stage application from PCT International Application Number PCT/US2020/049782, filed Sep. 8, 2020, which claims priority to and the benefit of each U.S. Provisional Patent Application No. 62/896,527, filed Sep. 5, 2019, and U.S. Provisional Patent Application No. 62/896,529, filed Sep. 5, 2019, the content of each which is incorporated by reference herein in its entirety.

FIELD

The present disclosure relates to systems, methods, and vehicles for loading and unloading large cargo onto or from a cargo aircraft, and more particularly provides for transport vehicles that can transport large cargo onto and off a cargo aircraft and subsequently be used to deliver the large cargo directly to a final destination site.

BACKGROUND

Renewable energy remains an increasingly important resource year-over-year. While there are many forms of renewable energy, wind energy has increased an average of about 19 percent annually since 2007. The increase in global demand in recent years for more wind energy has catalyzed drastic advances in wind turbine technology, including the development of larger, better-performing wind turbines. Better-performing wind turbines can at least sometimes mean larger turbines, as generally turbines with larger rotor diameters can capture more wind energy. As turbines continue to improve in performance and efficiency, more and more wind farm sites become viable both onshore and offshore. These sites may be existing sites, where older turbines need replacement by better-performing, more efficient turbines, and new sites.

A limiting factor to allow for the revitalization of old sites and development of new sites is transporting the wind turbines, and related equipment, to the sites. Wind turbine blades are difficult to transport long distances due to the terrestrial limitations of existing air vehicles and roadway infrastructures. Onshore transportation has traditionally required truck or rail transportation on existing infrastructure. Both are limited by height and width of tunnels and bridges. Road transport has additional complications of lane width, road curvature, and the need to pass through urban areas that may require additional permitting and logistics, among other complications. Offshore transportation by ship is equally, if not more so, limiting. For example, delivery of parts can be limited to how accessible the offshore location is by ship due to various barriers (e.g., sand bars, coral reefs) and the like in the water and surrounding areas, as well as the availability of ships capable of handling such large structures.

Whether onshore or offshore, the road vehicle or ship options for transporting such equipment has become more limited, particularly as the size of wind turbines increase. Delivery is thus limited by the availability of vehicles and ships capable of handling such large structures. The very long lengths of wind turbine blades (some are presently 90 meters long, 100 meters long, or even longer) make conventional transportation by train, truck, or ship very difficult and complicated. Unfortunately, the solution is not as simple as making transportation vehicles longer and/or larger. There are a variety of complications that present themselves as vehicles are made longer and/or larger, including but not limited to complications of: load balancing of the vehicle; load balancing the equipment being transported; load balancing the two with respect to each other; handling, maneuverability, and control of the vehicle; and other complications that would be apparent to those skilled in the art.

Further, whether onshore or offshore, delivery of parts can be slow and severely limited by the accessibility of the site. Whether the site being developed is old or new, the sites can often be remote, and thus not near suitable transportation infrastructure. The sites may be far away from suitable roads and rails (or other means by which cargo may be transported) to allow for easy delivery of cargo for use in building the turbines at the site and/or other equipment used in developing the site. New sites are often in areas without any existing transportation infrastructure at all, thus requiring new construction and special equipment. Ultimately, transportation logistics become cost prohibitive, resulting in a literal and figurative roadblock to further advancing the use of wind energy on a global scale.

Another challenge presented by transporting large cargo across a long distance, such as wind turbine blades, or other sizes and types of cargos as well, is the amount of time, energy, effort, and number of vehicles and other transport components utilized to: (1) deliver the item(s) being transported to the location of the large transport vehicle; (2) load the item(s) in the large transport vehicle; (3) operate the large transport vehicle to travel the long distance; (4) unload the item(s) from the large transport vehicle after the long distance is traveled; and (5) deliver the large item(s) to one or more locations for terminal use of the item(s). For example, wind turbine blades are traditionally loaded onto a large transport vehicle for long distance travel—namely ships, trucks, or rail cars of trains—using various mechanical systems for moving large, heavy items. These systems can include, for example, cranes, winches, pulleys, cables, cranes, and/or power drive units. Sometimes an earlier vehicle transfer occurs too, that is, from a first vehicle, such as a flatbed truck, onto the large transport vehicle for long distance travel, the truck or rail car of a train, by way of the aforementioned mechanical systems (e.g., using a crane to move the cargo from a first vehicle onto the truck or rail car of a train for long-distance transport).

After the wind turbine blades are transported the long distance, they are unloaded from the large transport vehicle, again using mechanical systems for moving large, heavy items. These mechanical systems are often different than the systems used to load the large transport vehicle as such systems are typically kept at the site where the loading and unloading occurs. Once unloaded from the large transport vehicle, the wind turbine blades are moved to another transport vehicle, such as a flatbed truck. The loading of the flatbed truck may be performed by the mechanical system(s) is to unload the large transport vehicle, or one or more additional systems may be used to load this further transport vehicle. The transport vehicle can then be operated to move the wind turbine blades to the site where installation is to occur. In at least some instances, even after the wind turbine blades are delivered to the installation site, such as a wind farm, they can be removed from the transport vehicle to a staging area for storage until the wind turbine assembly is ready to be built. The wind turbine blades can then subsequently be loaded onto a flatbed truck (the same or a different one than was used to deliver it more generally to the installation site) and taken to an assembly location.

Part and parcel with the time, energy, effort, and number of vehicles used to perform these operations is the amount of time, energy, effort, and specialized tooling it takes to secure the cargo each time it is moved and transported. The result is that using currently existing systems, methods, and vehicles for transporting large cargo long distances is a time-intensive, energy-intensive, labor-intensive, and component-consuming process that is overly-complicated, cumbersome, and inefficient.

Accordingly, there is a need for systems, methods, and vehicles that reduce the number of transfers and related actions, along with other complications, that commonly occur when transporting large cargo a long distance.

SUMMARY

The present application is directed to methods of loading and unloading aircraft, and other large transport vehicles if desired (e.g., trucks, boats, etc.), by using vehicles and vehicle systems to reduce the number of times cargo is uncoupled from one vehicle and coupled to another. As described herein, a payload transportation system includes a plurality of transporters or vehicles, connected by support spans, that can support large payloads and transport the same. In some such embodiments, once the payload is loaded onto the payload transportation system, it does not have to be uncoupled from the system until it reaches the desired destination, such as an installation site. In the present application, the system is primarily discussed with respect to transporting wind turbine blades using aircrafts, and thus the installation site can be a wind farm. Alternative embodiments do not include the vehicles during the long-distance leg of the travel, but still utilize the vehicles to both load and unload the transport vehicle, e.g., the aircraft. Various features of the systems, and methods that can be performed in view of the same are described below.

One exemplary method of delivery a payload to an installation site includes operating a plurality of vehicles to which a payload is removably coupled to transport the payload from a cargo bay of an aircraft to at least one of a ground surface outside of the aircraft or a payload transport vehicle configured to transport the payload to an installation site. The method further includes transporting the payload to an installation site where at least some portion of the payload is configured to be installed.

The plurality of vehicles can be operated to transport the payload to the ground surface. In such embodiments, transporting the payload to an installation site can include operating the plurality of vehicles to deliver the payload to the installation site. Alternatively, the plurality of vehicles can be operated to transport the payload to the payload transport vehicle. In such embodiments, transporting the payload to an installation site can include operating the payload transport vehicle to deliver the payload to the installation site.

The method can further include coupling the plurality of vehicles with the payload coupled to them to one or more fixtures of the cargo bay of the aircraft prior to operating the aircraft to fly the payload to at least one of a location proximate to the installation site or to an aircraft landing area within the installation site. In such embodiments, the method can further include decoupling the plurality of vehicles with the payload coupled to them from the one or more fixtures of the cargo bay of the aircraft prior to operating the plurality of vehicles to transport the payload from the cargo bay to at least one of the ground surface outside of the aircraft or the payload transport vehicle configured to transport the payload to the installation site.

In instances in which the plurality of vehicles include a plurality of unloading vehicles, the method can include operating a plurality of loading vehicles to which the payload is removably coupled to transport the payload to the cargo bay of the aircraft, decoupling the payload from the plurality of loading vehicles, securing the payload within the cargo bay prior to operating the aircraft to fly the payload to at least one of a location proximate to the installation site or to an aircraft landing area within the installation site, and coupling the payload to the plurality of unloading vehicles after the aircraft lands at one of the location proximate to the installation site or the aircraft landing area within the installation site. In some embodiments the method can include decoupling the payload from the plurality of vehicles and installing at least some portion of the payload at the installation site.

Operating the plurality of vehicles to which the payload is removably coupled to transport the payload from the cargo bay of the aircraft to at least one of the ground surface outside of the aircraft or the payload transport vehicle configured to transport the payload to the installation site can include operating one or more actuators on at least one vehicle of the plurality of vehicles to adjust a position of the payload relative to the respective vehicle. This can include, for example, operating the actuator(s) to adjust the position of the payload relative to the respective vehicle in conjunction with setting a position of the payload within the cargo bay for flight. Alternatively, or additionally, this can include operating the actuator(s) to adjust the position of the payload relative to the respective vehicle occurs while moving the respective vehicle through a portion of a longitudinal length of the cargo bay to unload the payload from the aircraft.

The plurality of vehicles can have a support span disposed between at least two vehicles to support the payload. The payload can have a length of at least about 57 meters, or at least about 65 meters, or at least about 75 meters, or at least about 85 meters, or at least about 100 meters, or at least about 120 meters. The payload can include one or more components of a wind turbine.

One exemplary method of loading a payload onto a cargo aircraft includes operating a plurality of vehicles to which a payload is removably coupled to transport the payload from a ground surface into a cargo bay of a cargo aircraft and securing the payload in the cargo bay.

As part of securing the payload in the cargo bay, the method can further include coupling the plurality of vehicles with the payload coupled to them to one or more fixtures of the cargo bay of the aircraft to secure the payload in the cargo bay prior to flying the aircraft. As a result, the method can also include decoupling the plurality of vehicles with the payload coupled to them from the one or more fixtures of the cargo bay of the aircraft after flying the aircraft and prior to unloading the plurality of vehicles, and the payload coupled to them, from the aircraft.

In other embodiments, as part of securing the payload in the cargo bay, the method can further include decoupling the payload from the plurality of vehicles and coupling the payload to one or more fixtures of the cargo bay of the aircraft to secure the payload in the cargo bay prior to flying the aircraft. Operating the plurality of vehicles to which the payload is removably coupled to transport the payload from the ground surface into the cargo bay of the cargo aircraft can include operating one or more actuators on at least one vehicle of the plurality of vehicles to adjust a position of the payload relative to the respective vehicle. This can include, for example, operating the actuator(s) to adjust the position of the payload relative to the respective vehicle in conjunction with setting a position of the payload within the cargo bay for flight. Alternatively, or additionally, this can include operating the actuator(s) to adjust the position of the payload relative to the respective vehicle occurs while moving the respective vehicle through a portion of a longitudinal length of the cargo bay to unload the payload from the aircraft.

The plurality of vehicles can have a support span disposed between at least two vehicles to support the payload. The payload can have a length of at least about 57 meters, or at least about 65 meters, or at least about 75 meters, or at least about 85 meters, or at least about 100 meters, or at least about 120 meters. The payload can include one or more components of a wind turbine.

One exemplary system for at least one of loading a payload onto a cargo aircraft or unloading a payload from a cargo aircraft includes a plurality of vehicles configured to move along a ground surface, one or more support spans extending between at least two vehicles of the plurality of vehicles, and a plurality of payload-receiving fixtures. The payload-receiving fixtures are coupled to at least one of: (a) a vehicle of the plurality of vehicles; or (b) a support span of the one or more support spans. The plurality of payload-receiving fixtures are configured to secure a location of a payload with respect to the one or more support spans while the plurality of vehicles are moved along a ground surface.

In some embodiments, at least one of: (a) the plurality of vehicles; (b) the one or more support spans; or (c) the plurality of payload-receiving fixtures are further configured to couple to one or more fixtures in a cargo bay of a cargo aircraft.

The one or more support spans can include one or more trusses. In some embodiments, the one or more support spans can include a first rail opposed to a second rail. The first and second rails can be disposed on opposite sides of a vehicle of the plurality of vehicles. The plurality of payload-receiving fixtures can be coupled to each of the first and second rails.

At least one vehicle of the plurality of vehicles can include one or more actuators coupled to a frame of vehicle. The actuator(s) can be configured to receive a payload-receiving fixture of the plurality of payload-receiving fixtures and adjust a position of the payload-receiving fixture relative to the frame. The actuator(s) can be configured to adjust a height of the payload-receiving fixture relative to the frame and/or rotate the payload-receiving fixture about a rotation axis extending substantially perpendicular to a longitudinal axis of the payload received by the payload-receiving fixture. In some embodiments, the actuator(s) can include one or more hydraulic pistons configured to operate to adjust the position of the payload-receiving fixture relative to the frame. Alternatively, or additionally, the actuator(s) can include a plurality of pulleys and one or more cables disposed between the pulleys. The cables can be configured to move with respect to the pulleys to adjust the position of the payload-receiving fixture relative to the frame. By way of further non-limiting example, the actuator (s) can include one or more air chambers coupled to the frame. The air chamber(s) can be configured to at least one of inflate or deflate to adjust the position of the payload-receiving fixture relative to the frame.

The plurality of vehicles can be controlled by one or more controllers in communication with a power system disposed on one or more vehicles of the plurality of vehicles. In some embodiments, at least one vehicle of the plurality of vehicles can be self-propelled.

The system can include one or more fixtures disposed in a cargo bay of the aircraft. At least one fixture of the one or more fixtures can be configured to couple to a transportation means of at least one vehicle of the plurality of vehicles such that the transportation means moves along the one or more fixtures disposed in the cargo bay of the aircraft to move the payload through a portion of a longitudinal length of the cargo bay. For example, the one or more fixtures can include one or more longitudinal rails extending longitudinally through the cargo bay of the aircraft. In some embodiments, the one or more fixtures can include one or more mating features configured to complimentarily mate with one or more mating features of a vehicle of the plurality of vehicles to secure the payload in the cargo bay. The transportation means of the at least one vehicle can include at least one of wheels, skis, skids, linked tracks, articulated legs, or air cushions.

The payload can have a length of at least about 57 meters, or at least about 65 meters, or at least about 75 meters, or at least about 85 meters, or at least about 100 meters, or at least about 120 meters. The payload can include one or more components of a wind turbine such that the plurality of payload-receiving fixtures are configured to receive the one or more components of the wind turbine.

One exemplary embodiment of a vehicle for at least one of loading a payload onto a cargo aircraft or unloading a payload from a cargo aircraft includes a frame, a plurality of wheels coupled to the frame, and one or more actuators coupled to the frame. The wheels are configured to contact and roll along a ground surface. The actuator(s) is either configured to receive a payload-receiving fixture or it (they) has the payload-receiving fixture coupled to it (them). The actuator(s) is configured to adjust a position of the payload-receiving fixture, and thus a payload received by the payload-receiving fixture, relative to the frame.

The actuator(s) can be configured to adjust a height of the payload-receiving fixture, and thus the payload received by the payload-receiving fixture, relative to the frame. Alternatively, or additionally, the actuator(s) can be configured to rotate the payload-receiving fixture, and thus the payload received by the payload-receiving fixture, about a rotation axis extending substantially perpendicular to a longitudinal axis of the payload received by the payload-receiving fixture.

In some embodiments, the actuator(s) can include one or more hydraulic pistons configured to operate to adjust the position of the payload-receiving fixture, and thus the payload received by the payload-receiving fixture, relative to the frame. In some embodiments, the actuator(s) can include a plurality of pulleys and one or more cables disposed between the pulleys. The cables can be configured to move with respect to the plurality of pulleys to adjust the position of the payload-receiving fixture, and thus the payload received by the payload-receiving fixture, relative to the frame. In some embodiments, the actuator(s) can include one or more air chambers coupled to the frame and configured to at least one of inflate or deflate to adjust the position of the payload-receiving fixture, and thus the payload received by the payload-receiving fixture, relative to the frame.

The vehicle can include the payload-receiving fixture. For example, the payload-receiving fixture can be coupled to the actuator(s). In some embodiments, the payload can include one or more components of a wind turbine. Accordingly, the payload-receiving fixture can be configured to receive the one or more components of the wind turbine. The vehicle can include one or more mating features that are configured to allow the vehicle to be mated to a fixture in a cargo bay of an aircraft for secure transport during flight. In some embodiments, the vehicle can be configured to be controlled by one or more controllers in communication with a power system disposed on the vehicle. The vehicle can be self-propelled.

BRIEF DESCRIPTION OF DRAWINGS

This disclosure will be more fully understood from the following detailed description taken in conjunction with the accompanying drawings, in which.

DETAILED DESCRIPTION

Figure 1A:
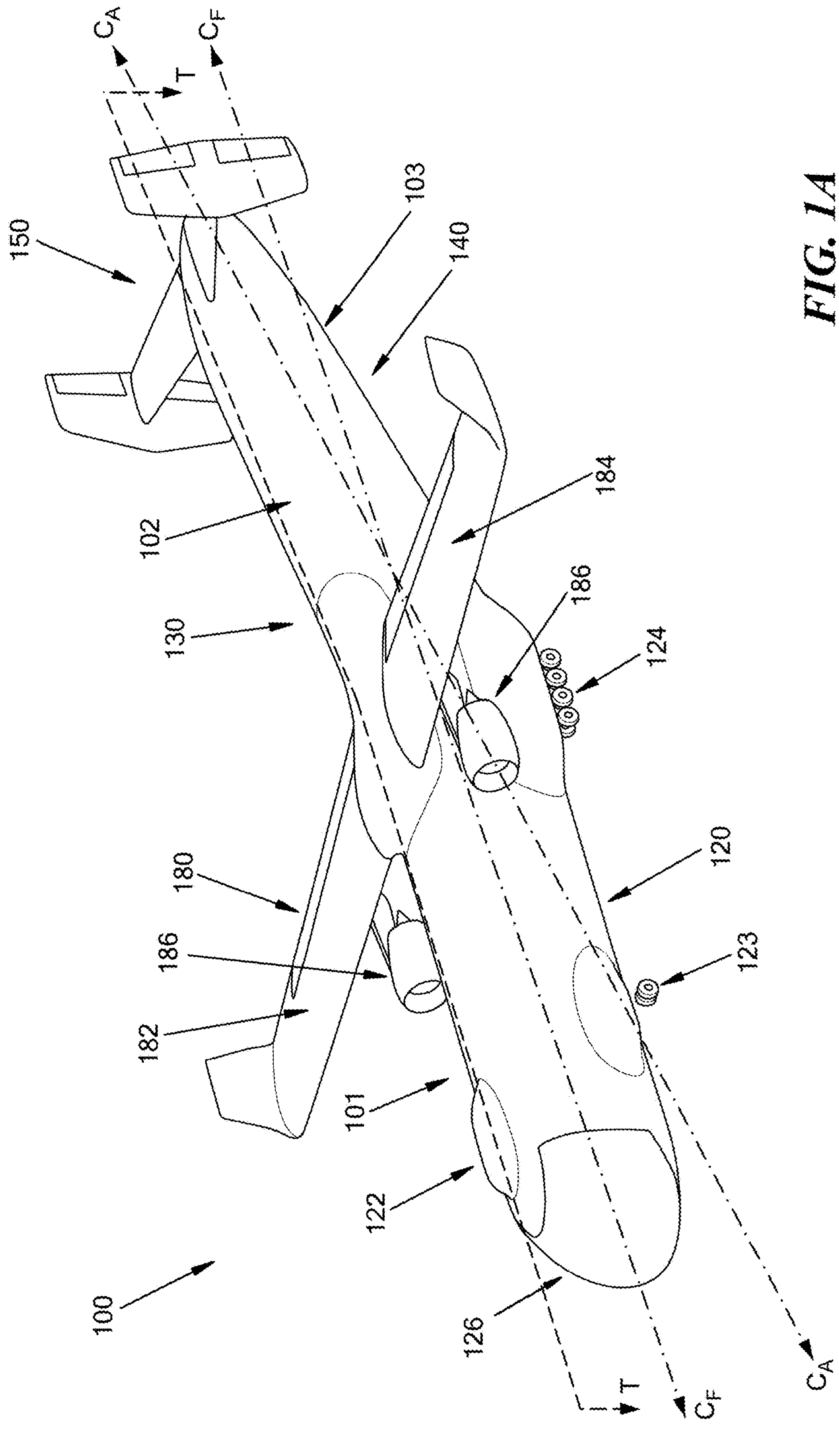
FIG. 1A is an isometric view of one exemplary embodiment of an aircraft.

Certain exemplary embodiments will now be described to provide an overall understanding of the principles of the structure, function, manufacture, and use of the devices, systems, vehicles, and methods disclosed herein. One or more examples of these embodiments are illustrated in the accompanying drawings. Those skilled in the art will understand that the devices, systems, vehicles, components related to or otherwise part of such devices, systems, and vehicles, and methods specifically described herein and illustrated in the accompanying drawings are non-limiting exemplary embodiments and that the scope of the present disclosure is defined solely by the claims. The features illustrated or described in connection with one exemplary embodiment may be combined with the features of other embodiments. Such modifications and variations are intended to be included within the scope of the present disclosure. Some of the embodiments provided for herein may be schematic drawings, including possibly some that are not labeled as such but will be understood by a person skilled in the art to be schematic in nature. They may not to be scale or may be somewhat crude renderings of the disclosed components. A person skilled in the art will understand how to implement these teachings and incorporate them into work systems, methods, vehicles, and components related to each of the same, provided for herein.

To the extent the present disclosure includes various terms for components and/or processes of the disclosed devices, systems, vehicles, methods, and the like, one skilled in the art, in view of the claims, present disclosure, and knowledge of the skilled person, will understand such terms are merely examples of such components and/or processes, and other components, designs, processes, and/or actions are possible. By way of non-limiting example, while the present application describes loading an airplane through a front end of the aircraft, alternatively, or additionally, loading can occur through an aft end of the aircraft. In the present disclosure, like-numbered and like-lettered components of various embodiments generally have similar features when those components are of a similar nature and/or serve a similar purpose. To the extent terms such as front, back, top, bottom, forward, aft, proximal, distal, etc. are used to describe a location of various components of the various disclosures, such usage is by no means limiting, and is often used for convenience when describing various possible configurations. The foregoing notwithstanding, a person skilled in the art will recognize the common vernacular used with respect to aircraft, such as the terms "forward' and "aft," and will give terms of those nature their commonly understood meaning. Further in some instances, terms like forward and proximal or aft and distal may be used in a similar fashion.

The present application utilizes a payload transportation system to maneuver large payloads onto and off long-distance travel vehicles, such as aircraft, trucks, and boats. The system includes vehicles connected by support spans that are configured to both support and transport large and heavy payloads on the ground and help load and unload such payloads onto or off the long-distance travel vehicles. In some instances the system can be travel-ready, meaning the payload does not need to be offload from the system during the long-distance travel, while in other embodiments the system is equipped to make for easy-on-easy-off transportation between the system and the storage mechanisms included in a cargo bay of the long-distance travel vehicle. The storage mechanisms can be compatible with the payload transportation system. Various transporters or vehicles that can be part of a payload transportation system are provided, as are other related components, such as payload-receiving fixtures designed to secure the large cargo with respect to the payload transportation system.

Before describing these systems, methods, and vehicles to which the present application is directed, it may be helpful to discuss one non-limiting exemplary embodiment of an aircraft with which the present disclosures can be used.

Aircraft

Figure 1B:
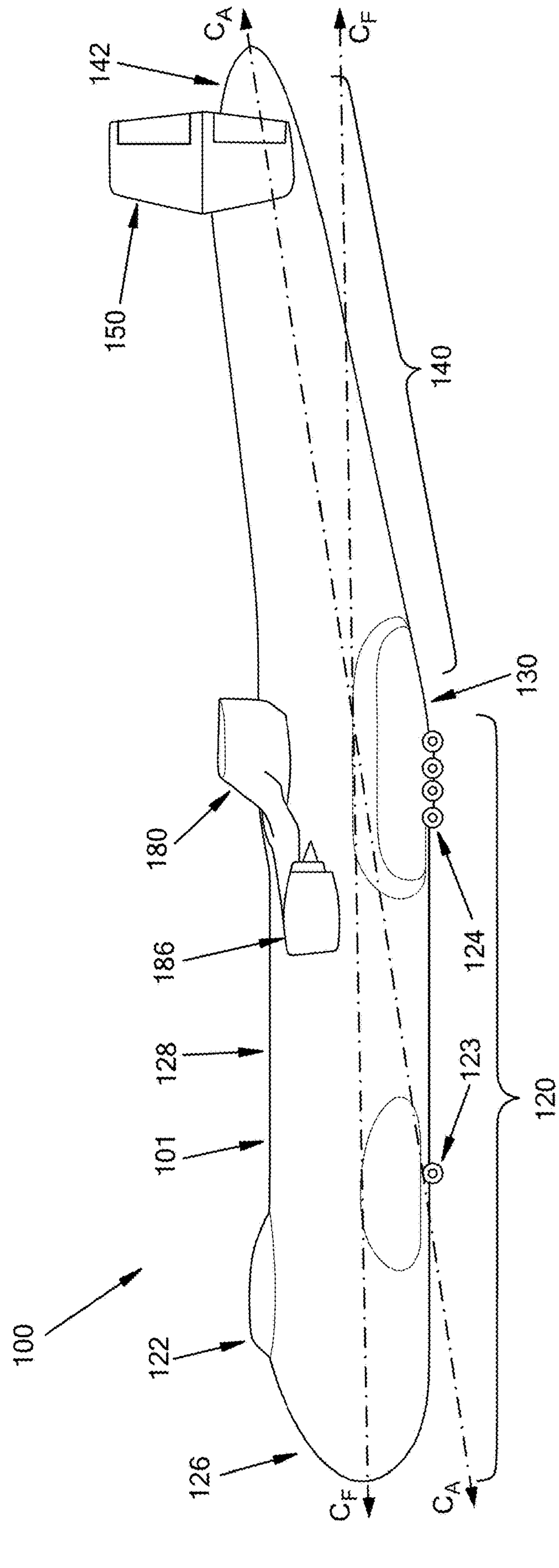
FIG. 1B is a side view of the aircraft of FIG. 1A.
Figure 1C:
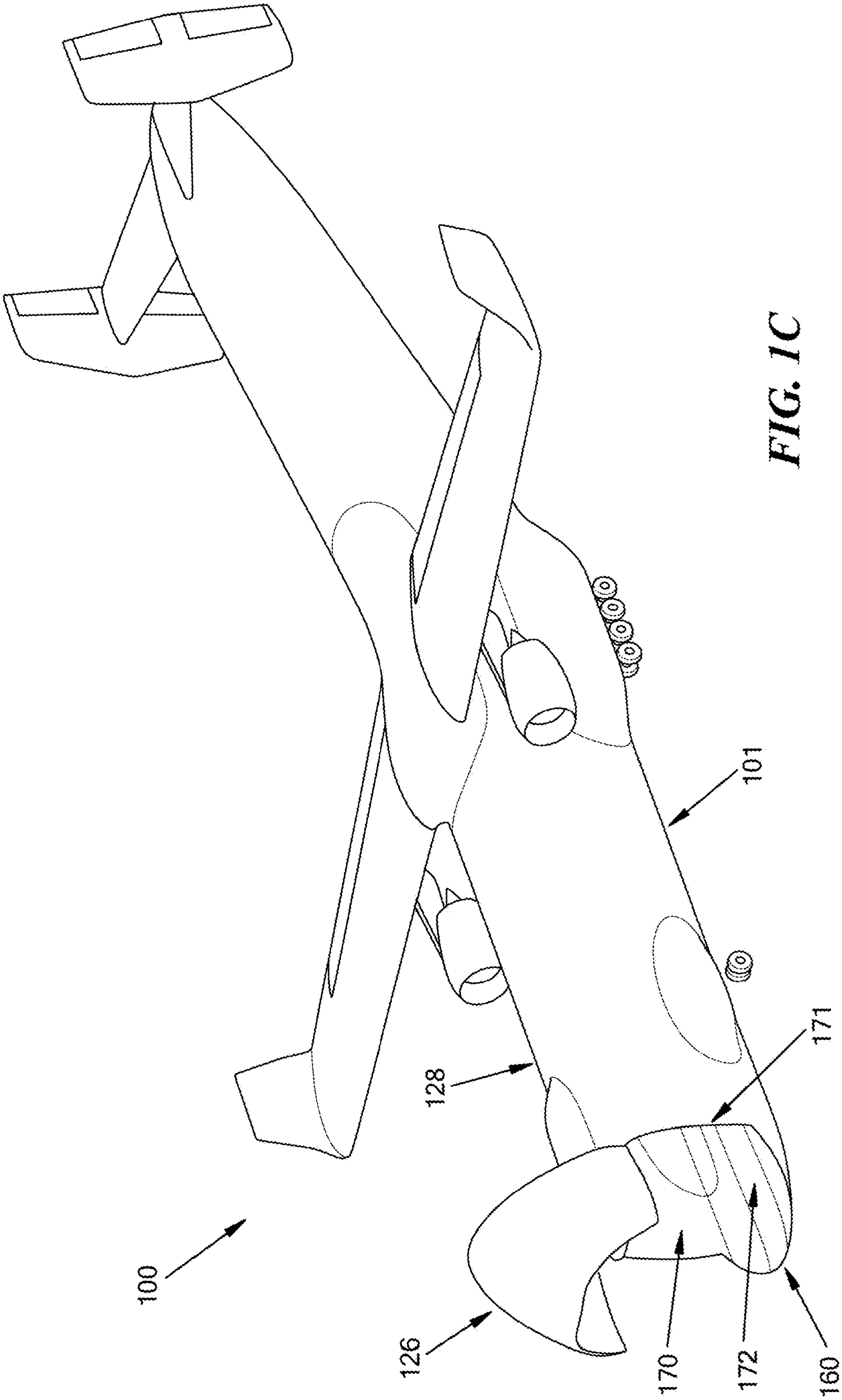
FIG. 1C is an isometric view of the aircraft of FIG. 1A with a nose cone door in an open position to provide access to an interior cargo bay of the aircraft.

The focus of the present disclosures is described with respect to a large aircraft 100, such as an airplane, illustrated in FIGS. 1A-1C, along with the loading of a large payload into the aircraft, illustrated in FIGS. 18A-18E. Additional details about the aircraft and payload may be described with respect to the other figures of the present disclosure as well. In the illustrated embodiment, a payload 10 is a combination of two wind turbine blades 11A and 11B (see FIG. 2), although a person skilled in the art will appreciate that other payloads are possible. Such payloads can include other numbers of wind turbine blades (e.g., one, three, four, five, etc., or segments of a single even larger blade), other components of wind turbines (e.g., tower segments, generator, nacelle, gear box, hub, power cables, etc.), or many other large structures and objects whether related to wind turbines or not. The present application can be used in conjunction with most any large payload—large for the present purposes being at least about 57 meters long, or at least about 60 meters long, or at least about 65 meters long, or at least about 75 meters long, or at least about 85 meters long, or at least about 90 meters long, or at least about 100 meters long, or at least about 110 meters long, or at least about 120 meters long—or for smaller payloads if desired. Some non-limiting examples of large payloads that can be used in conjunction with the present disclosures beyond wind turbines include but are not limited to industrial oil equipment, mining equipment, rockets, military equipment and vehicles, defense hardware, commercial aerospace vehicles, crane segments, aircraft components, space launch rocket boosters, helicopters, generators, or hyperloop tubes. In other words, the aircraft 100 can be used with most any size and shape payload, but has particular utility when it comes to large, often heavy, payloads.

As shown, the aircraft 100, and thus its fuselage 101, includes a forward end 120 and an aft end 140, with a kinked portion 130 connecting the forward end 120 to the aft end 140. The forward end 120 is generally considered any portion of the aircraft 100, and related components, that are forward of the kinked portion 130 and the aft end 140 is considered any portion of the aircraft 100, and related components, that are aft of the kinked portion 130. The kinked portion 130, as described in greater detail below, is a section of the aircraft 130 in which both a top-most outer surface 102 and a bottom-most outer surface 103 of the fuselage 101 become angled (notably, the placement of reference numerals 102 and 103 in the figures do not illustrate location of the "kink" since they more generally refer to the top-most and bottom-most surfaces of the fuselage 101), as illustrated by an aft centerline CA of the aft end 140 of the fuselage 101 with respect to a forward centerline CF of the forward end 120 of the fuselage 101.

The forward end 120 can include a cockpit or flight deck 122, and landing gears, as shown a forward or nose landing gear 123 and a rear or main landing gear 124. The illustrated embodiment does not show various components used to couple the landing gears 123, 124 to the fuselage 101, or operate the landing gears (e.g., actuators, braces, shafts, pins, trunnions, pistons, cylinders, braking assemblies, etc.), but a person skilled in the art will appreciate how the landing gears 123, 124 are so connected and operable in conjunction with the aircraft 100. The forward-most end of the forward end 120 includes a nose cone 126. As illustrated more clearly in FIG. 1C, the nose cone 126 is functional as a door, optionally being referred to the nose cone door, thus allowing access to an interior cargo bay 170 defined by the fuselage 101 via a cargo opening 171 exposed by moving the nose cone door 126 into an open or loading position (the position illustrated in FIG. 1C; FIGS. 1A and 1B illustrate the nose cone door 126 in a closed or transport position). The door may operate by rotating vertically tip-upwards about a lateral axis, or by rotating horizontally tip-outboards about a vertical axis, or by other means as well such as translation forwards then in other directions, or by paired rotation and translation, or other means.

As described in greater detail below, the interior cargo bay 170 is continuous throughout the length of the aircraft 101, i.e., it spans a majority of the length of the fuselage. The continuous length of the interior cargo bay 170 includes the space defined by the fuselage 101 in the forward end 120, the aft end 140, and the kinked portion 130 disposed therebetween, such spaces being considered corresponding to the forward bay, aft bay, and kinked bay portions of the interior cargo bay 170. The interior cargo bay 170 can thus include the volume defined by nose cone 126 when it is closed, as well as the volume defined proximate to a fuselage tail cone 142 located at the aft end 140. In the illustrated embodiment of FIG. 1C, the nose cone door 126 is hinged at a top such that it swings clockwise towards the fuselage cockpit 122 and a fixed portion or main section 128 of the fuselage 101. In other embodiments, a nose cone door can swing in other manners, such as being hinged on a left or right side to swing clockwise or counter-clockwise towards the fixed portion 128 of the fuselage. The fixed portion 128 of the forwards fuselage 101 is the portion that is not the nose cone 126, and thus the forwards fuselage 101 is a combination of the fixed portion 128 and the nose cone 126. Alternatively, or additionally, the interior cargo bay 170 can be accessed through other means of access known to those skilled in the art, including but not limited to a hatch, door, and/or ramp located in the aft end 140 of the fuselage 101, hoisting cargo into the interior cargo bay 170 from below, and/or lowering cargo into the interior cargo bay 170 from above. One advantage provided by the illustrated configuration, at least as it relates to some aspects of loading large payloads, is that by not including an aft door, the interior cargo bay 170 can be continuous, making it significantly easier to stow cargo in the aft end 140 all the way into the fuselage tail cone 142. While loading through an aft door is possible with the present disclosures, doing so would make loading into and use of the interior cargo bay 170 space in the aft end 140 all the way into the fuselage tail cone 142 much more challenging and difficult to accomplish—a limitation faced in existing cargo aircraft configurations. Existing large cargo aircraft are typically unable to add cargo in this way (e.g., upwards and aftwards) because any kink present in their aft fuselage is specifically to create more vertical space for an aft door to allow large cargo into the forwards portion of the aircraft.

Figure 7:
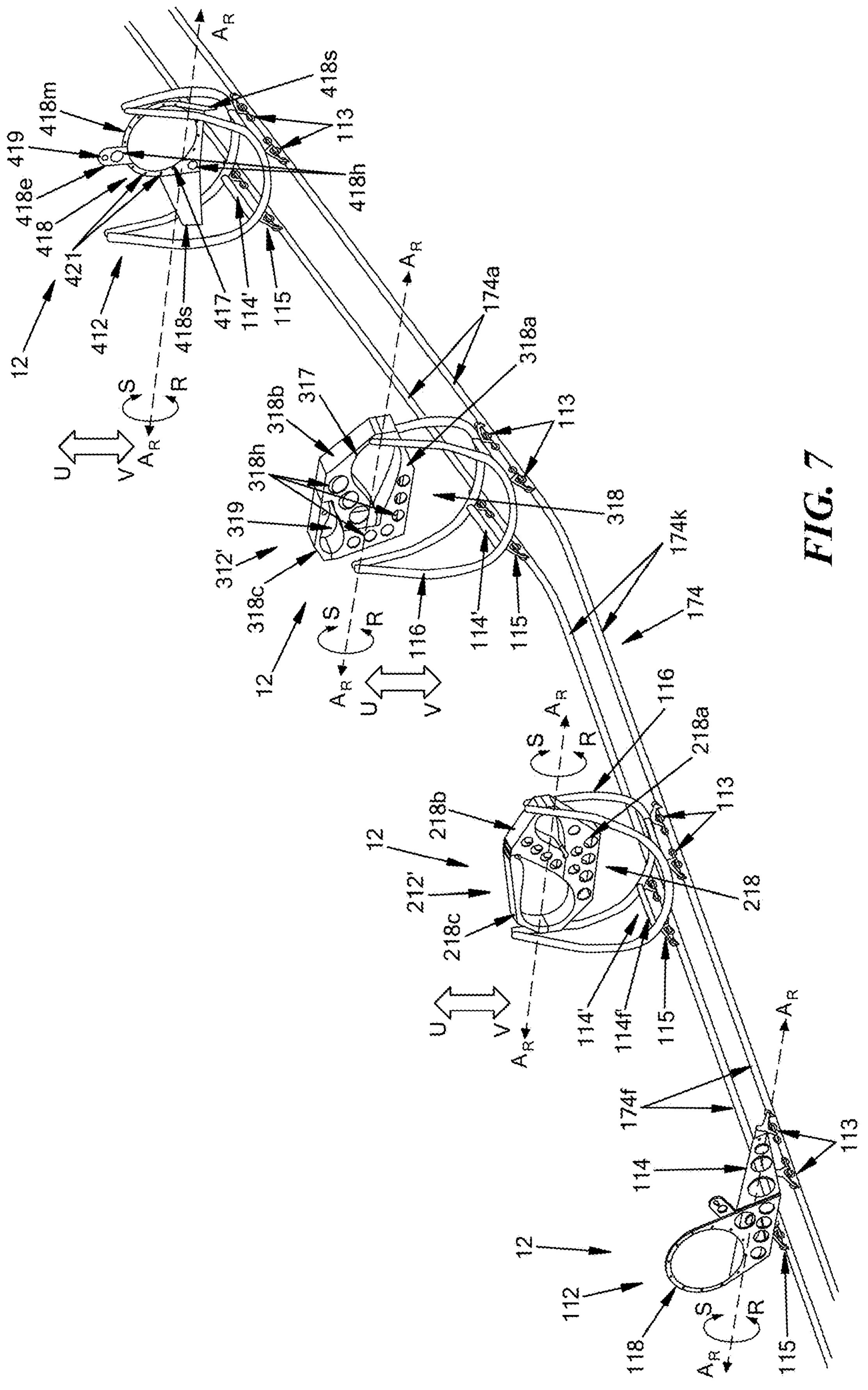
FIG. 7 is an isometric view of a plurality of exemplary payload-receiving fixtures disposed on rails.

A floor 172 can be located in the interior cargo bay 170, and can also extend in a continuous manner, much like the bay 170 itself, from the forward end 120, through the kinked portion 130, and into the aft end 140. The floor 172 can thus be configured to have a forward end **172*f*, a kinked portion 172*k*, and an aft end 172*a*. In some embodiments, the floor 172 can be configured in a manner akin to most floors of cargo bays known in the art. In some other embodiments, one or more rails can be disposed in the interior cargo bay 170 and can be used to assist in loading a payload, such as the payload 10, into the interior cargo bay 170 and/or used to help secure the location of a payload once it is desirably positioned within the interior cargo bay 170. The rail(s) can extend from the forward end 120, through the kinked portion 130, and into and up to almost an entirety of the aft end 140, and thus can have the same pitch relative to ground as the floor 172 itself. One exemplary embodiment of rails 174 is illustrated in FIG. 7, such rails having a forward portion 174*f*, kinked portion 174*k*, and aft portion 174*a* that can correspond pitch-wise with the forward end 172*f*, kinked portion 172*k*, and aft end 172*a* of the floor 172. A person skilled in the art will recognize that a rail is merely one non-limiting example of a fixture that can be disposed in the cargo bay 170** and used in conjunction with coupling at least one of a payload or a vehicle transportation system holding a payload, within the cargo bay to allow the same to be secured for flight.

Opening the nose cone 126 not only exposes the cargo opening 171 and the floor 172, but it also provides access from an outside environment to a cantilevered tongue 160 that extends from or otherwise defines a forward-most portion of the fixed portion 128 of the fuselage 101. The cantilevered tongue can be an extension of the floor 172, or it can be its own feature that extends from below or above the floor 172 and associated bottom portion of the fuselage 101. The cantilevered tongue 160 can be used to support a payload, thus allowing the payload to extend into the volume of the interior cargo bay 170 defined by the nose cone 126.

A wingspan 180 can extend substantially laterally in both directions from the fuselage. The wingspan 180 includes both a first fixed wing 182 and a second fixed wing 184, the wings 182, 184 extending substantially perpendicular to the fuselage 101 in respective first and second directions which are approximately symmetric about a longitudinal-vertical plane away from the fuselage 101, and more particularly extending substantially perpendicular to the centerline CF. Wings 182, 184 being indicated as extending from the fuselage 101 do not necessarily extend directly away from the fuselage 101, i.e., they do not have to be in direct contact with the fuselage 101. Further, the opposite directions the wings 182, 184 extend from each other can alternatively be described as the second wing 184 extending approximately symmetrically away from the first wing 182. As shown, the wings 182, 184 define approximately no sweep angle and no dihedral angle. In alternative embodiments, a sweep angle can be included in the tip-forwards (−) or tip-aftwards (+) direction, the angle being approximately in the range of about −40 degrees to about +60 degrees. In other alternative embodiments, a dihedral angle can be included in the tip-downwards (negative, or "anhedral") or tip-upwards (positive, or "dihedral") direction, the angle being approximately in the range of about −5 degrees to about +5 degrees. Other typical components of wings, including but not limited to slats for increasing lift, flaps for increasing lift and drag, ailerons for changing roll, spoilers for changing lift, drag, and roll, and winglets for decreasing drag can be provided, some of which a person skilled in the art will recognize are illustrated in the illustrations of the aircraft 100 (other parts of wings, or the aircraft 100 more generally, not specifically mentioned in this detailed description are also illustrated and recognizable by those skilled in the art). Engines, engine nacelles, and engine pylons 186 can also be provided. In the illustrated embodiment, two engines 186, one mounted to each wing 182, 184 are provided. Additional engines can be provided, such as four or six, and other locations for engines are possible, such as being mounted to the fuselage 101 rather than the wings 182, 184.

The kinked portion 130 provides for an upward transition between the forward end 120 and the aft end 140. The kinked portion 130 includes a kink, i.e., a bend, in the fixed portion 128 of the fuselage 101 such that both the top-most outer surface 102 and the bottom-most outer surface 103 of the fuselage 101 become angled with respect to the centerline CF of the forward end 120 of the aircraft 100, i.e., both surfaces 102, 103 include the upward transition provided for by the kinked portion 130. As shown at least in FIG. 1B, the aft-most end of the aft end 140 can raise entirely above the centerline CF. In the illustrated embodiment, the angle defined by the bottom-most outer surface 103 and the centerline CF is larger than an angle defined by the top-most outer surface 102 and the centerline CF, although other configurations may be possible. Notably, although the present disclosure generally describes the portions associated with the aft end 140 as being "aft," in some instances they may be referred to as part of a "kinked portion" or the like because the entirety of the aft end 140 is angled as a result of the kinked portion 130. Thus, references herein, including in the claims, to a kinked portion, a kinked cargo bay or cargo bay portion, a kinked cargo centerline, etc. will be understood by a person skilled in the art, in view of the present disclosures, to be referring to the aft end 140 of the aircraft 100 (or the aft end in other aircraft embodiments) in some instances.

Despite the angled nature of the aft end 140, the aft end 140 is well-suited to receive cargo therein. In fact, the aircraft 100 is specifically designed in a manner that allows for the volume defined by the aft end 140, up to almost the very aft-most tip of the aft end 140, i.e., the fuselage tail cone 142, can be used to receive cargo as part of the continuous interior cargo bay 170. Proximate to the fuselage tail cone 142 can be an empennage 150, which can include horizontal stabilizers for providing longitudinal stability, elevators for controlling pitch, vertical stabilizers for providing lateral-directional stability, and rudders for controlling yaw, among other typical empennage components that may or may not be illustrated but would be recognized by a person skilled in the art.

The aircraft 100 is particularly well-suited for large payloads because of a variety of features, including its size. A length from the forward-most tip of the nose cone 126 to the aft-most tip of the fuselage tail cone 142 can be approximately in the range of about 60 meters to about 150 meters. Some non-limiting lengths of the aircraft 100 can include about 80 meters, about 84 meters, about 90 meters, about 95 meters, about 100 meters, about 105 meters, about 107 meters, about 110 meters, about 115 meters, or about 120 meters. Shorter and longer lengths are possible. A volume of the interior cargo bay 170, inclusive of the volume defined by the nose cone 126 and the volume defined in the fuselage tail cone 142, both of which can be used to stow cargo, can be approximately in the range of about 1200 cubic meters to about 12,000 cubic meters, the volume being dependent at least on the length of the aircraft 100 and an approximate diameter of the fuselage (which can change across the length). One non-limiting volume of the interior cargo bay 170 can be about 6850 cubic meters. Not accounting for the very terminal ends of the interior cargo bay 170 where diameters get smaller at the terminal ends of the fuselage 101, diameters across the length of the fuselage, as measured from an interior thereof (thus defining the volume of the cargo bay) can be approximately in the range of about 4.3 meters to about 13 meters, or about 8 meters to 11 meters. One non-limiting diameter of the fuselage 101 proximate to its midpoint can be about 9 meters. The wingspan, from tip of the wing 132 to the tip of the wing 134, can be approximately in the range of about 60 meters to 110 meters, or about 70 meters to about 100 meters. One non-limiting length of the wingspan 180 can be about 80 meters. A person skilled in the art will recognize these sizes and dimensions are based on a variety of factors, including but not limited to the size and mass of the cargo to be transported, the various sizes and shapes of the components of the aircraft 100, and the intended use of the aircraft, and thus they are by no means limiting. Nevertheless, the large sizes that the present disclosure both provides the benefit of being able to transport large payloads, but faces challenges due, at least in part, to its size that make creating such a large aircraft challenging. The engineering involved is not merely making a plane larger. As a result, many innovations tied to the aircraft 100 provided for herein, and in other counterpart patent applications, are the result of very specific design solutions arrived at by way of engineering.

Materials typically used for making fuselages can be suitable for use in the present aircraft 100. These materials include, but are not limited to, metals and metal alloys (e.g., aluminum alloys), composites (e.g., carbon fiber-epoxy composites), and laminates (e.g., fiber-metallic laminates), among other materials, including combinations thereof.

Additional details about a kinked fuselage configuration are provided in a counterpart patent application entitled "AIRCRAFT FUSELAGE CONFIGURATIONS FOR AVOIDING TAIL STRIKE WHILE ALLOWING LONG PAYLOADS," filed concurrently herewith, the content of which is incorporated by reference herein in its entirety.

Transport Vehicle System and Components Related to the Same

Figure 2:
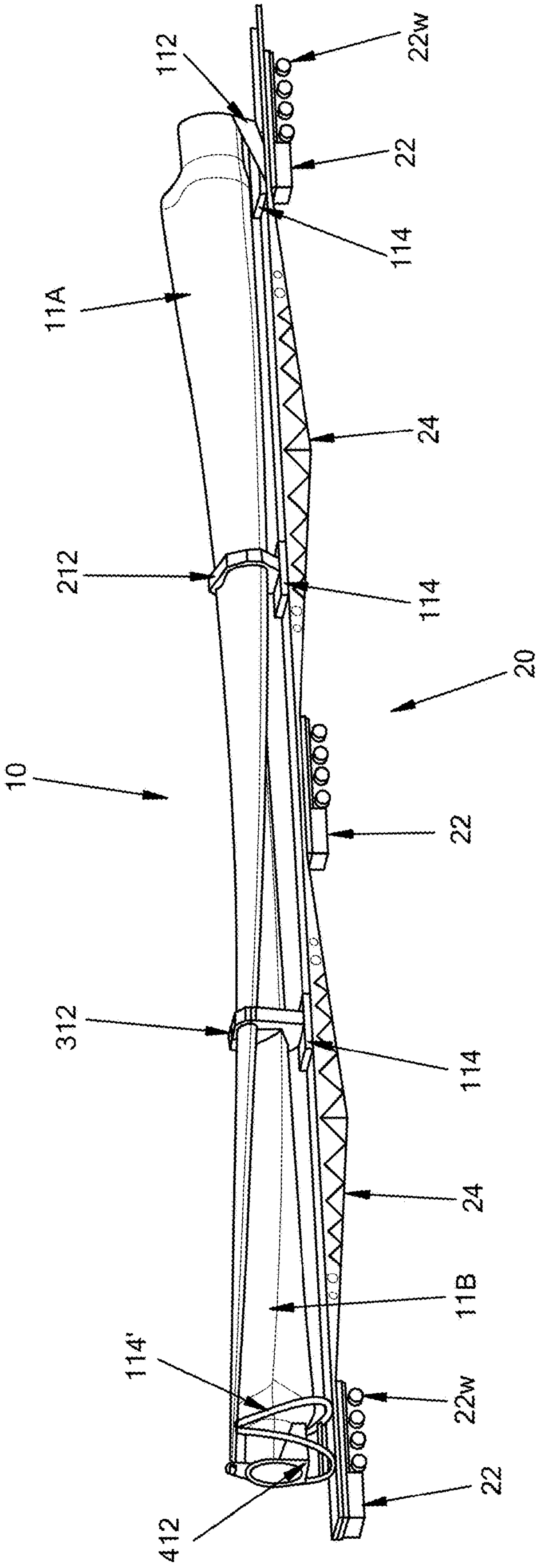
FIG. 2 is an isometric view of one exemplary embodiment of a payload transportation system having a payload disposed thereon.
Figure 4:
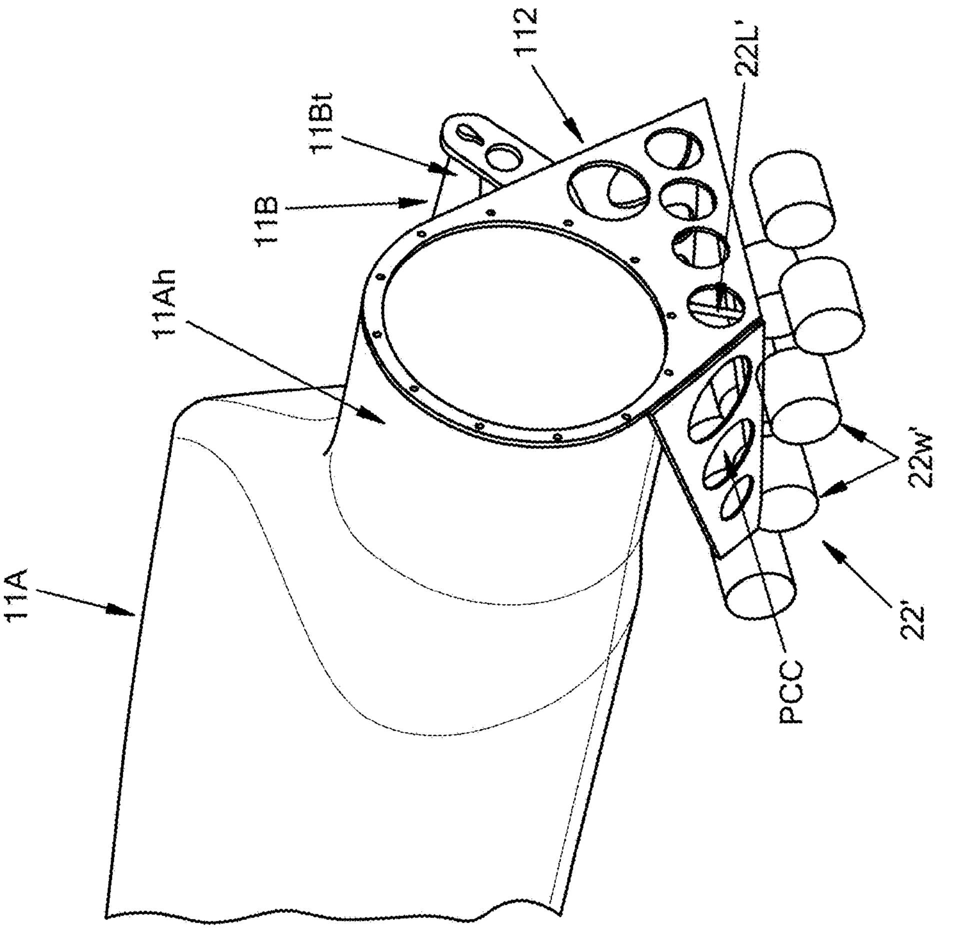
FIG. 4 is a schematic isometric view of one exemplary embodiment of a wheeled mobile transporter for use as part of a payload transportation system.

FIG. 2 illustrates one exemplary embodiment of a transport vehicle or transport vehicle system 20, alternately referred to as a payload transportation system, having a payload 10 disposed on it. The terms vehicle and system may be used interchangeably herein with respect to reference numeral 20 as the entirety of transporters or vehicles (e.g., mobile wheeled transporters 22) and support spans (e.g., trusses 24) can be considered a singular vehicle, or alternatively, the combination of mobile wheeled transporters 22 and support spans 24 can be considered a vehicle system with each transporter 22 itself being considered a vehicle. Both interpretations are appropriate. Likewise, the transporters 22, and other embodiments of transporters provided for herein, can also be considered a vehicle.

While additional details about the vehicle system 20 and the transporters 22 and related components are provided below, generally the vehicle system 20 can include a plurality of transporters 22 and a support span, as shown trusses 24, extending between each of the transporters 22. The transporters 22 can be wheeled vehicles configured to move along a surface, such as ground, up or down a ramp, and/or in an interior cargo bay of an aircraft, among other surfaces. The transporters 22 can be operated independent of one another, or they can be operable collectively as a single unit. Operation of the same can include typical driving features (translation, forward, back, left, right, and intermediate directions therebetween, and changing of azimuth) and features related to controlling a location of the payload 10 with respect to the transporters 22, such as positioning and orienting the payload 10 in any of the six degrees of freedom. Some non-limiting examples of how the payload can be manipulated or otherwise moved with respect to the transporters 22, and thus the system 20, are discussed below at least with respect to FIGS. 3-13, 15A, and 15B. Such examples also discuss non-limiting ways regarding how the payload, e.g., wind turbine blades 11A, 11B, is secured and thus transported by the transporters 22 and system 20.

The transporters 22 can be self-propelled and/or self-powered such that an outside mechanism, such as pushing or towing vehicle, does not need to contact the transporters 22, or any part of the system 20, to advance, drive, or otherwise move the transporters 22 and system 20. The transporters 22 can thus include some appropriate combination of a power system (e.g., battery, fuel tank, or other energy source, including renewable energy source(s)), electrical controls, and/or an engine, motor, and/or other power conversion device to allow the transporters 22 to move without outside forces being applied to it. Still further, the transporters 22 can also include appropriate features and devices to secure it aboard the aircraft 100, such as tiedown rings, manual or power-operated locking pins, or articulated struts, among others.

As shown, the transporters 22 include wheels 22*w*. Any wheel set-up or configuration is generally possible with any of the transporters disclosed herein or otherwise derivable from the present disclosures without departing from the spirit of the present disclosure. Alternatively, or additionally, with respect to any of the transporters provided for herein or otherwise derivable from the present disclosures, other transportation means can be used that allow for movement across a ground, including, for example skis, skids, linked tracks (e.g., tractor tracks, military tank tracks), articulated legs, or air cushions in the manner of a hovercraft.

Control of the transporters 22 and/or the system 20 can be performed using any known techniques for controlling a vehicle remotely, including but not limited to one or more controllers or control pads in communication with systems and/or other components provided for on the transporters (e.g., power system, electrical controls, motor, etc.). Control can be managed by one or more operators (e.g., humans) and/or some or all of the control can be computer-aided or directed, including but not limited to the use of automated driving systems, artificial intelligence, and other known ways for operating a vehicle or the like without outside intervention (e.g., intervention from a human(s)). The control signals may be communicated from the controller to the transporter 22 using a wired electrical connection, radio frequency transmissions, fiber optic link, and/or free-space lasers, among other options. In still other embodiments, one or more of the transporters 22 can be configured to be driven by an operator, including by riding on the transporter(s) 22 or support span(s) while driving the system. The transporters 22 and/or system 20 can be outfitted with a variety of sensors that can be used to help in the operation of the same, including but not limited to position sensors and/or object detection sensors. For example, the transporters 22 can include appropriate control devices, such as an onboard computer(s), steering sensors and actuators, and/or position and attitude sensors and actuators, to permit a human operator or autonomous software program to drive the vehicle over land and position it aboard the aircraft 100.

Disposed between each transporter 22 can be one or more support spans. In the illustrated embodiment, the support spans are trusses, although a person skilled in the art will recognize a variety of structures that can be used to couple transporters 22 together and provide adequate support for a payload. The trusses 24 can include a plurality of rails that are disposed substantially parallel to each other, along with various crossbeams that provide additional strength to the truss 24. In embodiments in which rails are disposed in the aircraft, the rails of the truss can be complementary in size to the rails on the aircraft to allow for easy transition from one to the other if desired. The length and number of trusses can depend, at least in part, on the number of transporters 22 being used and the size and weight of the payload 10. More generally, fewer or more transporters 22 and trusses 24 can be used as desired. In the illustrated embodiment, the trusses 24 extend across an entire top surface of each transporter 22, although in other embodiments the trusses can extend along only a portion of the top surface of one or more of the transporters 22. Generally the support spans are configured in a manner such that the do not interfere with the operation of the system 20, and thus, for example, a height of the trusses 24 in the illustrated embodiment is such that they do not contact the ground. However, the trusses may optionally be permitted to sag and intentionally contact the ground under some loading situations to alleviate stresses within the trusses and thereby reduce the amount of material required to construct them.

While the present disclosure permits the transportation of a wide variety of large (and small for that matter) cargos, in the illustrated embodiment the payload 10 includes two wind turbine blades 11A, 11B. In at least some instances, the payload 10 can be referred to as a package, particularly when multiple objects (e.g., more than one blade, a blade(s) and ballast(s)) are involved, possibly secured together and manipulated together as single unit. A package can involve a single object though. The blades 11A, 11B are restrained in relative position with respect to each other by a plurality of payload-receiving fixtures 112, 212, 312, and 412, each of which is described in greater detail below. Other payload-receiving fixtures, either provided for herein or otherwise derivable in view of the present disclosures, can also be used in conjunction with packaging the blades 11A, 11B (or a payload more generally). Each fixture 112, 212, 312, 412 can be removably coupled to one truss of the trusses 24 by way of carriages 114, 114, 114, 114', respectively, using techniques known to those skilled in the art for securing a large and/or heavy payload (or any payload for that matter, regardless of size or weight) to a truss or other structure. The carriages 114, 114' are described in greater detail below. The payload-receiving fixtures can be disposed such that they only have the support span directly beneath them (see, e.g., the fixtures 212 and 312), their entire bottom surface is supported by both the support span and the transporter 22 (see, e.g., the fixtures 112 and 412), they are disposed solely on the transporter 22 (in instances where the support span does not fully cover the transporter 22), and/or the are disposed across some combination of those options. Further, while the illustrated embodiment provides for two wind turbine blades, any number of wind turbine blades can be used in conjunction with the present disclosure, including but not limited to one blade, three blades, four blades, five blades, six blades, seven blades, eight blades, etc. As more blades are added, the size and weight of the payload may increase and/or the size of the blades may be reduced and/or the size of a cargo bay in which the blades are to be transported may be changed and/or a size of a transport vehicle or system may be changed accordingly.

The payload-receiving fixtures 112, 212, 312, 412 are generally considered part of the payload, although in an alternative interpretation, the payload 10 can just be configured to be the blades 11A, 11B. This payload 10, or package as indicated above, can be considered irregular in that the shape, size, and weight distribution across the length of the payload is complex, causing a center of gravity of the payload to be at a separate location than a geometric centroid of the payload. One dimension (length) greatly exceeds the others (width and height), the shape varies with complex curvature nearly everywhere, and the relative fragility of the payload requires a minimum clearance be maintained at all times as well as fixturing support the length of the cargo at several locations even under the payload's own weight under gravity. Additional irregular payload criteria can include objects with profiles normal to a lengthwise axis rotate at different stations along that axis, resulting in a lengthwise twist (e.g., wind turbine blade spanwise twist) or profiles are located along a curved (rather than linear) path (e.g., wind turbine blade in-plane sweep). Additionally, irregular payloads include objects where a width, depth, or height vary non-monotonically along the length of the payload (e.g., wind turbine blade thickness can be maximal at the max chord station, potentially tapering to a smaller cylinder at the hub and to a thin tip). The term irregular package will be similarly understood. Further, in some embodiments, the payload-receiving fixtures (e.g., 112, 212, 312, 412) can be affixed to or integrally formed with the transporters 22 such that the transporters include the fixtures themselves. This can be true for any combination of transporters 22 and payload-receiving fixtures disclosed herein or otherwise derivable from the present disclosures.

Figure 3:
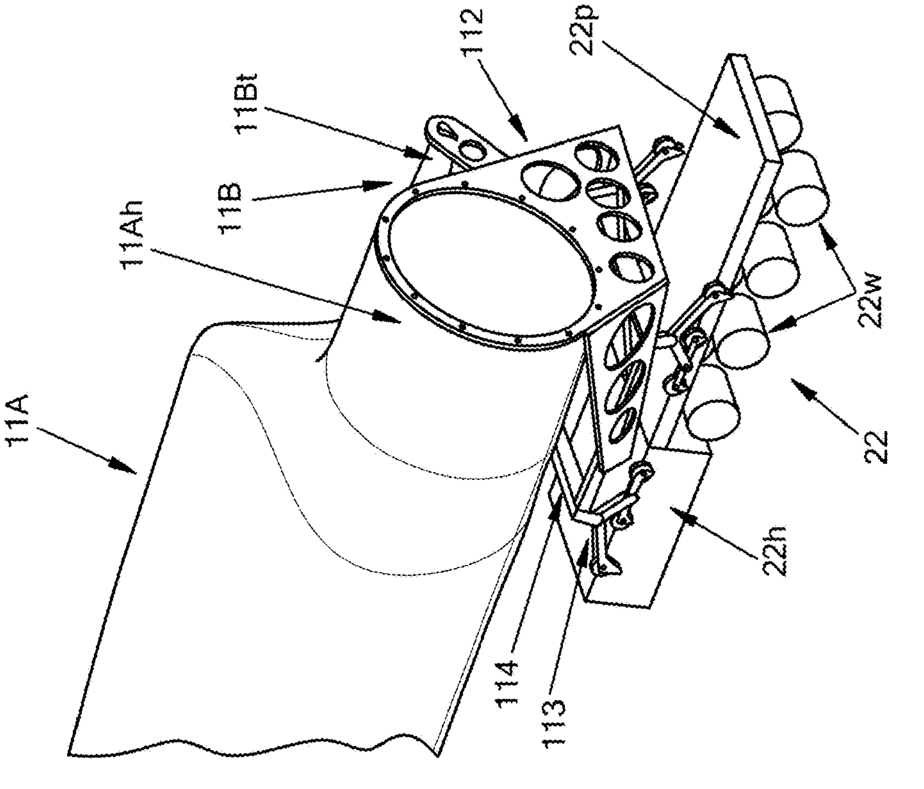
FIG. 3 is a schematic isometric view of one exemplary embodiment of a wheeled mobile transporter of the payload transportation system of FIG. 2.

FIG. 3 illustrates the transporter 22 with the payload-receiving fixture 112 coupled thereto. The transporter 22 can include a plurality of wheels 22*w* to move the transporter 22 along a surface, such as ground, up or down a ramp, and/or in an interior cargo bay of an aircraft, among other surfaces. In the illustrated embodiment eight wheels 22*w* are provided in a 2×4 configuration, although any number of wheels set-up in any wheel configuration is generally possible without departing from the spirit of the present disclosure. The transporter 22 can also include a housing 22*h* and a positioning surface 22*p*. The housing 22*h* can protect power and control components of the transporter 22, including but not limited to the aforementioned power system(s), electrical controls, and/or motor(s). In the illustrated embodiment the housing 22*h* has a rectangular prism shape, but any shape suitable to house power and control component and the like without interfering with the performance of the transporter 22 can be used. The positioning surface 22*p* can allow a payload-receiving fixture (e.g., the payload-receiving fixture 112) and/or related components (e.g., a carriage and/or wheel sets 113) to move along it to allow for proper positioning of the payload (e.g., the root or hub 11Ah of the wind turbine 11A and the tip 11Bt of the wind turbine 11B received by the fixture 112) with respect to the transporter and/or a cargo bay of a large transport vehicle.

While the details of the fixture 112 are discussed below with respect to FIGS. 8A and 8B, generally a carriage 114 having the fixture 112 rotatably coupled thereto is illustrated. The carriage 114 includes a plurality of wheel sets 113, which allow the fixture 112 to be translated along the positioning surface 22*p* of the transporter 22. This can be done, for example, when loading the payload 10 onto the transporter 22, when positioning it prior to moving it with the system 20, and/or when positioning the payload 10 within an interior cargo bay at a desired location for subsequent securing within the cargo bay for long distance transportation. In embodiments in which the payload 10 is moved from the payload transportation system 20 to a location within a cargo bay to be secured and stowed for long distance transportation, the wheel sets 113 can likewise assist with positioning the payload at a desired location for long distance transport, for instance by rolling along rails disposed within the cargo bay.

The transporter 22' is similar to the transporter 22 of FIG. 3 except that it includes a different mechanism for coupling the payload-receiving fixture 112 to the transporter 22'. More particularly, the carriage 114 is replaced by a linkage 22L' that couples wheels 22*w'* directly to the fixture 112, rather than utilizing intermediate rails and/or a flat deck surface. The power and control components of the transporter 22' can be housed in a region PCC illustrated in FIG. 4, in a manner akin to the housing 22*h* of the transporter 22.

Figure 6:
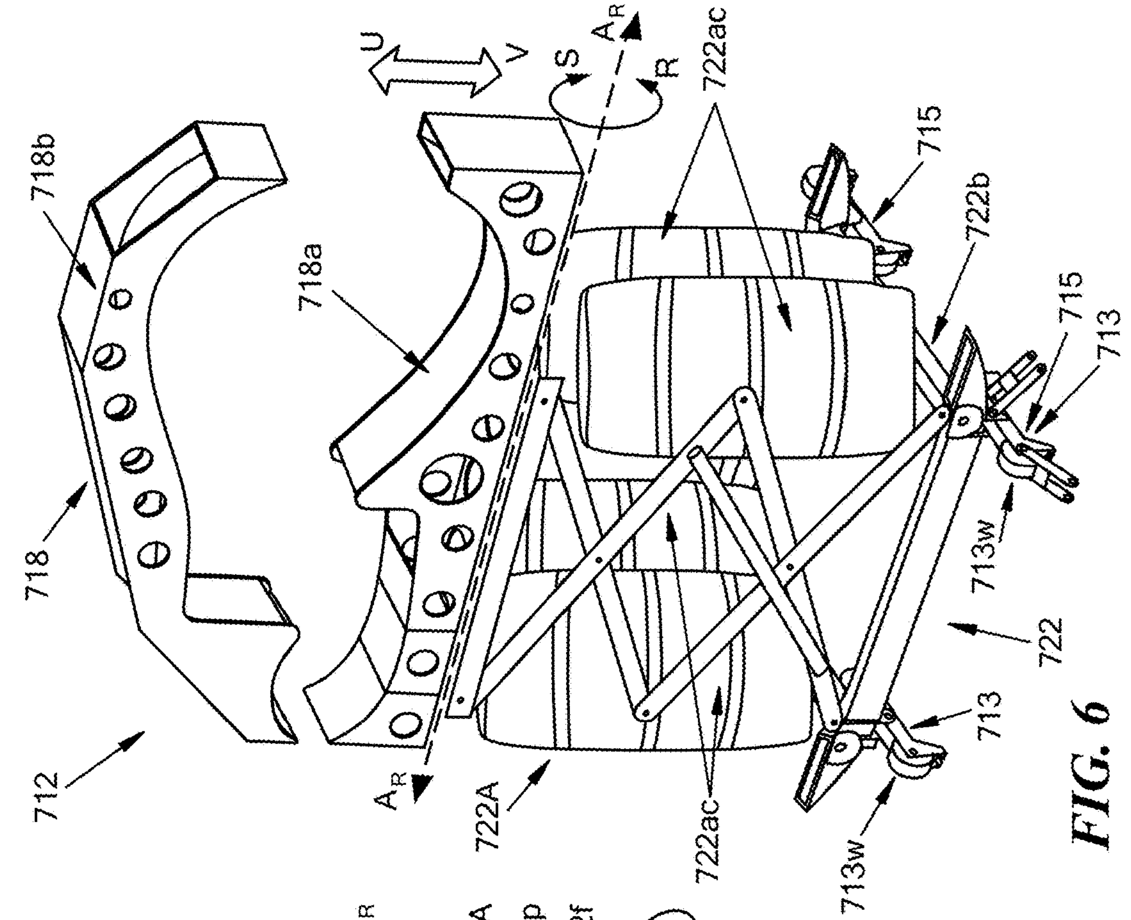
FIG. 6 is a schematic isometric view of one exemplary embodiment of a payload-receiving fixture that can be incorporated in part of one or more mobile transporters for use as part of a payload transportation system.
Figure 5:
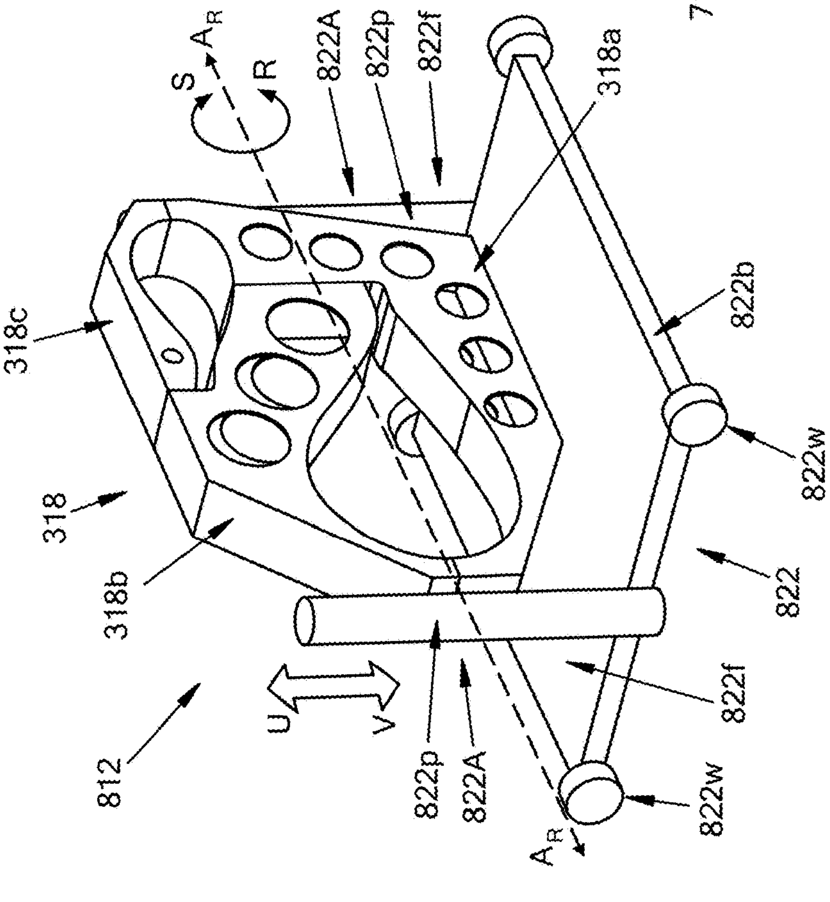
FIG. 5 is a schematic isometric view of another exemplary embodiment of a mobile transporter for use as part of a payload transportation system.

FIGS. 5 and 6 provide two non-limiting embodiments of actuators that can be used in conjunction with transporters provided for herein or otherwise derivable from the present disclosures. The actuators, as shown 822A, 722A, can be used for purposes of allowing passive or active movement of various payload-receiving fixtures associated with such transporters, and thus the payload (e.g., wind turbine blades 11A, 11B) secured by the payload-receiving fixtures. FIG. 5, for example illustrates an embodiment of a transporter 822 having a payload-receiving fixture 812 associated therewith and actuators 822A. More particularly, the transporter 822 includes a base 822*b* that is substantially rectangular in shape and solid, although many other configurations are possible. For example, although not illustrated, the power and control components of the transporter 822 can be housed on the base 822*b* or, if the base 822*b* has sufficient available volume, within the base 822*b*. In fact, at least because the illustrated embodiment is schematic in nature, in addition to accounting for locations for the power and control components, a version of the transporter 822 in use would need to include sufficient support structures to help bear the weight of the payload. A person skilled in the art, in view of the present disclosures, will understand how to implement such actions in practice. Wheels 822*w* can be included, as shown at each corner of the base 822*b*, and can allow the transporter 822 to move.

A frame 822*f* is provided that includes a plurality of actuators 822A. In some embodiments, the actuators 822A and frame 822*f* are one in the same. The actuators 822A couple a receiver 318 to the frame 822*f* and/or the actuators 822A. The receiver 318, which is described in greater detail below, includes a plurality of parts 318*a*, 318*b*, 318*c*. The actuators 822A include two hydraulic pistons 822*p* serving as part of, or otherwise incorporated with or coupled to, the frame 822*f* to adjust a position of the receiver 318, and thus the payload (e.g., wind turbine blades) secured thereto. The pistons 822*p* can provide vertical movement in directions U and V. The receiver 318 can be coupled to the frame 822*f* and/or the hydraulic pistons in a manner described elsewhere herein with respect to a frame 116 and receivers 218, 318 to provide rotational movement about a pivot axis $A_R$ in directions R and S. The vertical and translational movements can also allow for the payload (e.g., the blades 11A, 11B) to flex and/or rotate, including, for example, when the payload is being moved at an angle, such as when moving through kinked and aft portions of an interior cargo bay. The flexing and/or rotating can be due, for example, to the payload-receiving fixtures being moved at an angle and/or due to other payload-receiving fixtures with which the fixture is being used being moved at an angle.

A transporter 722 having a payload-receiving fixture 712 associated therewith and actuators 722A is illustrated in FIG. 6. The transporter 722 includes a base 722*b* that is substantially rectangular in shape and open in a central portion, although many other configurations are possible. For example, although not illustrated, the power and control components of the transporter 722 can be housed within the open central portion, or within a housing disposed within the open central portion of the base 722*b*. In fact, at least because the illustrated embodiment is schematic in nature, in addition to accounting for locations for the power and control components, a version of the transporter 722 in use would need to include sufficient support structures to help bear the weight of the payload. A person skilled in the art, in view of the present disclosures, will understand how to implement such actions in practice. Wheel sets 713 having a plurality of wheels 722*w* coupled by a whiffle tree 715 can be included, as shown at each corner of the base 722*b*, and can allow the transporter 722 to move. A pair of opposed linkage systems 722L that couple the receiver 718 to the carriage base 722*b* can be provided. The illustrated embodiment only shows a single linkage system 722L, but a second one can be disposed on the opposite arm of the 722*b*. The receiver 718 can be similar in nature to receivers 218 and 318, discussed below, although in this embodiment only two pieces—a first or base piece 718*a* and a second or receiving piece 718*b*—are provided instead of three. The features and operation of the receiver 718 are clear in view of the other described embodiments involving receivers with pieces.

The actuators 722A include four air chambers 722*ac* configured to inflate and/or deflate to adjust a position of the receiver 718, and thus the payload (e.g., wind turbine blades) secured thereto. As the air chambers 722*ac* fill with or release air, the receiver 718 can be move vertically in the directions U and V. Likewise, by operating some air chambers 722*ac* while not operating others, or by inflating some while deflating others, the receiver 718 can be rotated about the pivot axis $A_R$ in the directions R and S. The vertical and translational movements can also allow for the payload (e.g., the blades 11A, 11B) to flex and/or rotate, including, for example, when the payload is being moved at an angle, such as when moving through kinked and aft portions of an interior cargo bay. The flexing and/or rotating can be due, for example, to the payload-receiving fixtures being moved at an angle and/or due to other payload-receiving fixtures with which the fixture is being used being moved at an angle. In the illustrated embodiment, there are four air chambers, but any number of chambers, and size of chambers, can be used without departing from the spirit of the present disclosure. Further, the air chambers can more generally be fluid chambers, capable of adjusting their size and orientation by having any type of fluid (gas or liquid) selectively disposed in or released from the chambers. Even a solid (e.g., sand) could be used in lieu of a fluid if desirable.

FIG. 7 provides for a variety of different payload-receiving fixtures that can be incorporated with and/or used in conjunction with the various payload transportation systems (e.g., the system 20), transporters (e.g., the transporters 22, 22', 722, 822), and support spans (e.g., trusses 24) provided for herein or otherwise derivable from the present disclosures. The illustrated payload-receiving fixtures 12, and more particularly fixtures 112, 212', 312', and 412, can be used in lieu of or in addition to the payload-receiving fixtures described above or elsewhere in conjunction with such systems, transporters, and support spans. In the illustrated embodiment, the fixtures 112, 212', 312', and 412 are shown as being disposed on two rails 174. As discussed above, in some embodiments of an aircraft, like the aircraft 100, one or more rails, like the rails 174, can be disposed in the cargo bay 170. For example, they can be disposed on the floor 172, extending from the forward end 172*f*, through the kinked portion 172*k*, and into and sometimes through a majority or a substantial majority of the aft end 172*a*.

The payload-receiving fixtures 12, as shown fixtures 112, 212', 312', 412, can generally include a carriage 114, 114', a frame 116, and a receiver 118, 218, 318, 418. In at least some of the illustrated embodiments, a single type of carriage and a single type of frame are provided, while four different receivers are illustrated. A person skilled in the art will recognize other carriages, frames, and receivers that can be used in conjunction with the present disclosures. Further, while payload-receiving fixtures are referred to herein using reference numeral 12, in some embodiments, a payload-receiving fixture may just be a receiver, like the receivers 118, 218, 318, 418, and thus such usage of the term "payload-receiving fixture" herein, including in the claims, can be directed to just a receiver as provided for herein. Generally that term in any claim should be read in that manner, unless such interpretation would be incompatible with the remaining portion of the claim, for example, if the claim separately recites a receiver. In any of these instances, such payload-receiving fixtures and/or receivers can be incorporated with and/or used in conjunction with the transport systems, transporters, and support spans provided for herein or otherwise derivable from the present disclosures.

Some of the illustrations may look incomplete or incompatible with other figures, such as looking like a receiver is not quite properly coupled to a frame (see, e.g., FIG. 7 as filed) or the fixture 12 not being in contact with the rails 174 (see, e.g., FIG. 7), but a person skilled in the art will recognize this is just the result of complications that can arise while drawing and viewing components using solid models and is not indicative of an incomplete, incompatible, or inoperable aspect of the aircraft and/or related components. A person skilled in the art, in view of the present disclosures, will understand how such components should be illustrated in view of the present disclosures and other figures.

Figure 8A:
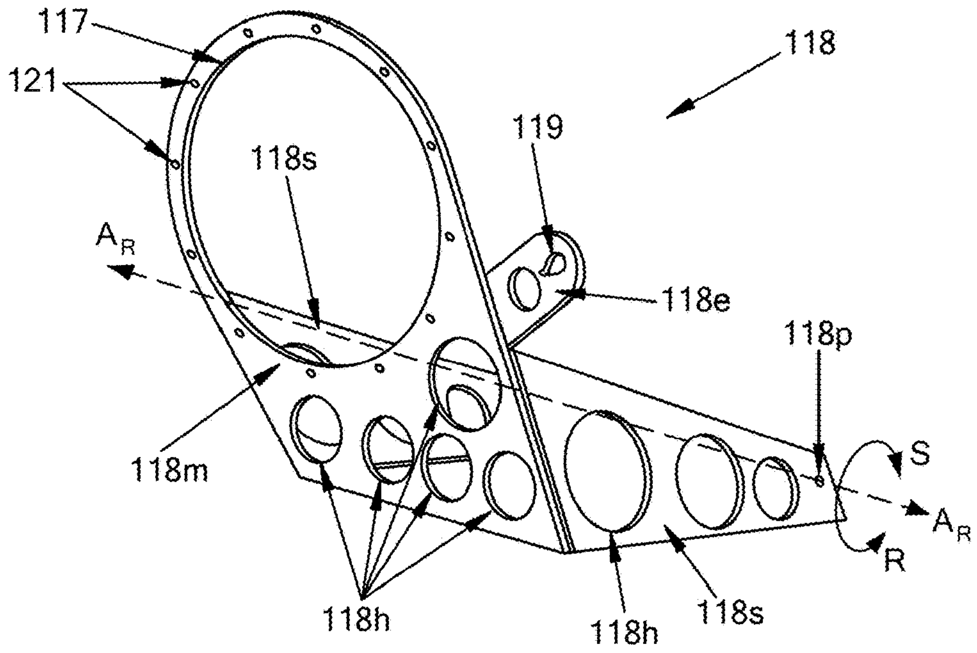
FIG. 8A is an isometric view of one receiver of a payload-receiving fixture of the payload-receiving fixtures of FIG. 7.
Figure 8B:
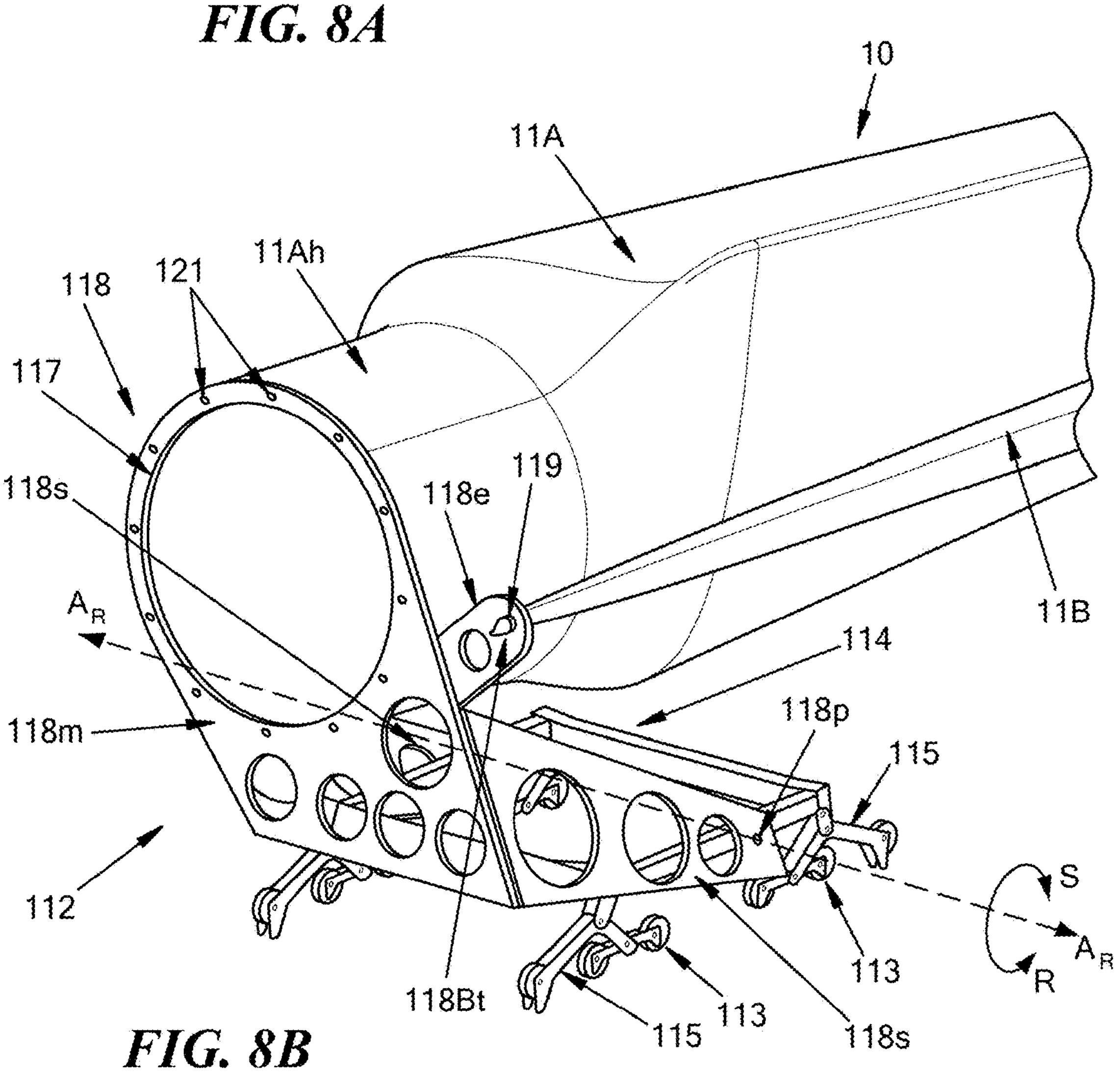
FIG. 8B is an isometric view of the receiver of FIG. 8A receiving two wind turbine blades, the receiver being part of a payload-receiving fixture of the payload-receiving fixtures of FIG. 7.
Figure 9A:
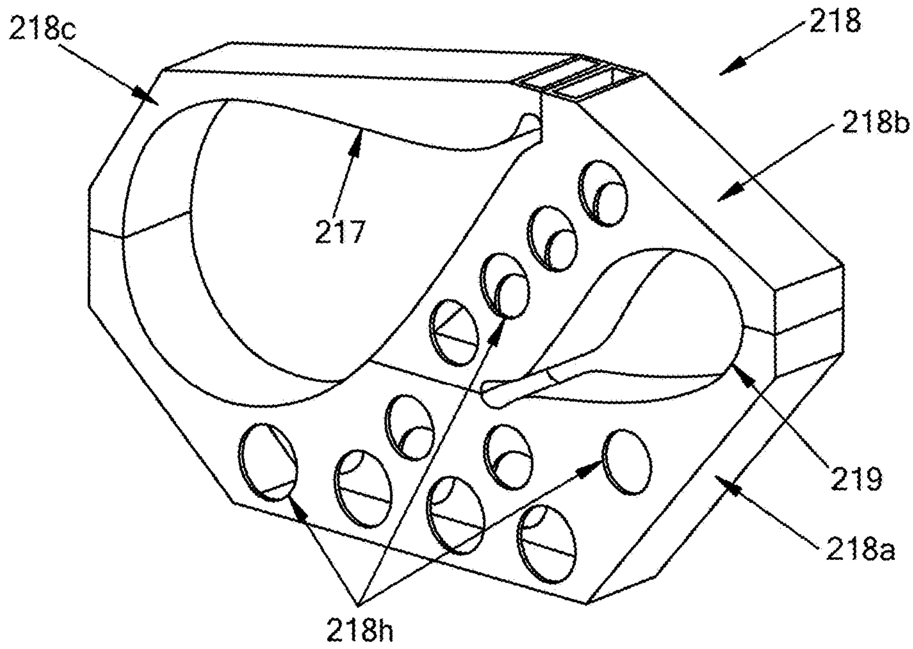
FIG. 9A is an isometric view of another receiver of another payload-receiving fixture of the payload-receiving fixtures of FIG. 7.
Figure 9B:
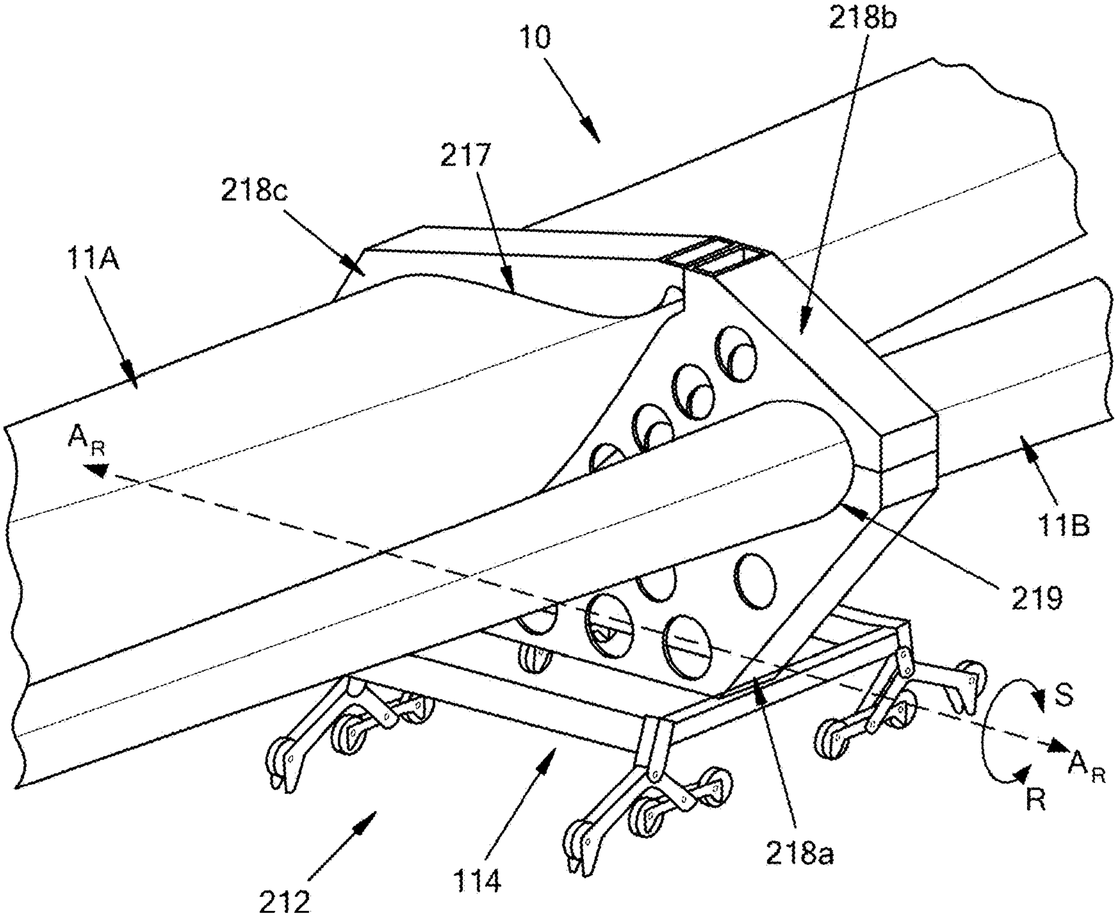
FIG. 9B is an isometric view of the receiver of FIG. 9A receiving two wind turbine blades, the receiver being part of another payload-receiving fixture of the payload-receiving fixtures of FIG. 7.

As shown in FIGS. 2 and 7-8B, a first payload-receiving fixture 112 includes a carriage 114 and a receiver 118, the receiver 118 being shown separately in FIG. 8A. While further details of the carriage 114 are described below with respect to FIG. 14, the carriage can generally be configured to have any of the receivers provided for herein, including the receiver 118 as illustrated, coupled to it. Alternatively, the carriage 114 can be configured to have a frame mounted to it, as shown at least in FIG. 7 with respect to the frame 116. Any known techniques for mounting the receiver 118 to the carriage 114 can be employed, whether provided for herein or otherwise known to those skilled in the art. In the illustrated embodiment, pins can be disposed through pin-receiving openings 118*p* to couple the receiver 118 to the carriage, also allowing for rotation about a pivot axis $A_R$, as described further below. Additional coupling locations between the receiver 118 and the carriage 114 can also be provided to provide sufficient support of the payload held by the receiver 118. For example, the receiver 118 may be rigidly connected to the carriage 114 via a welded joint along the top frame member of the carriage 114 or by way of an elastic flexure element. The carriage 114 can include wheel sets 113 and whiffle trees 115 that aid in both moving the receiver 118, and thus a payload 10 received by the receiver 118, and can also help spread the weight of the payload 10 more evenly through the first payload-receiving fixture 112.

The receiver 118 is illustrated as a three-sided structure comprising a main receiving panel 118*m* and two side panels 118*s* extending substantially perpendicular to the main receiving panel 118. The two side panels 118*s* in the illustrated embodiment are substantially alike, although they do not have to be configured in that manner. An extension 118*e* can also extend from the main receiving panel 118*m*, and in the illustrated embodiment the extension 118*e* is substantially planar with the main receiving panel 118*m*. The location of the extension 118*e*, like the location of all of the features of the receiver 118 and/or the payload-receiving fixture 112 more generally (and any receivers and payload-receiving fixtures provided for herein or otherwise derivable from the present disclosures), can be a function of the determined preferred orientation of the structures being held as part of the payload (e.g., the blades 11A, 11B), with factors impacting the same including reducing or eliminating excessive motion of the payload, minimizing an amount of space consumed by the payload, maintaining a desired center of gravity of the payload when it is loaded onto the aircraft, and/or preventing any contact or other potential damage to any or all portions of the payload. The main receiving panel 118 is configured to be a terminal end payload-receiving fixture, meaning it is designed to receive terminal ends of the payload 10. In the illustrated embodiment the payload 10 includes two wind turbine blades 11A, 11B, and the receiver 118 receives a terminal end of each of the two blades 11A, 11B. As shown, the main receiving panel 118 includes a large receiving opening 117 more generally configured to receive a portion of a large structure, for example a terminal end of the wind turbine blade 11A that is its root or hub 11Ah. The portion of the large structure can be secured with respect to the receiver 118 using any techniques known to those skilled in the art. In the illustrated embodiment, fasteners (e.g., screws) are passed into and through pre-formed holes 121 disposed around a circumference of the opening 117 in the main receiving panel 118*m*, into the hub 11Ah of the wind turbine blade 11A, to couple the wind turbine blade 11A to the receiver 118. The extension further includes a small receiving opening 119 configured to receive a portion of a large structure, for example a terminal end of a second wind turbine blade 11B that is its tip 11Bt, again as shown in FIG. 8B. The portion of the large structure can also be secured with respect to the receiver 118 using any techniques known to those skilled in the art. In the illustrated embodiment, the opening 119 is sized and shaped (as shown, a tear-drop shape) in a manner that allows the tip 11Bt to be secured into or otherwise held within the opening 119 without causing any damage to the blade tip 11Bt that would detrimentally impact its performance. A person skilled in the art will recognize other ways by which a blade(s) can be coupled to any of the receivers provided for herein.

One or more additional holes or openings 118*h* (not all are labeled, and the terms holes and openings may be used interchangeably herein) can be formed in the receiver 118. In the illustrated embodiment there are five small to medium-sized openings in the main panel 118*m*, three small to medium-sized openings in each of the side panels 118*s*, and one small-sized opening in the extension 118*e*, although any other number of configurations, sizes, shapes, amounts, etc. are possible. The openings 118*h* can serve a variety of purposes, including but not limited to reducing the weight of the fixture 112 and/or providing possible locations where the fixture 112 can be secured within a cargo bay of an aircraft, such as by tying a rope or chain or the like through one or more of the openings and tightening accordingly to secure the location of the fixture 112, and thus the payload 10 secured by the fixture 112, within a cargo bay. Securing the payload can include securing it to one or more other locations disposed in the interior cargo bay 170, including by securing aspects of the fixture 112 or a payload transportation system (e.g., the system 20) on which the fixture 112 is provided. A pin-receiving hole 118*p* is disposed in each of the side panels 118*s* (only one is visible; the other is similar located on the other panel 118*s*), the pin-receiving holes defining a pivot axis $A_R$ about which the receiver 118 can rotate, in directions R and S. Rotation of the receiver 118 about the pivot axis $A_R$ can allow for flexibility as the payload is moved along a surface, such as the aft end 172*a* of the floor 172. Such rotation can also allow for the blades 11A, 11B to flex and/or rotate, for example, when the blades 11A, 11B are being moved at an angle, such as when moving through the kinked portion 130 and aft end 140 of the aircraft 100. The flexing and/or rotating can be due, for example, to the payload-receiving fixtures being moved at an angle and/or due to other payload-receiving fixtures with which the fixture is being used being moved at an angle.

A second payload-receiving fixture 212', 212 is provided for in FIG. 7 and FIGS. 2 and 9A-9B, respectively. The carriage 114', 114, wheel sets 113, and whiffle trees 115 are the same as discussed above with respect to the first payload-receiving fixture 112 (except as noted with respect to the carriage 114', 114), and thus can aid in both moving the receiver 218, and thus a payload 10 received by the receiver 218, and also help spread the weight of the payload 10 more evenly through the second payload-receiving fixture 212, 212'. Both the fixture 212' and the fixture 212 also include the same receiver 218. The primary difference between the two fixtures 212', 212 is that the fixture 212' includes a frame 116 that is incorporated into the carriage 114', supporting the receiver 218, while the fixture 212 is mounted directly to the carriage 114. Any known techniques for mounting or otherwise integrating the frame 116 or the receiver 218 to the carriage 114', 114 can be employed, whether provided for herein or otherwise known to those skilled in the art. In the embodiment illustrated in FIG. 7, the frame 116 replaces two bars of the frame 114*f* of the carriage 114', while in FIG. 9B, although no components are illustrated, a component like a clevis fitting and pins (see FIG. 13) or other flexible coupling mechanism can be used to couple the receiver 218 to the carriage 114. Use of a flexible coupling mechanism can allow for rotation of the receiver 218 of the second payload-receiving fixture 212 about the pivot axis $A_R$, in directions R and S, providing similar rotational flexibility and benefits as described with respect to other embodiments. Such rotational flexibility, and related benefit, can also be provided with respect the receiver 218 of the second payload-receiving fixture 212', for instance by using pins or the like to mount the receiver 218 to the frame 116—similar to the way a receiver 1018 is mounted to a frame 1016 as discussed below with respect to FIG. 12. In some embodiments, like that of FIG. 7, the mounting of the receiver 218 to the frame 116 can also allow for vertical translation in directions U and V, one such exemplary embodiment also being illustrated with respect to the receiver 1018 and frame 1016 illustrated in FIG. 12. A person skilled in the art will recognize various mounting configurations that can be used to allow for both the illustrated rotational and translational movement of the receiver 218 with respect to the frame 116, and thus the fixture 212' with respect to the rails 174, including but not limited to the mounting illustrated with respect to the receiver 1018 and frame 1016 of FIG. 12, hydraulics, and/or linear actuators. The vertical translation, like the rotation about the pivot axis $A_R$, can also allow for the blades 11A, 11B to flex, for example, when the blades 11A, 11B are being moved at an angle, such as when moving through kinked and aft portions of an interior cargo bay. The flexing and/or rotating can be due, for example, to the payload-receiving fixtures being moved at an angle and/or due to other payload-receiving fixtures with which the fixture is being used being moved at an angle. As described further below, such rotational and/or translational movements can be passive or active, and such movements can occur while the payload is being translated, or while it is stationary.

The receiver 218 is illustrated as a three-piece structure comprising a first piece 218*a*, also referred to as a base piece, a second piece 218*b*, also referred to as a main securing piece, and a third piece 218*c*, also referred to as a secondary securing piece. The pieces 218*a*, 218*b*, 218*c* can be coupled together using any techniques known to those skilled in the art (e.g., having threaded configurations, male-female adapters, etc.), but in the illustrated embodiment they can be fit together and affixed to form a secure connection therebetween. The receiver 218 is designed to be part of an intermediate payload-receiving fixture to receive an intermediate portion(s) of the payload 10. In the illustrated embodiment the payload 10 includes two wind turbine blades 11A, 11B, and the receiver 218 receives an intermediate portion of each of the two blades 11A, 11B. As shown, each of the first piece 218*a*, the second piece 218*b*, and the third piece 218*c* can be complementary to each other such that first, second, and third receiving surfaces, respectively, thereof can define a large receiving opening 217 configured to more generally receive a portion of a large structure, for example an intermediate portion of the wind turbine blade 11A. Further, the first piece 218*a* and the second piece 218*b* can be complementary to each other such that a fourth and fifth receiving surface, respectively, thereof can define a smaller receiving opening 219 also configured to more generally receive a portion of a large structure, for example an intermediate portion of the wind turbine blade 11B. Each portion of the large structure can be secured with respect to the receiver 218 using any techniques known to those skilled in the art. In the illustrated embodiment, the openings 217, 219 are sized and shaped (as shown, each has a tear-drop shape) in a manner that allows the intermediate portion of the blades 11A, 11B to be held secure enough with respect to the receiver 218 so they do not fall out of the openings 217, 219 while not sustaining any damage that would determinately impact their performance. Given the length of the blades 11A, 11B, there is little to no risk they will fall out of the openings 217, 219.

Similar to the receiver 118, the receiver 218 can include one or more additional holes or openings 218*h* (not all are labeled) formed therein. In the illustrated embodiment there are seven holes in the first piece 218*a* and four in the second piece 218*b*, although any other number of configurations, sizes, shapes, amounts, etc. are possible. The holes 218*h* can serve similar purposes and uses as described with respect to the holes 118*h* above.

In one exemplary technique for securing the wind turbine blades 11A, 11B with respect to the receiver 218, the base piece 218*a* can first receive one or both turbine blades 11A, 11B before receiving either of the securing pieces 218*b*, 218*c*. A surface area defined by the portion of the base piece 218*a* that defines the openings 217, 219 can be such that it adequately supports to blades 11A, 11B without having them easily fall off the receiver 218. Then the main receiving piece 218*b* can be coupled to the base piece 218*a* to both secure the location of the blade 11B with respect to the receiver 218 by causing it to become encircled by the portion of the receiver 218 that defines the opening 219, as shown fourth and fifth receiving surfaces of the first and second pieces 218*a*, 218*b*, respectively, and to provide a further support surface for the blade 11A. Subsequently the secondary securing piece 218*c* can be coupled to each of the base and main securing pieces 218*a*, 218*b* to secure the location of the blade 11A with respect to the receiver 218, encircling it with the portion of the receiver 218 that defines the opening 217, as shown first, second, and third receiving surfaces of the first, second, and third pieces 218*a*, 218*b*, 218*c*, respectively. Alternatively, the main and secondary securing pieces 218*b*, 218*c* can be coupled together first before both are coupled at about the same time to the first piece 218*a*. In some embodiments, the main and secondary securing pieces can be an integrally formed as a singular securing piece. In still other embodiments, one or both openings 217, 219 can be fully defined by the pieces 218*a*, 218*b*, 218*c* prior to receiving the blades 11A, 11B, and thus the blades 11A, 11B can be slid into place within the respective openings 217, 219. A person skilled in the art, in view of the present disclosures will understand many other configurations the receiver 218 can have, including fewer or more pieces, differently shaped and configured pieces, and/or fewer or more openings for receiving large structures of a payload.

To that end, and by way of non-limiting alternative example, a third payload-receiving fixture 312, 312' provided for in FIGS. 2 and 7, respectively, is mainly akin to the second fixture 212, 212', respectively. For example, the fixture 312' illustrated in FIG. 7 includes the carriage 114', wheel sets 113, whiffle trees 115, and frame 116 of fixture 212', but has a differently configured receiver 318. Likewise, the fixture 312 illustrated in FIG. 2 includes the carriage 114, wheel sets 113, and whiffle trees 115 of fixture 212, but has a differently configured receiver 218. The receiver 318 is also a three-piece structure comprising a first or base piece 318*a*, a second or main securing piece 318*b*, and a third or secondary securing piece 318*c*. The pieces 318*a*, 318*b*, 318*c* can be coupled together using any techniques known to those skilled in the art, but in the illustrated embodiment they can be fit together and affixed to form a secure connection therebetween. Like the receiver 218, the receiver 318 is designed to be part of an intermediate payload-receiving fixture to receive an intermediate portion(s) of the payload 10, e.g., intermediate portions of the two wind turbine blades 11A, 11B (not shown in FIG. 7). A bit different than the receiver 218, in this embodiment first and second receiving surfaces of the first and second pieces 318*a*, 318*b*, respectively, define a large receiving opening 317 while each of third, fourth, and fifth receiving surfaces of the first, second, and third pieces 318*a*, 318*b*, 318*c*, respectively, define a smaller receiving opening 319. The openings 317, 319 are configured and operate in a similar manner as the openings 217, 219 described above. Further, similar to both receivers 118 and 218, the receiver 318 can include one or more additional holes or openings 318*h* (not all are labeled) formed therein. In the illustrated embodiment there are six holes in the first piece 318*a* and three in the second piece 318*b*, although any other number of configurations, sizes, shapes, amounts, etc. are possible. The holes 218*h* can serve similar purposes and uses as described with respect to the holes 118*h* above. The fixture 318 can be mounted to the frame 116 in a manner akin to the fixture 218 and frame 116, thus allowing for both rotational movement about the pivot axis $A_R$ in the directions R and S, and translational movement in the directions U and V, for similar purposes and benefits as described herein.

In one exemplary technique for securing the wind turbine blades 11A, 11B (not shown in FIG. 7) with respect to the receiver 318, the base piece 318*a* can first receive the wind turbine blade 11B and then the main securing piece 318*b* can be coupled to the base piece to both secure the location of the blade 11B with respect to the receiver 318 by causing it to become encircled by the portion of the receiver 318 that defines the opening 317, as shown first and second receiving surfaces of the first and second pieces 318*a*, 318*b*, respectively, and to provide a further support surface for the blade 11A. Subsequently the secondary securing piece 318*c* can be coupled to each of the base and main securing pieces 318*a*, 318*b* to secure the location of the blade 11A with respect to the receiver 318, encircling it with the portion of the receiver 318 that defines the opening 319, as shown third, fourth, and fifth receiving surfaces of the first, second, and third pieces 318*a*, 318*b*, 318*c*, respectively. As described above, other configurations of receivers having multiple pieces are possible, and thus the embodiments illustrated with respect to the receivers 218 and 318 are just two, non-limiting embodiments.

A fourth payload-receiving fixture 412 is provided for in FIGS. 2 and 7. The fixture 412 includes the carriage 114', the frame 116, and a receiver 418. The carriage 114', and associated wheel sets 113 and whiffle trees 115, are akin to those described herein, as is the frame 116 that is integrated with the carriage 114'. The fixture 412, like the fixture 112, is designed to be a terminal end receiving fixture, and thus it is more akin to the receiver 118. For example, the receiver 418 is a three-sided structure that comprises a main receiving panel 418*m*, two side panels 418*s*, and an extension 418*c*. In the illustrated embodiment, the two side panels 418*s* extend non-orthogonally from the main panel 418*m* and the extension 418*c* is substantially planar with the main receiving panel 418*e*. Like the receiver 118, the main panel 418*m* includes a large receiving opening 417 more generally configured to receive a portion of a large structure, for example a terminal end of the wind turbine blade 11B that is its root or hub (not shown). The portion of the large structure can be secured with respect to the receiver 418 using any techniques known to those skilled in the art. In the illustrated embodiment, fasteners (e.g., screws) are passed into and through pre-formed holes 421 disposed around a circumference of the opening 417 in the main receiving panel 418*m*, into the hub of the wind turbine blade, to couple the wind turbine blade to the receiver 418. The extension further includes a small receiving opening 419 configured to receive a portion of a large structure, for example a terminal end of the wind turbine blade 11A that is its tip (not shown). The portion of the large structure can also be secured with respect to the receiver 418 using any techniques known to those skilled in the art, similar to the opening 119 of the fixture 118. Further, similar to the receivers 118, 218, and 318, the receiver 418 can include one or more additional holes or openings 418*h* (not all are labeled or visible; a second one on the main panel 418*m* can be present as a mirror image of the one that is labeled) formed therein. In the illustrated embodiment there are two holes in the main panel 418*m* and one hole in the extension 418*e*, although any other number of configurations, sizes, shapes, amounts, etc. are possible. The holes 418*h* can serve similar purposes and uses as described with respect to the holes 118*h* above. The fixture 418 can be mounted to the frame 116 using several techniques known to those skilled in the art, including those described below with respect to FIGS. 17A and 17B. In at least some embodiments, the connection between the fixture 418 and the frame 116 can be such that it allows for both rotational movement about the pivot axis $A_R$ in the directions R and S, and translational movement in the directions U and V, for similar purposes and benefits as described herein.

FIGS. 10A-13 provide for additional configurations of payload-receiving fixtures that can be incorporated with and/or used in conjunction with the various payload transportation systems (e.g., the system 20), transporters (e.g., the transporters 22, 22', 722, 822), and support spans (e.g., trusses 24) provided for herein or otherwise derivable from the present disclosures. The illustrated payload-receiving fixtures 512, 612, 1012, and 912, can be used in lieu of or in addition to the payload-receiving fixtures described above or elsewhere in conjunction with such systems, transporters, and support spans. The fixtures 512, 612, 1012, and 912, like the others described herein, can be adapted to travel and adjust as passing along an angled floor, such as the floor 172 extending from the forward end 172*f*, through the kinked portion 172*k*, and into and sometimes through a majority or a substantial majority of the aft end 172*a* of the aircraft 100.

Figure 10A:
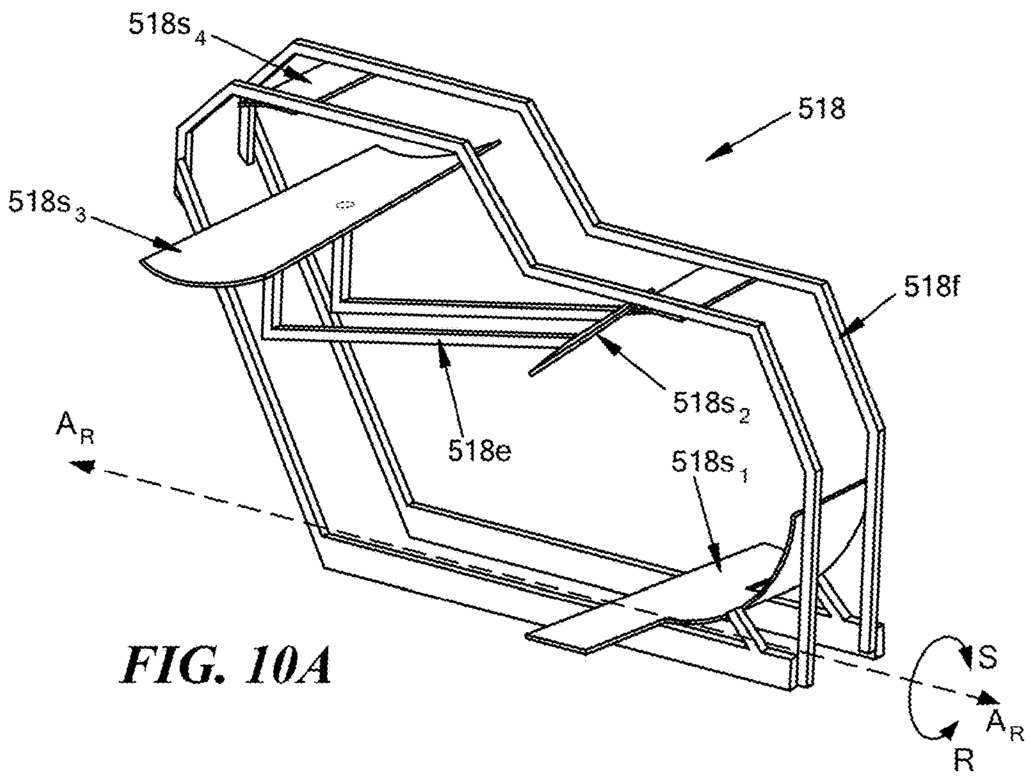
FIG. 10A is an isometric view of another exemplary embodiment of a receiver of a payload-receiving fixture.
Figure 10B:
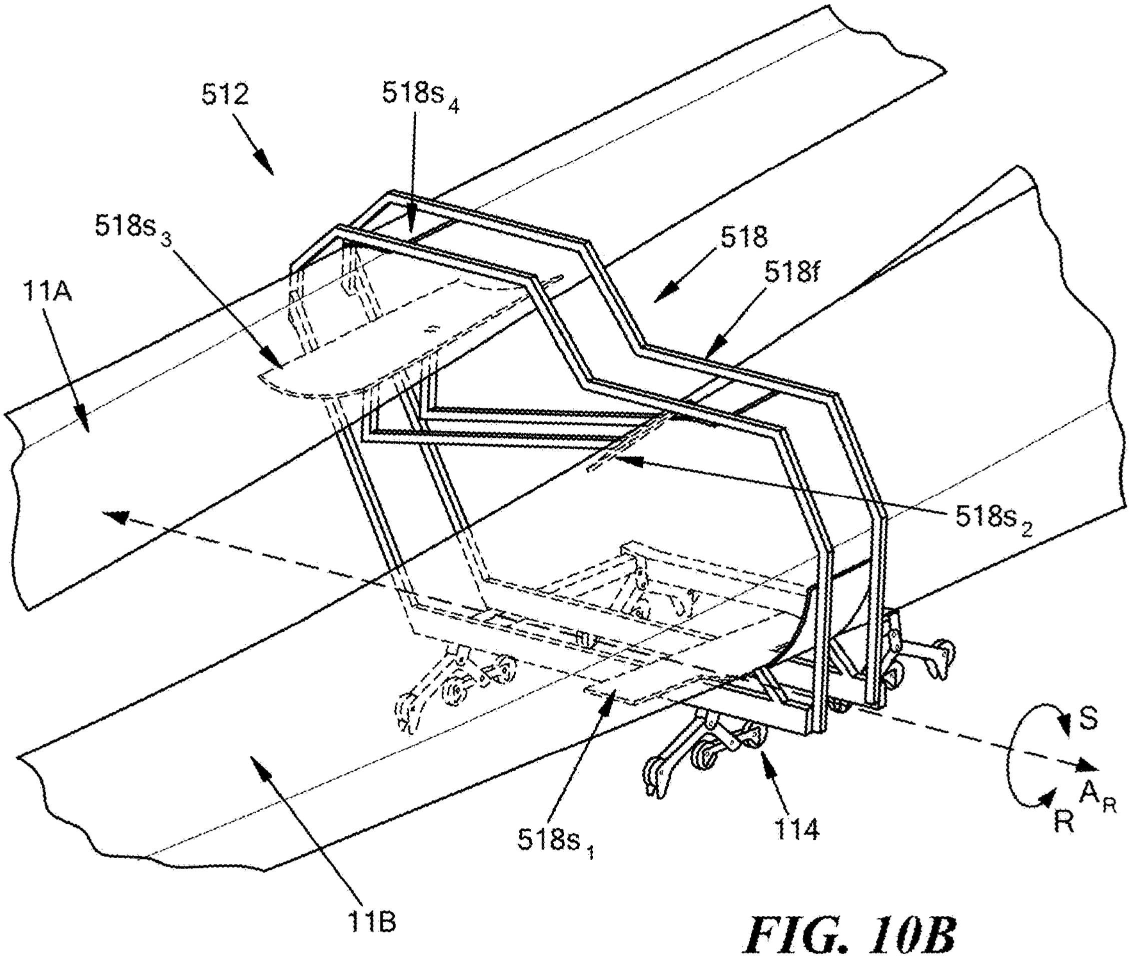
FIG. 10B is an isometric view of the receiver of FIG. 10A receiving two wind turbine blades, the receiver being part of a payload-receiving fixture.

FIGS. 10A and 10B illustrate an alternative embodiment of a payload-receiving fixture 512 that includes a receiver 518 coupled to the carriage 114 and that is configured to receive two wind turbine blades 11A, 11B. The receiver 518 can include a frame 518*f* having a first receiving surface 518$s_1$ and a second receiving surface 518$s_2$ associated therewith, and an extension 518*e* coupled to the second receiving surface 518$s_2$. The extension 518*e* can include a third receiving surface 518$s_3$, and a fourth receiving surface 518$s_4$ can be associated with the frame 518*f*. As shown in FIG. 10B, the first and second receiving surfaces 518$s_1$, 518$s_2$ can be configured to receive a second wind turbine blade 11B and the third and fourth receiving surfaces 518$s_3$, 518$s_4$ can be configured to receive a first wind turbine blade 11A. One or both of the first and second surfaces 518$s_1$, 518$s_2$ can be spring-loaded and/or bias inwards (i.e., towards the opening in which the blade can be secured) to help secure a location the wind turbine blade 11B with respect to the receiver 518. Likewise, one or both of the third and fourth surfaces 518$s_3$, 518$s_4$ can be spring-loaded and/or bias inwards (i.e., towards the opening in which the blade can be secured) to help secure a location of the wind turbine blade 11A with respect to the receiver 518. In the illustrated embodiment the extension 518*e* is bias towards the fourth receiving surface 518$s_4$ by the way it is coupled to the opposed side of the portion of the frame 518*f* that provides the second receiving surface 518$s_2$. Similar to other receivers of the present disclosure, the receiver 518 can be coupled to the frame 114 using any number of techniques known to those skilled in the art. In at least some embodiments, the connection therebetween can allow for rotation about the pivot axis $A_R$ in the R and S directions. Further, the flexibility associated with the various receiving surfaces 518$s_1$, 518$s_2$, 518$s_3$, 518$s_4$ can also enable beneficial movement like the movement in the R and S directions as described within the present disclosures. A person skilled in the art will recognize other configurations in which the various receiving surfaces can selectively be associated with the frame 518*f* and/or one or more extensions like the extension 518*c*.

Figure 11A:
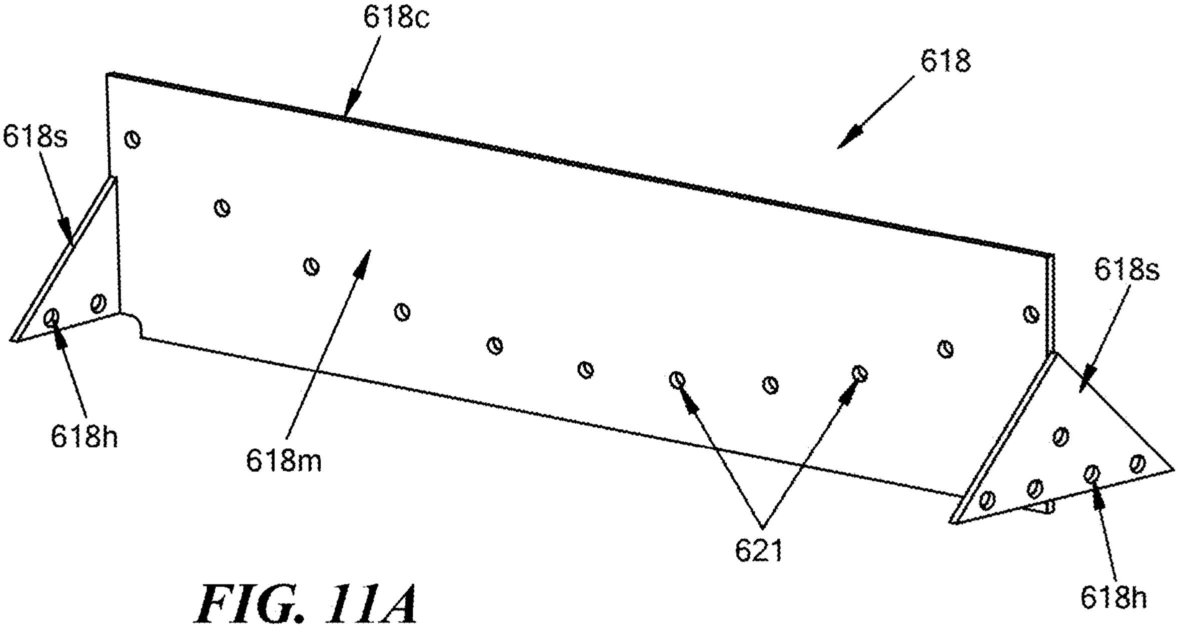
FIG. 11A is an isometric view of yet another exemplary embodiment of a receiver of a payload-receiving fixture.
Figure 11B:
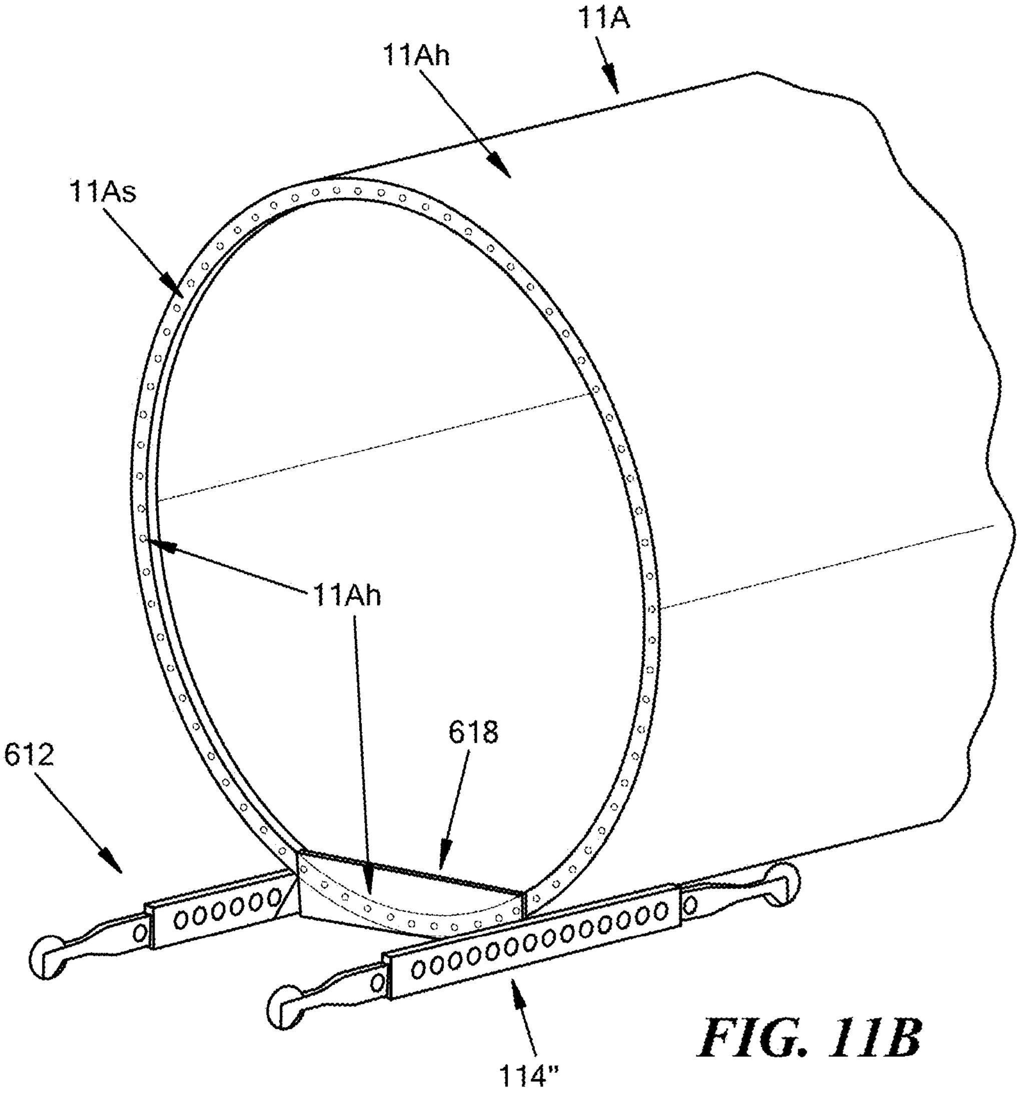
FIG. 11B is an isometric view of the receiver of FIG. 11A receiving a root of a wind turbine blade, the receiver being part of a payload-receiving fixture.

Another alternative embodiment of a payload-receiving fixture 612 is illustrated with respect to FIGS. 11A and 11B, with the fixture 612 including a receiver 618 coupled to an alternative carriage 114". Alternatively, the receiver 618 can be used with, or incorporated directly into, the carriage 114 or other carriage configurations. The carriage 114" is described further below with respect to FIG. 15A. This payload-receiving fixture 612, like the payload-receiving fixtures 112, 412, is configured to be a terminal end receiving fixture. As shown the receiver 618 of the fixture includes a crossbar 618*c* that is configured to extend between opposed side of the carriage 114" and to receive a terminal end of a large structure, like a terminal end of the wind turbine blade 11A that is its root or hub 11Ah. A plurality of pre-formed holes 621 can be formed through opposed main surfaces 618*m* of the crossbar 618*c*. The holes 621 can be complementary to pre-formed holes 11Ah formed in a terminal facial surface 11As of the hub 11Ah such that fasteners (e.g., screws) can be used to mate the hub 11Ah to the main surface 618*m* of the crossbar 618*c*. The receiver 618 can be mated to the carriage 114" in a variety of ways, but in the illustrated embodiment the receiver 618 includes connecting surfaces 618*s* that are disposed on opposite sides of the crossbar 618*c*, substantially perpendicular to the crossbar 618*c*. One or more mating holes 618*h* can be formed therein for mating to the carriage 114", such as by using fasteners to connect the connecting surfaces 618*s* to the carriage 114".

Figure 12:
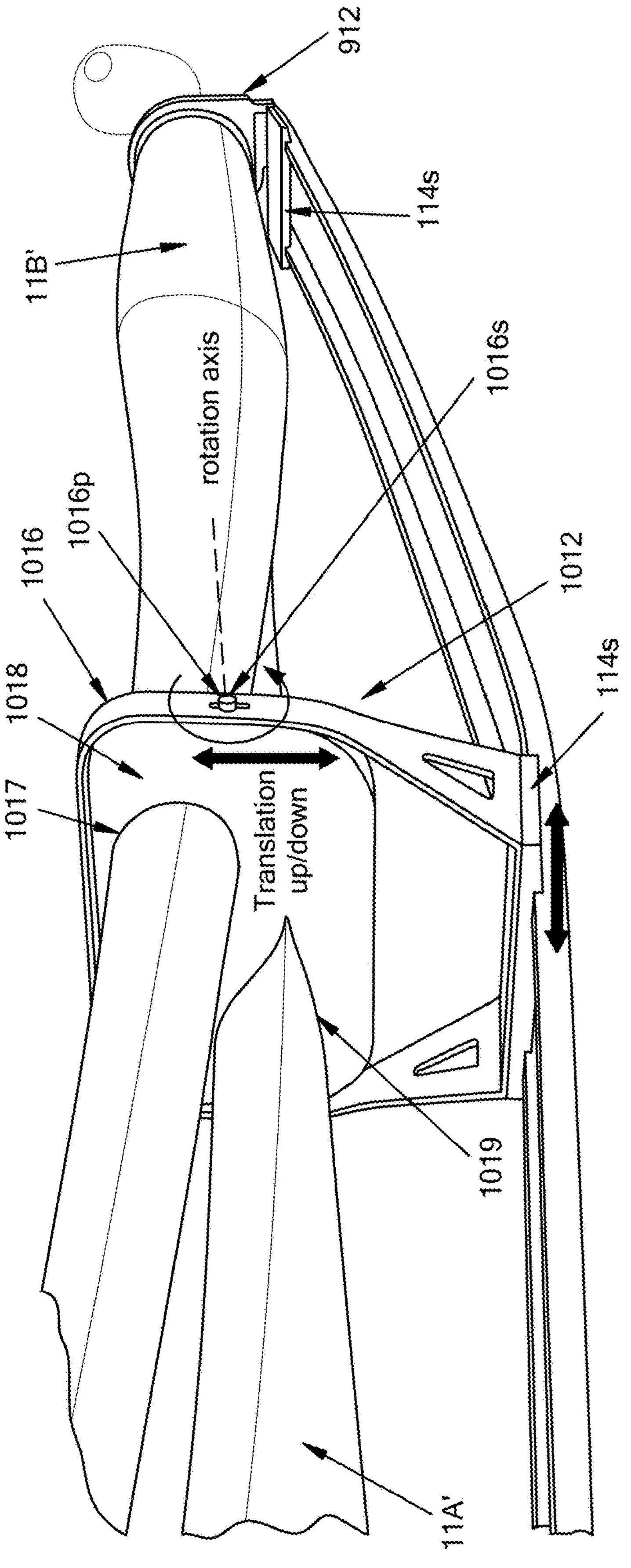
FIG. 12 is an isometric view of another exemplary embodiment of a payload-receiving fixture.

FIG. 12 illustrates yet another alternative embodiment of a payload-receiving fixture 1012. The fixture 1012 is designed to receive an intermediate portion of a large payload (e.g., the wind turbine blades 11A', 11B'). The fixture 1012 includes a frame 1016 and a receiver 1018 having two openings 1017, 1019 adapted to receive intermediate portions of the wind turbine blades 11A', 11B'. The receiver 1018 can be mounted to the frame 1016, for example by way of a pin 1016*p*, thereby allowing the receiver 1018 to rotate about the illustrated rotation axis as shown in FIG. 12. The frame 1016 can also include a slot 1016*s* formed therein in which the pin 1016*p* is disposed, thereby allowing the receiver 1018 to translate vertically as shown in FIG. 12. The receiver 1018 can be coupled to one or more spreader bars 114*s*, which serve a similar purpose as the carriages 114, 114', 114" provided for herein, using techniques known to those skilled in the art, including a fixed or rotatable coupling.

Figure 13:
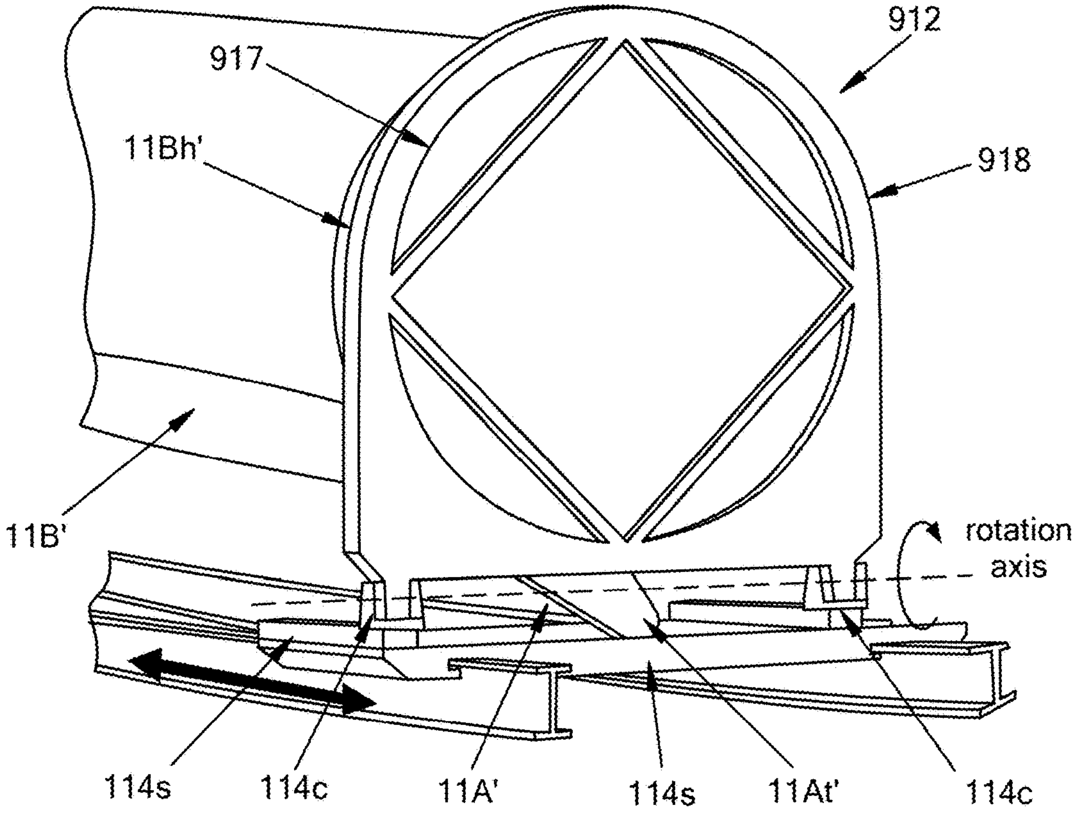
FIG. 13 is an isometric view of still another exemplary embodiment of a payload-receiving fixture.
Figure 19A:
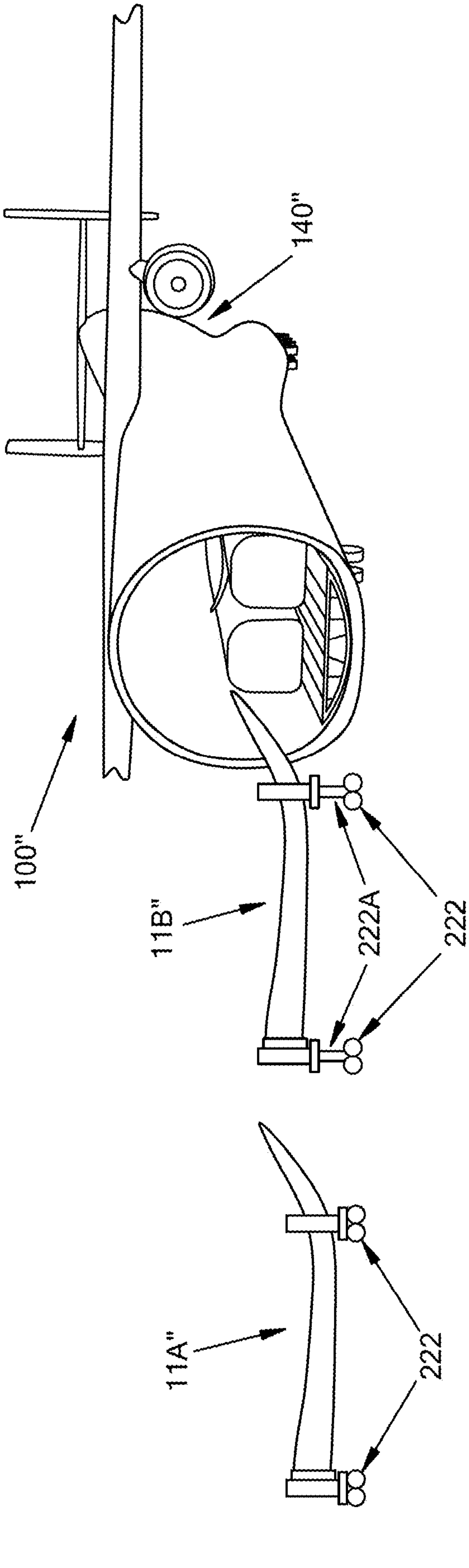
FIG. 19A is a schematic illustration of one exemplary embodiment of a payload transportation system one of loading or unloading a payload onto or off an aircraft.

Still another alternative embodiment of a payload-receiving fixture 912 is illustrated in FIG. 13 (it is also visible in FIG. 12). The fixture 912 is designed to receive terminal ends of large payloads (e.g., wind turbine blades 11A', 11B'). The fixture 912 includes a receiver 918 having a large opening 917 to receive a large structure, such as a root or hub 11Bh' of the wind turbine blade 11B' (FIG. 19A). Although not illustrated, in view of the earlier disclosures, the receiver 918 can also be adapted to receive a distal terminal end or tip 11At' of the other blade 11A', or other terminal ends of other blades. The receiver 918 can be flexibly coupled to one or more spreader bars 114*s*. The rotatable coupling is provided by two clevis fittings 114*c* and corresponding pins, allowing the receiver 918 to rotate about the illustrated rotation axis as shown in FIG. 19A, for example, when the receiver 918 is moving at an angle through kinked and aft portions of an interior cargo bay.

A person skilled in the art will recognize that the various payload-receiving fixtures (e.g., 112, 212, 212', 312, 312', 412, 512, 612, 712, 812, 912, 1012) disclosed herein are a small subset of the possible fixtures that can be designed, developed, and/or used in conjunction with the payload transportation systems (e.g., the system 20), transporters (e.g., the transporters 22, 22', 722, 822), and supporting spans (e.g., the trusses 24) in view of the present disclosures, and thus the present application is by no means limited to use with only the fixtures disclosed herein. Payload-receiving fixtures, in view of the present disclosures, can come in many other sizes, shapes, and configurations, and can be adapted for receiving any type of structure, including large structures. The transportation of wind turbine blades represents merely one exemplary use of such fixtures.

Further, while in the illustrated embodiments the various payload-receiving fixtures (e.g., 112, 212, 212', 312, 312', 412, 512, 612, 712, 812, 912, 1012) and receivers (118, 218, 218', 318, 418, 518, 618, 718, 818, 918, 1018) are generally designed to hold two wind turbine blades, a person skilled in the art will recognize those payload-receiving fixtures and/or receivers, or other payload-receiving fixtures and/or receivers, can be configured to hold other numbers of wind turbine blades, including one, three, four, five, or even more. As designed, the payload-receiving fixtures and wind turbine blades can be packaged in a repetitive, repeatable manner, which can be helpful, for example, in maintaining a consistent center of gravity each time the same wind turbine blades are packaged. Such packaging can be done in a manner that provides a compact volume of the irregular payload.

Still further, while the payload transportation systems, transporters, support spans, and payload-receiving fixtures, among other components, provided for herein are illustrated for use in conjunction with wind turbine blades, a person skilled in the art will recognize such systems, transporters, spans, and fixtures, among other components, can be used, re-designed, adapted, etc. for use with other large structures, including but not limited to industrial oil equipment, mining equipment, rockets, military equipment and vehicles, defense hardware, commercial aerospace vehicles, crane segments, aircraft components, space launch rocket boosters, helicopters, generators, or hyperloop tubes. Additionally, the various aspects of the systems, transporters, spans, payload-receiving fixtures, and/or other components associated therewith (e.g., carriages, frames, receivers, actuators, etc.) can be provided as a transport kit to allow for these various items to be selected for particular uses, designs, and functions in a plug-and-play manner. At least some of the transporters, fixtures, and/or their components can have common interface features amongst themselves and/or with respect to the aircraft in which it is loaded to further enhance the plug-and-pay ability. The transporters and/or payload-receiving fixtures themselves can be pre-designated for particular structures (e.g., wind turbine blades) and/or particular locations with respect to such structures (e.g., a terminal end, an intermediate—possibly designated—position).

Figure 14:
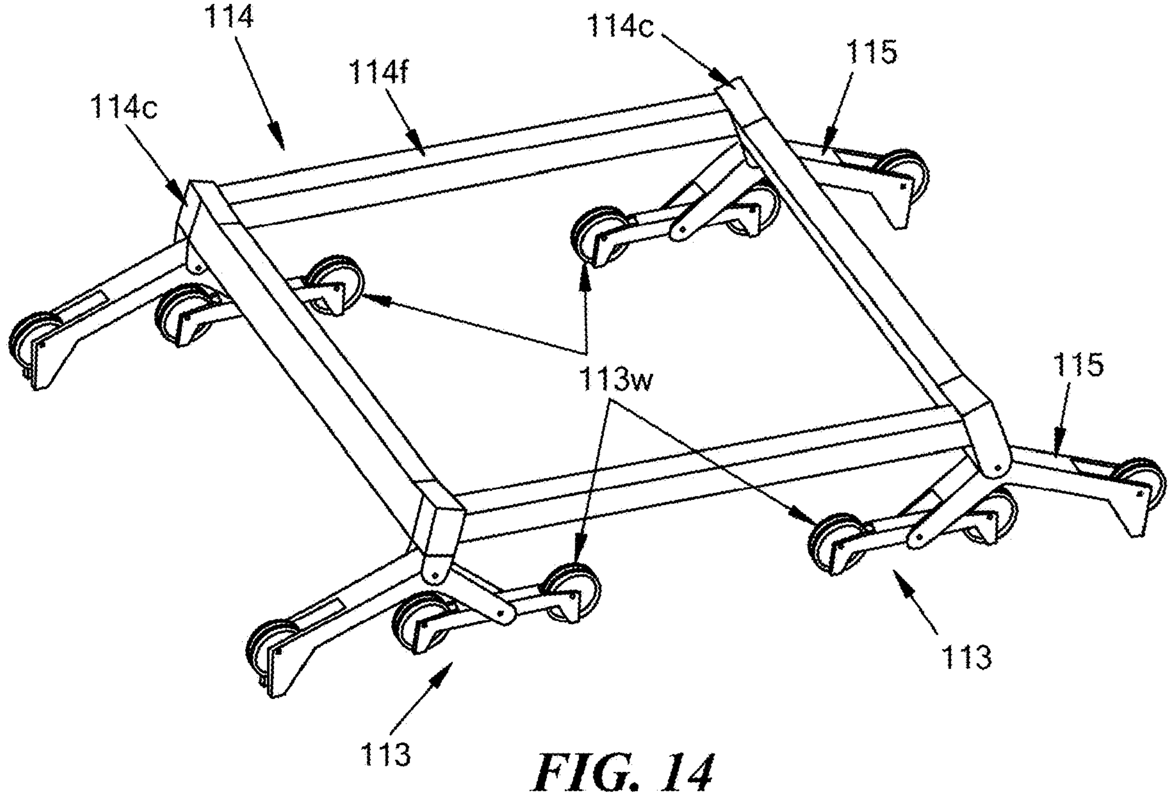
FIG. 14 is an isometric top view of a carriage of the payload-receiving fixture of FIG. 8B.

The carriage 114 is illustrated in FIG. 14. The carriage can include a rectangular frame 114*f* that can bear weight of payload distributed thereto and spread the weight throughout the frame 114*f*. A person skilled in the art will recognize other shapes and configurations of the frame that can be used without departing from the spirit of the present disclosure. A wheel set 113 can be flexibly coupled to each corner of the frame 114*f* by way of a flexible coupling 114*c*. In the illustrated embodiment, each wheel set 113 includes three wheels 113*w*, the wheels 113*w* being linearly disposed with respect to each other in each set 113. Fewer or more wheels can be provided per wheel set, the number of wheels pre wheel set do not have to be the same, and the wheels or wheel sets can be disposed at other locations along the frame 114*f*. The wheels 113*w* generally are configured to engage with a surface, such as the positioning surface 22*p* of the transporter 22, or other transporters provided for herein or otherwise derivable from the present disclosures, and/or rails 174, to translate along the surface. The flexible coupling 114*c* between the frame 114 and each wheel set 113 can allow for flexibility as the payload is moved along a surface.

As shown, each wheel set 113 includes a whiffle tree 115 that extends from the carriage 114 to couple the wheels 113*w* to the carriage 114, both keeping some wheels as part of a wheel set, and further assisting in distributing load from the payload more evenly across the payload-receiving fixture with which the carriage 114 is used. The whiffle trees 115 substantially uniformly distribute vertical forces from a large payload to the wheels 113*w*. Although the illustrated embodiment shows wheels as the means for translating the frame, a person skilled in the art will recognize that other means for translation can be used in lieu of or in addition to wheels and wheel sets in any of these embodiments, including but not limited to skis, skids, linked tracks (e.g., tractor tracks, military tank tracks), articulated legs, air cushions in the manner of a hovercraft, or other structures that allow for translation between two structures.

Generally, any of the fixtures provided for in the present disclosure can translate along the positioning surface 22*p* of the transporter 22, or other transporters provided for herein or otherwise derivable from the present disclosures, and/or rail(s) 174, with rolling and sliding being interchangeably used and more generally being considered translation or advancement of the fixture.

Figure 15A:
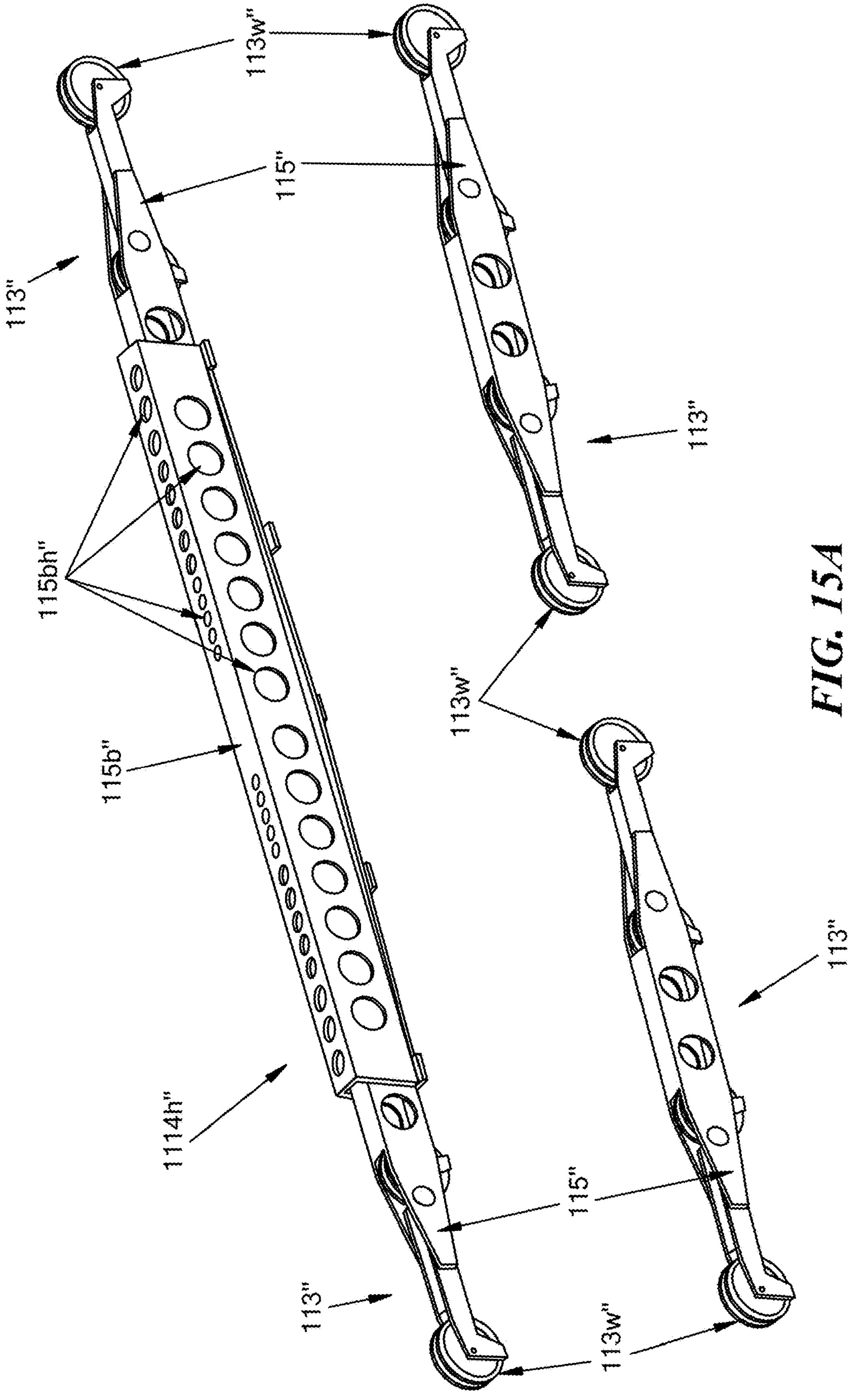
FIG. 15A is an isometric view of part of a carriage of the payload-receiving fixture of FIG. 11B, illustrating the part of the carriage with and without a brace disposed between two sets of wheels.

FIG. 15A illustrates one half of another embodiment of a carriage, the carriage 114". Similar to the carriage 114, the half 114*h"* of the carriage 114" illustrated includes a plurality of wheel sets 113', with wheels 113*w'* of the wheel sets 113' being coupled together by a whiffle tree 115" in a linear configuration. The wheel sets 113" and whiffle trees 115" provide similar benefits as discussed above. As shown, two whiffle trees 115", and thus two wheel sets 113", can be coupled together by a rectangular brace 115*b*". The rectangular brace 115*b"* can itself act as a whiffle tree, and thus provide similar benefits as a whiffle tree. A plurality of holes or openings 115*bh"* are provided in the various surfaces of the brace 115*b'* as illustrated, as are a plurality of holes or openings 115*h"* in the whiffle trees 115". The holes 115*bh*", 115*h*". The can serve similar purposes and uses as described with respect to the holes 118*h* above. As shown in FIG. 11B, two of the carriage halves 114*h"* can be used in conjunction with each other to form the carriage 114", the two halves 114*h"* being linked by the crossbar 618 or other known structures for coupling two separate whiffle tree configurations.

Figure 15B:
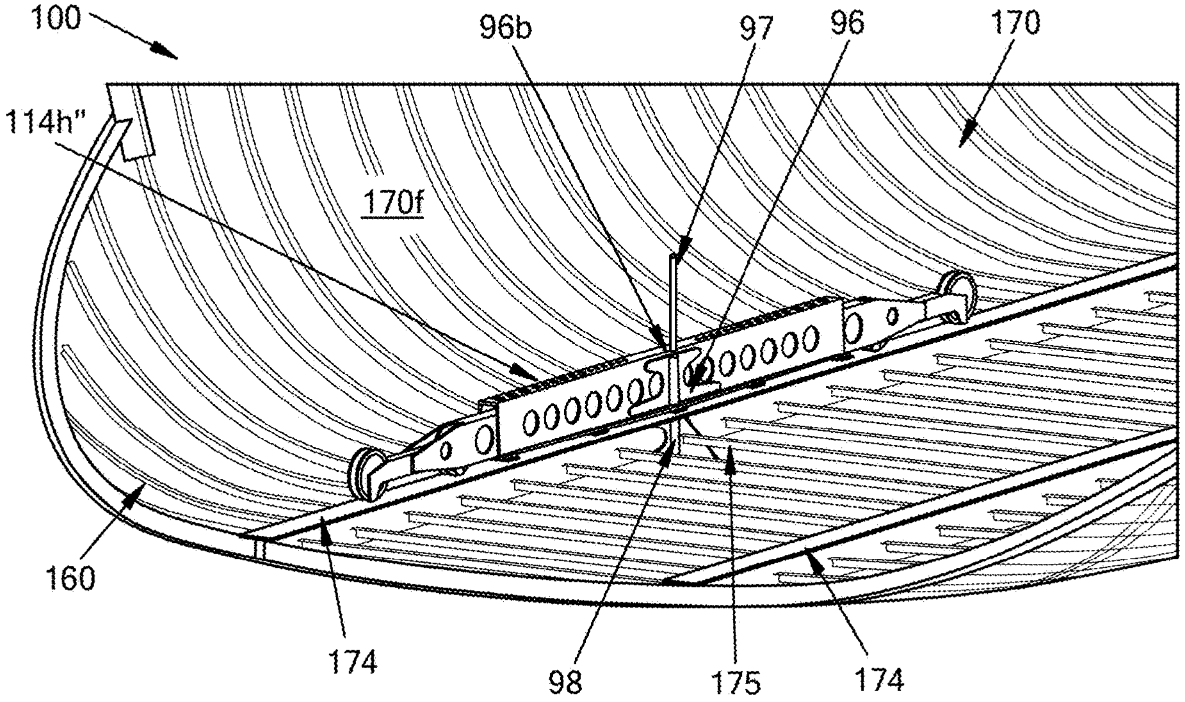
FIG. 15B is an isometric view of one exemplary embodiment of the part of the carriage of FIG. 15A being disposed in an interior cargo bay and in an unattached position.
Figure 15C:
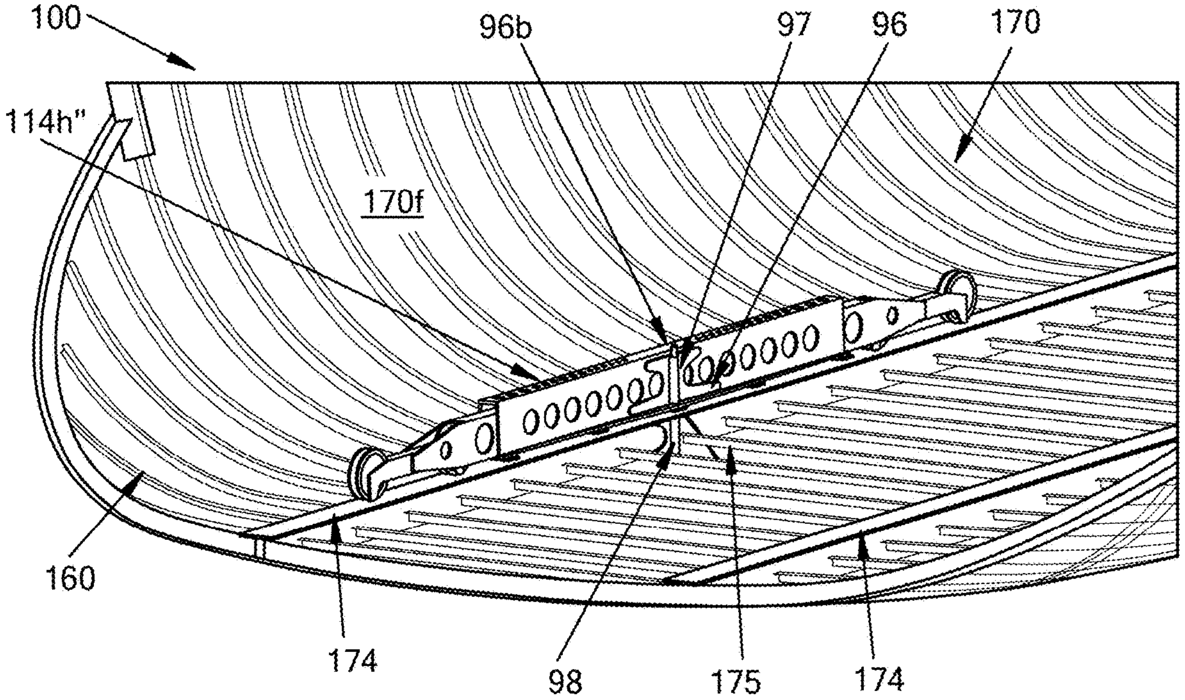
FIG. 15C is an isometric view of the part of the carriage of FIG. 15B disposed in the interior cargo bay and in a mounted position.

FIGS. 15B and 15C illustrate one exemplary way by which the carriage half 114*h*", and thus the carriage 114", can be secured inside a cargo bay of an aircraft. As shown, the carriage half 114*h"* is disposed along the rail 174 of the cargo bay 170 of the aircraft 100. The carriage half 114*h"* can translate along the rail 174 as described herein. When it reaches a desired location, as shown here, in the forward end 170*f* of the cargo bay 170 with a portion of the carriage 114*h"* disposed on the cantilevered tongue 160, it can be secured by way of a mounting plate 96 coupled to the carriage half 114*h"* and a locking pin 97. More particularly, as shown, the mounting plate 96 can be disposed on one of two opposed main surfaces 115*m'* of the rectangular brace. The mounting plate 96 includes a bore 96*b* extending longitudinally therethrough. The bore 96*b* can be aligned with a bore 98*b* (FIG. 16) of a hardpoint fitting 98 coupled to the rail 174 or otherwise disposed in the cargo bay. The locking pin 97 can be driven into both bores 96*b*, 98*b* to secure the location of the carriage half 114*h"* with respect to the rail 174. When further transportation of the carriage half 114*h"* is desired, such as when unloading the cargo from the aircraft 100, the locking pin 97 can be removed from the hardpoint fitting 98 and/or the carriage half 114*h*", thereby permitting movement of the carriage half 114*h"* with respect to the rail 174. Notably, although the carriage half 114*h"* is described in this context as half of a carriage, in other embodiments it can be a standalone carriage that is configured, perhaps in conjunction with other carriage halves disposed linearly along a length of a payload to be transported, to translate a payload through at least a portion of a cargo bay of an aircraft. Further, these teachings are equally applicable to the payload transportation system 20, transporters 22 (or others provided for herein), and/or support spans, either due to the carriage 114" or carriage half 114*h"* being coupled to the transporters and/or support spans and/or because the same concept is applied to bodies or frames of one or more of the transporters or support spans.

Figure 16:
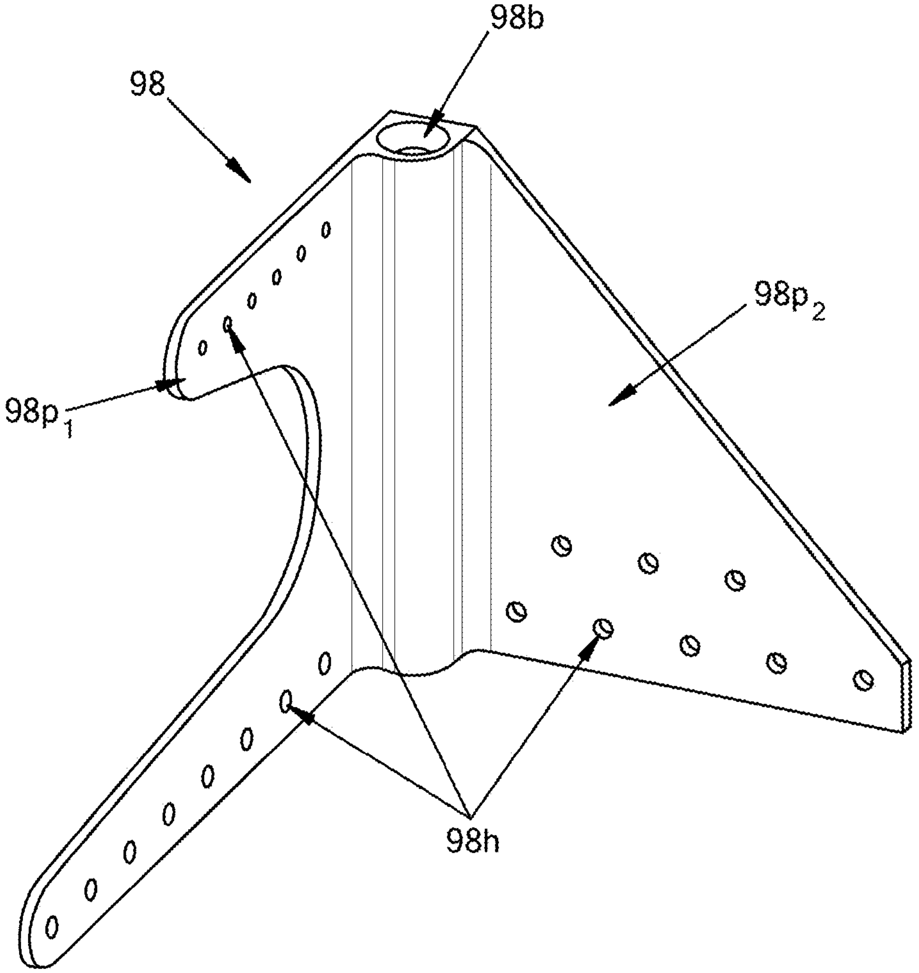
FIG. 16 is an isometric view of one exemplary embodiment of a hardpoint fitting for securing at least one of a payload, a payload-receiving fixture, or a vehicle of a payload transportation system to an interior cargo bay.

A non-limiting exemplary embodiment of the hardpoint fitting 98 is illustrated in FIG. 16. The bore 98*b* for receiving the locking pin 97 extends throughout a length of hardpoint fitting 98. Plates 98$p_1$, 98$p_2$ extend substantially perpendicular to each other from the portion of the fitting 98 that forms the bore 98*b*, allowing the hardpoint fitting 98 to be mounted to substantially perpendicular structures within the interior cargo bay 170—as shown in FIGS. 15B and 15C, the rail 174 and a cross beam 175. The plates 98$p_1$, 98$p_2$ can have a variety of configurations, and can be adapted for the surface(s) to which they will be connected. For example, the plate 98$p_1$, which includes a more curved profile, is configured to attach to the rail face, with two lines of bolts (via bores 98*b*) being used to react the load and a moment about the vehicle pitch axis, while the plate 98$p_2$, which has a more triangular-shaped profile, is configured to attach to a fuselage transverse plane, which may be less tall than the rail. Various bores 98*b* (not all labeled) can be formed therein to assist in mounting the hardpoint fitting 98 within the cargo bay 170. Any number of hardpoint fittings 98 (or other configurations of hardpoint fittings) can be provided throughout the entirety of the interior cargo bay 170, and they can be placed in desirable locations for securing cargo, including payload transportation systems and/or components thereof (e.g., transporters, support spans) within the bay 170. Different hardpoint fittings can be designated for use with different types and sizes of cargos. The illustrated hardpoint fitting 98 is but one example. In some embodiments, there can be approximately in the range of about 20 hardpoint fittings to about 40 hardpoint fittings within the interior cargo bay 170, although more or less is possible as well. In alternative embodiments, some portion of the payload can be directly coupled to the hardpoint fittings 98, rather than via payload-receiving fixtures. A person skilled in the art, in view of the present disclosures, will understand other ways by which a payload and/or payload transportation systems, and/or components thereof (e.g., transporters, support spans) can be secured within the interior cargo bay 170, including by various attachment mechanisms known to those skilled in the art that can be used or otherwise adapted for use with the rail 174 and/or one or more attachment mechanisms known to those skilled in the art that can be placed in the interior cargo bay and used to secure the location of the payload with respect to the interior cargo bay 170.

Figure 17B:
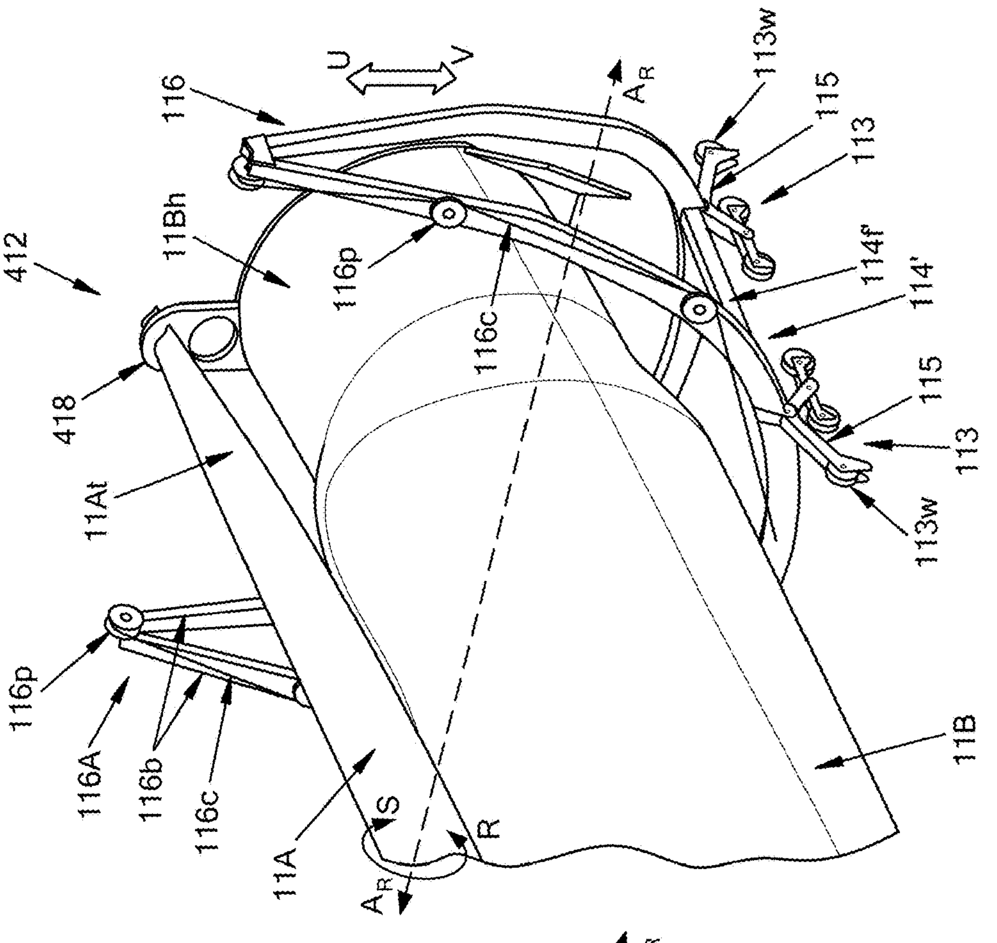
FIG. 17B is an isometric view of the payload-receiving fixture of FIG. 15A receiving two wind turbine blades.
Figure 17A:
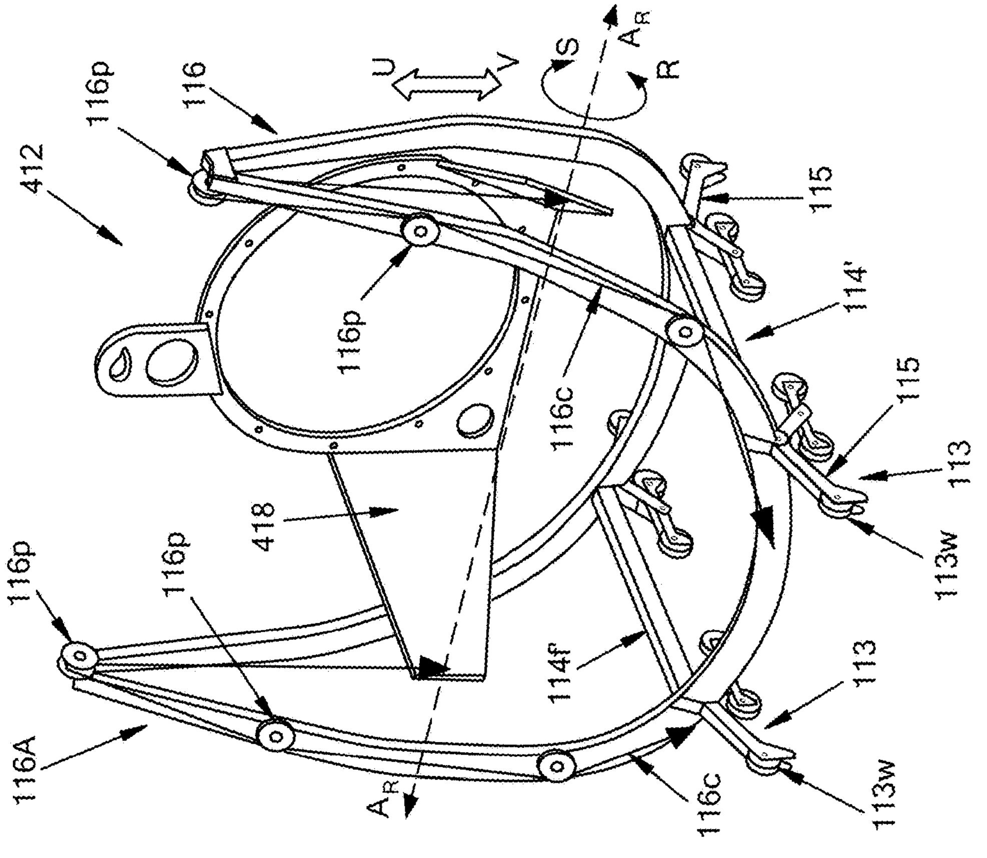
FIG. 17A is an isometric view of a payload-receiving fixture of the plurality of payload-receiving fixtures of FIG. 7, the payload-receiving fixture further including an actuator that couples a receiver with a frame.

FIGS. 17A and 17B illustrate the frame 116 having the receiver 418 associated therewith to form the payload-receiving fixture 412. As shown, the frame 116 comprises two vertically-disposed, U-shaped bars 116*b* proximate to each other at a top portion, and separating themselves laterally as the extend downwards. The bars 116*b* extend vertically away from wheels 113*w* of the wheel sets 113 and the whiffle trees 115 and towards each other, where they can meet at their terminal ends. An opening extending laterally, lateral being defined in the same direction that the illustrated pivot axis $A_R$ extends, can be the area in which the receiver 418, and thus the area in which terminal ends of large cargo can be disposed—as illustrated a distal tip 11At of the wind turbine blade 11A and a root or hub 11Bh of the wind turbine blade 11B. Coupled to the frame 116 can be an actuator 116A, the actuator including a plurality of pulleys 116*p* and two cables 116*c*, the cables 116*c* mounting the receiver 418 with respect to the frame 116. Alternatively, a single cable, or more than two cables, can be used. The pulley-and-cable configuration can provide movement of the receiver 418 to adjust the position of the payload-receiving fixture with which the receiver 418 is included. More particularly, it can allow the receiver 418 to translate vertically in the directions U and V and rotationally about the pivot axis $A_R$ in the directions R and S, similar to other configurations described above. The benefits of such movement are similar as well. Other mechanisms and configurations for creating such rotational and/or translational movement can be used in alternative embodiments. The frame 116 can be coupled to a carriage, such as the carriage 114, using a variety of techniques, but in the illustrated embodiment it is integrated directly with the carriage 114' such that the frame 116 replaces two beams of the frame **114*f'* of the carriage 114'**.

The actuators 116A, 722A, 822A provide some non-limiting embodiments of ways by which the payload-receiving fixtures can be positioned to desirably position the payload associated with payload-receiving fixtures. Other movements can be achieved using known techniques for causing rotational and translational actuation can be used, including ball screws, hydraulic/pneumatic pistons, pulleys, gears or rack-and-pinions, thermal or magnetic actuators such as shape-memory alloys, and/or electromechanical actuators. Further, such movements can be selectively active or passive. For example, with respect to an active movement, one or more of the payload-receiving fixtures and/or the payload (it is noted that the payload can be interpreted to include or not include the fixtures as appropriate) can be monitored, for instance by a location and/or pressure sensor, and in response to one or more designated parameters or other cues (e.g., visual, tactile), action can be taken to rotate or vertically translate the payload-receiving fixture(s) as desired. The input to take the action can be manual, e.g., by a person locally or monitoring remotely, or automated, by a program that acts in response to the designated parameter(s). Alternatively, or additionally, with respect to passive movement, one or more of the payload-receiving fixtures can be designed to automatically mechanically rotate or vertically translate as a result of a change in conditions, such as translating the payload-receiving fixture(s) and payload through the kinked portion 130 and the aft end 140 of the aircraft 100. In this type of instance, certain movements, such as part of the payload rising up as it becomes disposed in the aft end 140, may cause one or more fixtures to rotate and/or vertically translate.

Loading and Unloading Large Cargo

While methods of loading and unloading cargo in conjunction with the present disclosure should be clear to a person skilled in the art in view of the above disclosures, for the sake of completeness, methods of loading large cargo onto an aircraft using the payload transportation system 20 is described with respect to FIGS. 18A-18E.

The cargo aircraft 100 can be opened, such as by swinging the cargo nose door 126 upwards into its open position, exposing the portion of the interior cargo bay 170 associated with the fixed portion 128 of the fuselage 101, which can extend through the kinked portion 130 and through essentially the entirety of the aft end 140. The cargo opening 171 provides access to the interior cargo bay 170, and the cantilevered tongue 160 can be used to help initially receive the payload and/or the payload transportation system transporting the payload onto the aircraft 100. As shown, the payload 10 includes the two wind turbine blades 11A, 11B, held with respect to each other by payload-receiving fixtures 12 (i.e., the payload receiving fixtures 112, 212, 312, 412).

Figure 18A:
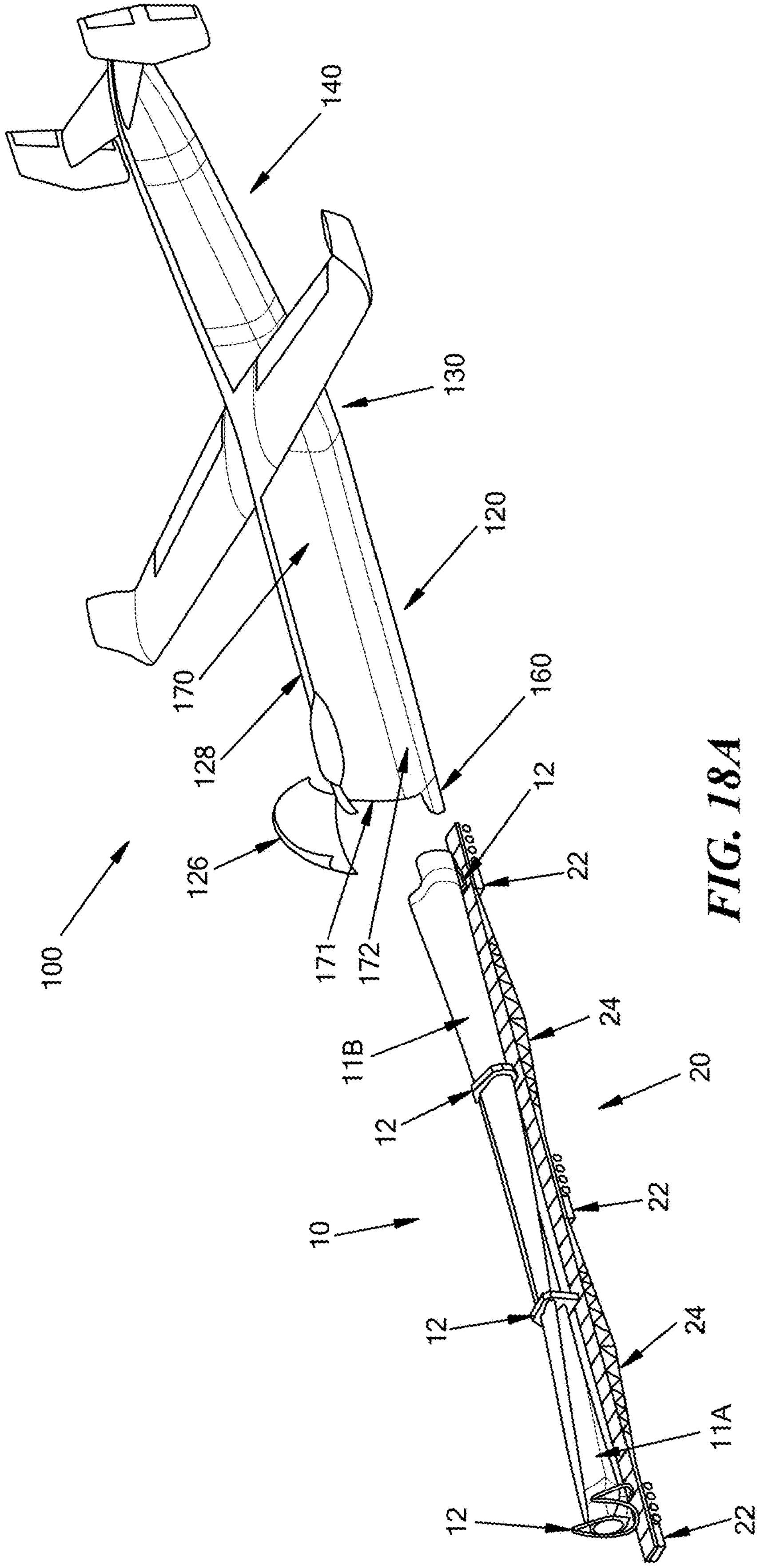
FIG. 18A is an isometric, partial cross-sectional view of the aircraft of FIG. 1C with the payload transportation system and payload of FIG. 2 being disposed proximate to the aircraft for loading into the interior cargo bay of the aircraft.

The payload transportation system 20 can be driven proximate to the nose cone door 126 for subsequent delivery of the payload disposed thereon into the cargo bay 170, as shown in FIG. 18A. The system 20, which as shown includes transporters 22 and trusses 24, can be operated to arrive at this location using techniques provided for herein or otherwise known to those skilled in the art for controlling movement of a vehicle(s).

Figure 18B:
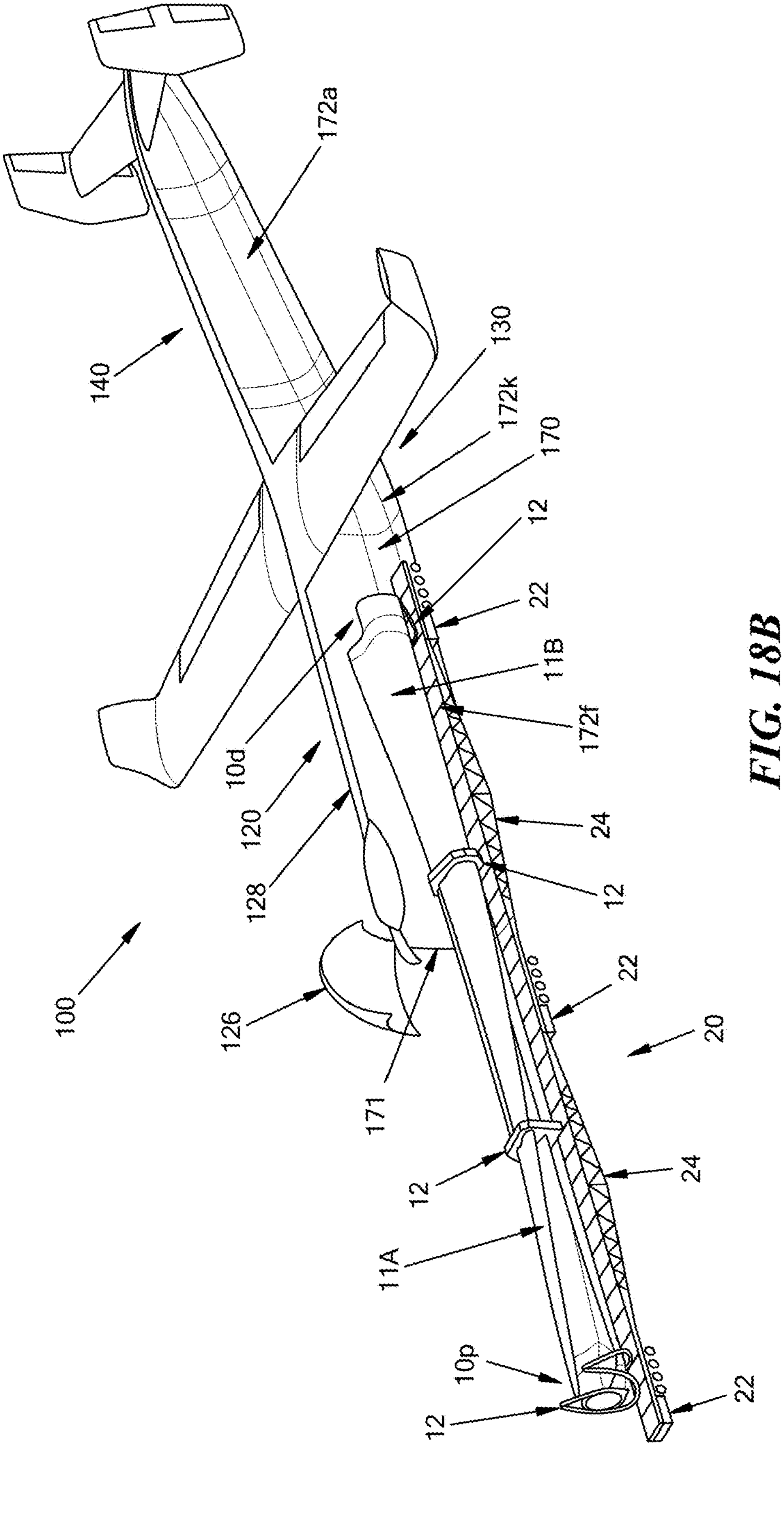
FIG. 18B is an isometric, partial cross-sectional view of the aircraft, payload transportation system, and payload of FIG. 18A with the payload transportation system and payload partially loaded into a forward portion of the interior cargo bay.

As shown in FIG. 18B, they payload transportation system 20, and thus the payload 10 secured thereto, can be driven into the interior cargo bay 170, for instance by driving up the cantilevered tongue 160, which can be placed in a ramp position that contacts the ground. Alternatively, a ramp (not illustrated) can be provided to allow the vehicle to be driven onto the tongue 160 and/or into the cargo bay 170 within the fixed portion 128 of the forward end 120 of the cargo aircraft 100 more generally. As shown, a distal end **10*d* of the payload 10 can be advanced into the cargo bay 170 along the forward end 172*f* of the floor, while a proximal end 10*p* remains outside of the aircraft 100**.

Figure 18C:
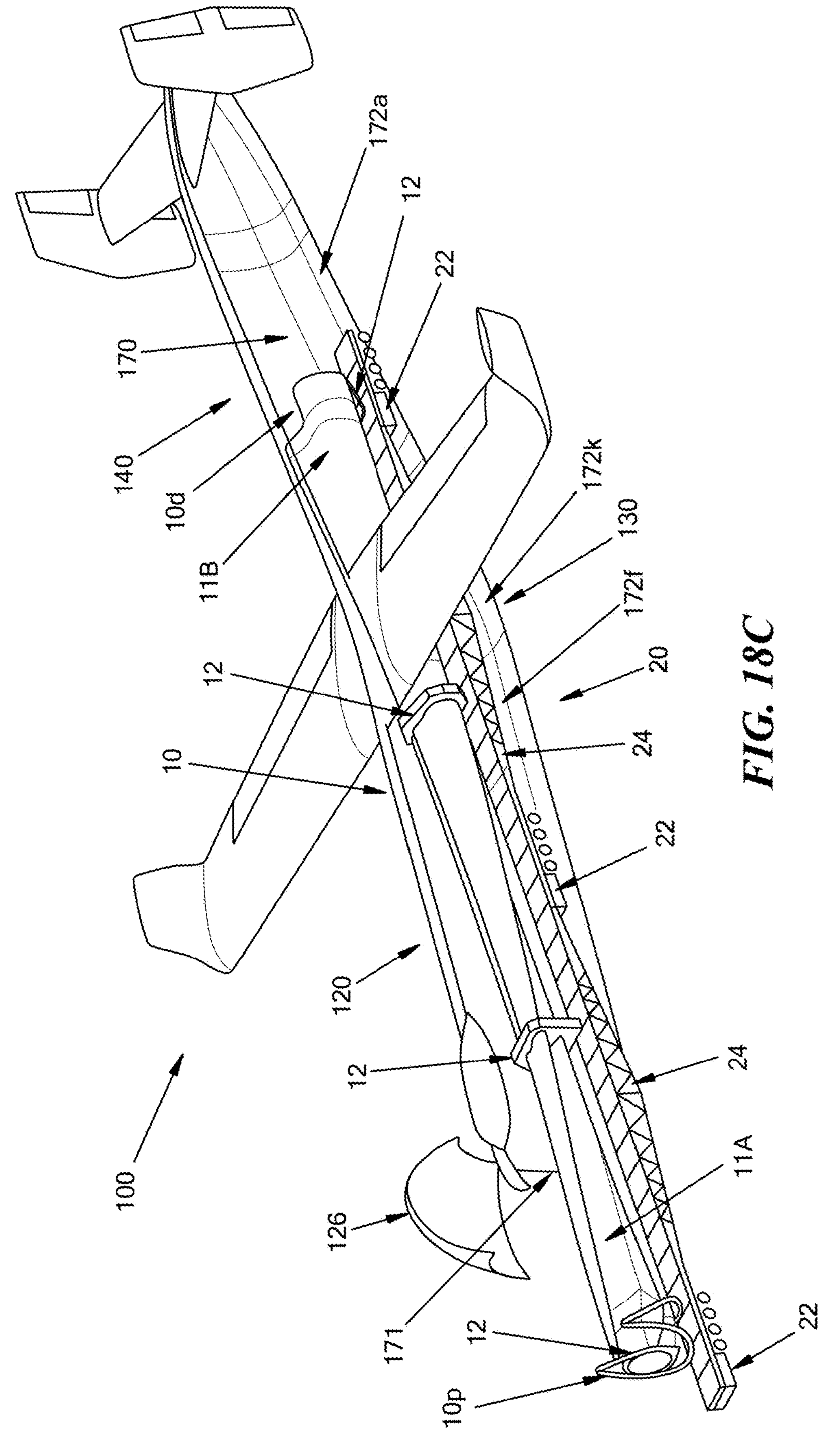
FIG. 18C is an isometric, partial cross-sectional view of the aircraft, payload transportation system, and payload of FIG. 18B with the payload transportation system and payload partially loaded into an aft portion of the interior cargo bay.

Further advancement of the payload transportation system 20, and thus the payload 10 secured thereto, is shown in FIG. 18C. The distal end **10*d* of the payload 10 has not be moved by the payload transportation system through the kinked portion 172*k* of the floor and onto the aft end 172*a* of the floor. The proximal end 10*p* of the payload 10 remains outside of the aircraft 100. As the payload transportation system 20 is moved in a manner that causes some portion of the payload 10 being transported to become angled at all, such as driving up the cantilevered tongue 160 or ramp and/or moving across the kinked portion 172*k* and aft end 172*a* of the floor, actuators (e.g., actuators 116A, 722A, 822A) associated with each of the transporters 22 and/or the payload-receiving fixtures 12 can be operated to adjust a position of the payload with respect to the system 20, or components thereof (e.g., the transporters 22, the trusses 22, and/or the payload-receiving fixtures 12 associated therewith). As described above, such movements can occur actively or passively, and can occur while the system 20 is moving and/or while it is stationary. For example, operating the actuators during movement of the system 20 can allow for desired movement of the payload as a portion of it becomes angled during the loading process. Likewise, operating the actuators while the system 20** is stationary can be helpful in positioning the payload at a desired location, for example, when it is time to secure a location of the same in the cargo bay for long distance transport.

Figure 18D:
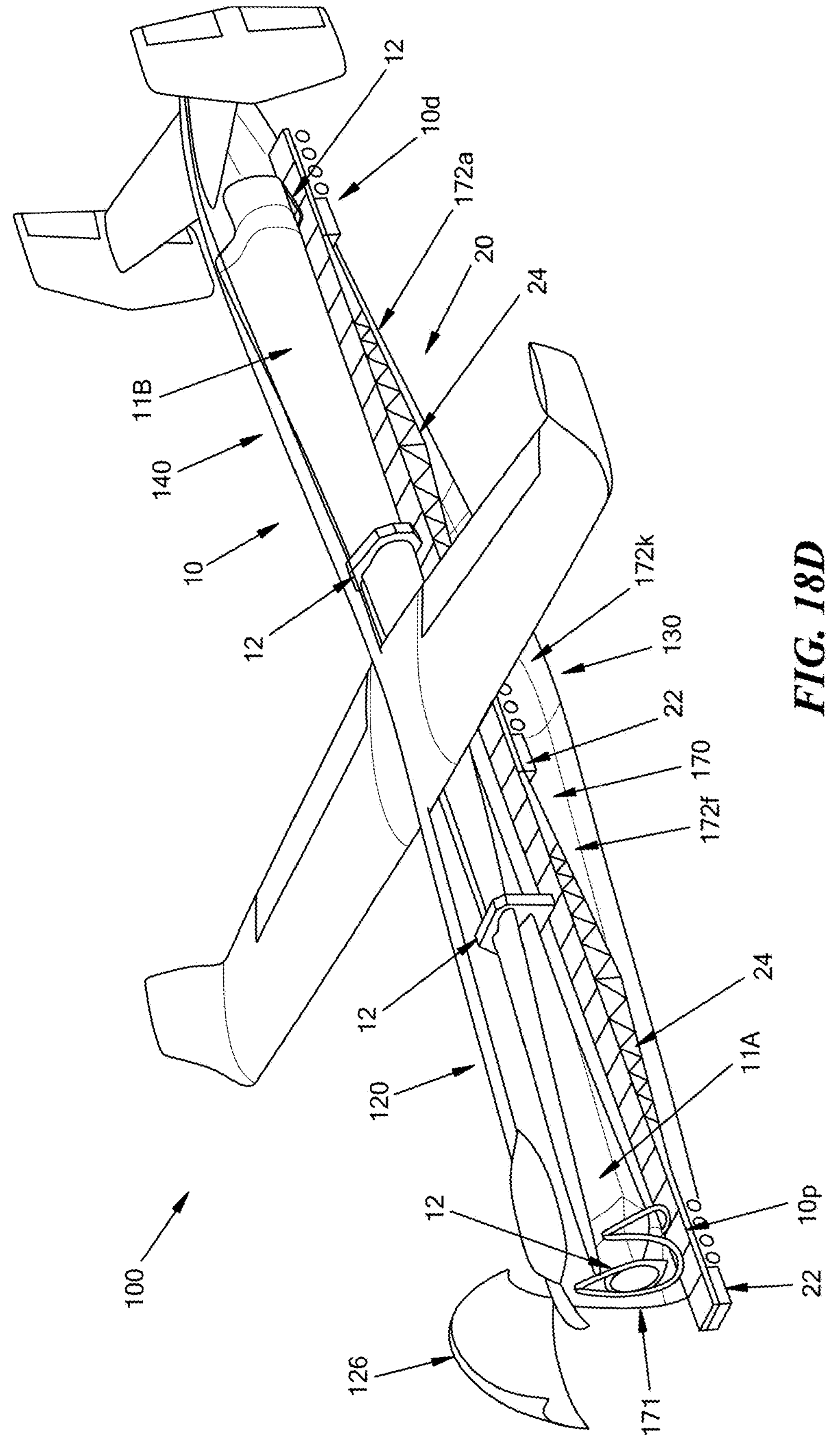
FIG. 18D is an isometric, partial cross-sectional view of the aircraft, payload transportation system, and payload of FIG. 18C further loaded into the interior cargo bay.

FIG. 18D illustrates the payload transportation system 20 being fully disposed in the aircraft 10. The proximal-most transporter 22, the one closest to the nose cone 126, can be supported by the cantilevered tongue 160, for example. As shown, the distal end **10*d* of the payload 10 is disposed in the aft end 140, with two payload-receiving fixtures 12 also disposed there, while the proximal end 10*p* of the payload 10 is disposed in the forward end 120, with two payload-receiving fixtures also disposed there. One transporter 22 each of the system 20 is disposed in the aft end 140, the kinked portion 130, and the forward end 120. A person skilled in the art, in view of the present disclosure, will understand this loaded configuration is one of many possible configurations which can depend, at least in part, on the size of the system 20, the system of the payload 10, the size of the cargo bay 170**, and other related factors.

Once the payload transportation system 20 is in the aircraft 10, the payload 10 can be secured in a variety of manners. In some instances, the system 20 is flight-ready, and thus the payload 10 can be secured by securing the system 20 with respect to the aircraft 100 using techniques provided for herein or otherwise known to those skilled in the art. For further protection of the payload 10, the payload 10 can also be secured in conjunction with securing the system 20. Alternatively, the payload 10 can be moved from the payload transportation system 20 and into a desired location within the cargo bay 170. This can be done in a variety of manners, some of which are described herein or are derivable from the present disclosures.

By way of some non-limiting examples, the payload 10 can be offloaded from the system 20 and onto a rail, with the payload-receiving fixtures 12 being adapted to engage the rail. Alternatively, the payload 10 can be rolled from the system 20 onto a flat cargo deck, or lifted off vertically by an overhead crane integrated into the large cargo aircraft. Additionally, or alternatively, various securing mechanisms (e.g., bolts, ropes, chains, pulleys, winches, etc.) can be used to hold the cargo in place, such as before and/or while the system 20 exits the aircraft 100. Further securing may occur after the system 20 has been removed from the aircraft 100. For example, an overhead crane can lift the payload 10 clear of the system 20, then lower the payload 10 into a position where it may be fully secured to the aircraft for flight. Alternatively, the securing means can be of the nature that they fully secure the payload 10 prior to moving the system 20 out of the aircraft. The contact points of the payload 10 with respect to the floor 172 (illustrated by the forward end 172*f*, the kinked portion 172*k*, and the aft end 172*a* of the floor 172) of the cargo bay will depend, at least in part on the configuration and number of transporters and support spans used, the size and shape of each of the payload and related packaging, the size and shape of the cargo bay, the configuration number of payload-receiving fixture used (particularly in instances in which the payload is offloaded from the payload transportation system), and other factors. In the illustrated embodiment, the contact points with the floor 172 are at each of the transporters 22, and possibly at the points of one or both of the trusses 24 that is closest to the floor. In other embodiments, there may be fewer or more contact points.

Figure 18E:
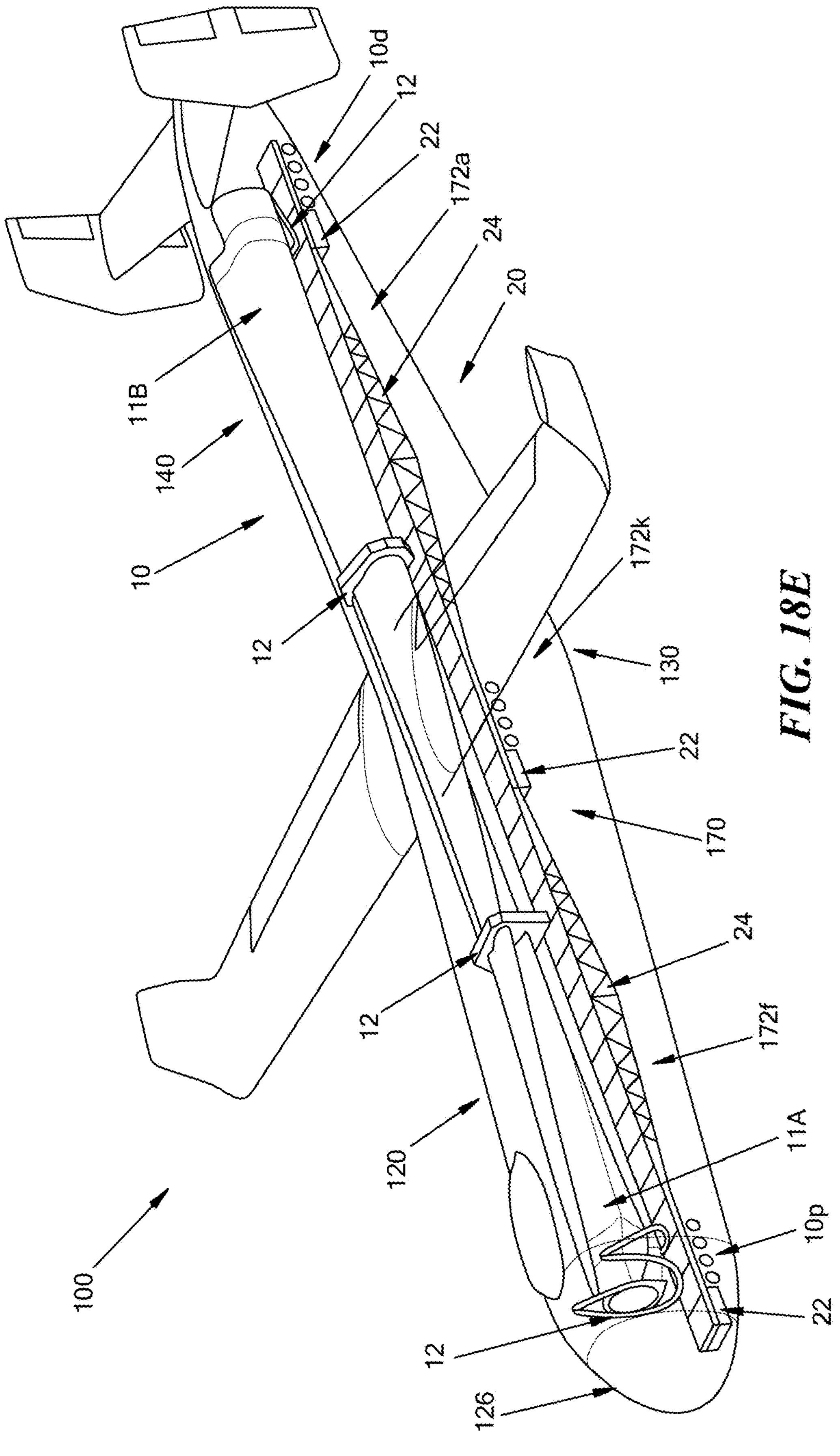
FIG. 18E is an isometric, transparent view of the aircraft of FIG. 18D having the payload transportation system and payload fully loaded therein.

FIG. 18E illustrates the payload transportation system 20 and the payload 10 fully disposed in the cargo aircraft 100 with the nose cone 126 moved back to its closed position. As shown, the aircraft 100 is ready to fly the payload 10 a long distance. In the alternative embodiments in which the payload transportation system 20 is not flown, this can be, for example, because it is to heavy for flight. Even in such instances, the use of the system being able to enter the cargo bay provides efficiency and ease benefits.

Once the payload 10 has been transported to its desired destination, it can be unloaded. Unloading can be similar in many respects to loading, and thus all of the details, and an illustrated step-through of the same, is unnecessary. Upon arrival, the payload 10 can be released from the secure attachment for subsequent transportation. Transportation can be done by the payload transportation system 20 in instances in which the system 20 flies with the payload. In such instances, releasing the payload 10 can include releasing the system 20 from its secure flight position. In instances where the payload transportation system 20 that loaded the aircraft 100 does not fly with the payload 10, an equivalent payload transportation system 10 can be used to unload the payload 10 from the aircraft. For example, the equivalent payload transportation system 20 can be driven onto the aircraft 10 to receive the payload 10. The system 20 can fully enter the interior cargo bay 170, or alternatively, partially enter the bay 70. A person skilled in the art will recognize ways by which the payload can be moved from its stowed position in the interior cargo bay and onto the payload transportation system, including but not limited to using winches, chains, ropes, and pulleys.

Once the payload 10 is secured to the payload transportation system 20, which can be done using various techniques provided for herein or otherwise known by those skilled in the art, in view of the present disclosures, the system 20 can be driven off the aircraft, reversing the progression illustrated with respect to FIGS. 18D to 18A. Again, active or passive use of actuators can be employed during the process, such as when first positioning the payload 10 prior to moving it out of the aircraft and/or during movement down sloped surface, such as the aft end 172*f* of the floor and the cantilevered tongue 160 when it serves as a ramp (or a ramp in lieu of the same).

After the payload transportation system 20 is removed from the aircraft 100, it can be used to help deliver the payload 10 to an eventual delivery site where it is to be used. The site can be, for example, an installation site where installation of at least some portion of the payload 10 will be performed, such as a wind farm when the payload includes wind turbine blades and/or other related components. This can be done, or example, by operating the system 20 itself to drive to the site, as the system can be robust enough for travel of this nature, such as travel within about one mile to about fifty (50) miles of where the aircraft lands, or more particularly within about one mile to about thirty (30) miles of where the aircraft lands, or more particularly within about one mile to about ten (10) miles of where the aircraft lands, or more particularly within about one mile to about three miles of where the aircraft lands. Alternatively, the system 20 can be driven onto a terrestrial (or water if appropriate) vehicle for eventual transport to the final site. Still further alternatively, the payload 10 can be offloaded from the system 20 and onto another vehicle for eventual transport to the final site. As discussed at the outset, by limiting the number of payload transfers, the payload transportation system 20 provides benefits not previously realized when transporting large cargo, particularly when transporting it by air. Accordingly, driving the system 20 to the site would be most efficient, but even driving it onto a large truck or ferry would be an upgrade over current delivery methods, as would driving the system 20 onto a transport vehicle (e.g., the aircraft 100 and then subsequent truck or ferry) to allow for quicker and faster exchanges of the payload between vehicles, minimizing tooling and time required to do the same.

Figure 19B:
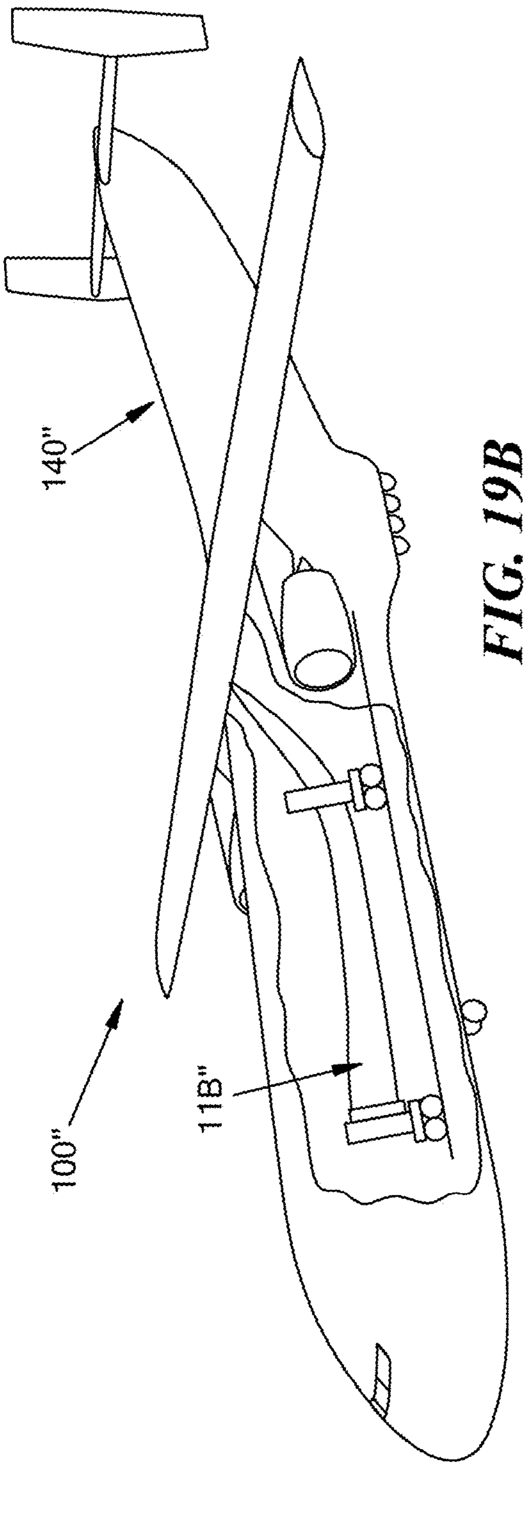
FIG. 19B is a schematic illustration of the payload transportation system and payload of FIG. 19A loaded onto the aircraft.

FIGS. 19A and 19B schematically illustrate a crude embodiment of transporters 222 for use in loading or unloading wind turbine blades 11A", 11B" onto a cargo aircraft 100". FIG. 19A illustrates that actuators 222A can be operated to move the blades 11A", 11B" up (blade 11B") and down (blade 11A"). The actuators 222A can be hydraulic pistons or other types of actuators provided for herein or otherwise known to those skilled in the art. For example, in some embodiments, telescopic legs can be used that may not be strong enough to withstand terrestrial transportation once unloaded from an aircraft. In such embodiments, the telescopic legs can be used (potentially with additional ground support equipment) to extend only for the loading and unloading portion of the cargo from the aircraft 100". The actuators 222A can be controlled individually, thus allowing more precise movement, or together, providing easier control. Like the other embodiments, actuation can be passive or active. FIG. 19B illustrates that once loaded, the actuators 222A can be moved into the down position to help minimize space. Obviously this is a crude rendering in view of the present disclosures, as the illustrated wind turbine blade 11B" is not disposed in an aft end 140" of the aircraft 100". While storage does not have to be in the aft end 140", there are benefits as provided above when trying to transport large cargo. Of course, in some embodiments, the present disclosure can be applied to smaller cargo, so FIG. 19B is a possible configuration for transport, but just not as likely in view of the overall present disclosure.

One skilled in the art will appreciate further features and advantages of the disclosures based on the provided for descriptions and embodiments. Accordingly, the inventions are not to be limited by what has been particularly shown and described. For example, while the present disclosure describes the use of the vehicles in conjunction with loading an aircraft, the vehicles can also be used in conjunction with loading other large transport vehicles for long distance travel, such as ships, trains, or large trucks. All publications and references cited herein are expressly incorporated herein by reference in their entirety.

Examples of the above-described embodiments can include the following:

1. A method of delivering a payload to an installation site, comprising:
   operating a plurality of vehicles to which a payload is removably coupled to transport the payload from a cargo bay of an aircraft to at least one of a ground surface outside of the aircraft or a payload transport vehicle configured to transport the payload to an installation site; and
   transporting the payload to an installation site where at least some portion of the payload is configured to be installed.
2. The method of example 1,
   wherein the plurality of vehicles are operated to transport the payload to the ground surface, and
   wherein transporting the payload to an installation site further comprises operating the plurality of vehicles to deliver the payload to the installation site.
3. The method of example 1,
   wherein the plurality of vehicles are operated to transport the payload to the payload transport vehicle, and
   wherein transporting the payload to an installation site further comprises operating the payload transport vehicle to deliver the payload to the installation site.
4. The method of any of examples 1 to 3, further comprising:
   coupling the plurality of vehicles with the payload coupled thereto to one or more fixtures of the cargo bay of the aircraft prior to operating the aircraft to fly the payload to at least one of a location proximate to the installation site or to an aircraft landing area within the installation site.
5. The method of example 4, further comprising:
   decoupling the plurality of vehicles with the payload coupled thereto from the one or more fixtures of the cargo bay of the aircraft prior to operating the plurality of vehicles to transport the payload from the cargo bay to at least one of the ground surface outside of the aircraft or the payload transport vehicle configured to transport the payload to the installation site.
6. The method of any of examples 1 to 3, wherein the plurality of vehicles comprise a plurality of unloading vehicles, the method further comprising:
   operating a plurality of loading vehicles to which the payload is removably coupled to transport the payload to the cargo bay of the aircraft;
   decoupling the payload from the plurality of loading vehicles;
   securing the payload within the cargo bay prior to operating the aircraft to fly the payload to at least one of a location proximate to the installation site or to an aircraft landing area within the installation site; and
   coupling the payload to the plurality of unloading vehicles after the aircraft lands at one of the location proximate to the installation site or the aircraft landing area within the installation site.
7. The method of any of examples 1 to 6, further comprising:
   decoupling the payload from the plurality of vehicles; and
   installing at least some portion of the payload at the installation site.
8. The method of any of examples 1 to 7, wherein operating the plurality of vehicles to which the payload is removably coupled to transport the payload from the cargo bay of the aircraft to at least one of the ground surface outside of the aircraft or the payload transport vehicle configured to transport the payload to the installation site further comprises:
   operating one or more actuators on at least one vehicle of the plurality of vehicles to adjust a position of the payload relative to the respective vehicle.
9. The method of example 8, further comprising:
   operating the one or more actuators to adjust the position of the payload relative to the respective vehicle in conjunction with setting a position of the payload within the cargo bay for flight.
10. The method of example 8 or 9, further comprising:
    operating the one or more actuators to adjust the position of the payload relative to the respective vehicle occurs while moving the respective vehicle through a portion of a longitudinal length of the cargo bay to unload the payload from the aircraft.
11. The method of any of examples 1 to 10, wherein the plurality of vehicles have a support span disposed between at least two vehicles thereof to support the payload.
12. The method of any of examples 1 to 11, wherein the payload has a length of at least about 57 meters.
13. The method of example 12, wherein the length of the payload is at least about 65 meters.
14. The method of example 13, wherein the length of the payload is at least about 75 meters.
15. The method of example 14, wherein the length of the payload is at least about 85 meters.
16. The method of example 15, wherein the length of the payload is at least about 100 meters.
17. The method of example 16, wherein the length of the payload is at least about 120 meters.
18. The method of any of examples 1 to 17, wherein the payload comprises one or more components of a wind turbine.
19. A method of loading a payload onto a cargo aircraft, comprising:
    operating a plurality of vehicles to which a payload is removably coupled to transport the payload from a ground surface into a cargo bay of a cargo aircraft; and
    securing the payload in the cargo bay.
20. The method of example 19, wherein securing the payload in the cargo bay further comprises:
    coupling the plurality of vehicles with the payload coupled thereto to one or more fixtures of the cargo bay of the aircraft to secure the payload in the cargo bay prior to flying the aircraft.
21. The method of example 20, further comprising:
    decoupling the plurality of vehicles with the payload coupled thereto from the one or more fixtures of the cargo bay of the aircraft after flying the aircraft and prior to unloading the plurality of vehicles, and the payload coupled thereto, from the aircraft.

22. The method of example 19, wherein securing the payload in the cargo bay further comprises:
   decoupling the payload from the plurality of vehicles; and
   coupling the payload to one or more fixtures of the cargo bay of the aircraft to secure the payload in the cargo bay prior to flying the aircraft.
23. The method of any of examples 19 to 22, wherein operating the plurality of vehicles to which the payload is removably coupled to transport the payload from the ground surface into the cargo bay of the cargo aircraft further comprises:
   operating one or more actuators on at least one vehicle of the plurality of vehicles to adjust a position of the payload relative to the respective vehicle.
24. The method of example 23, further comprising:
   operating the one or more actuators to adjust the position of the payload relative to the respective vehicle in conjunction with setting a position of the payload within the cargo bay for flight.
25. The method of examples 23 or 24, further comprising:
   operating the one or more actuators to adjust the position of the payload relative to the respective vehicle occurs while moving the respective vehicle through a portion of a longitudinal length of the cargo bay to load the payload onto the aircraft.
26. The method of any of examples 19 to 25, wherein the plurality of vehicles have a support span disposed between at least two vehicles thereof to support the payload.
27. The method of any of examples 19 to 26, wherein the payload has a length of at least about 57 meters.
28. The method of example 27, wherein the length of the payload is at least about 65 meters.
29. The method of example 28, wherein the length of the payload is at least about 75 meters.
30. The method of example 29, wherein the length of the payload is at least about 85 meters.
31. The method of example 30, wherein the length of the payload is at least about 100 meters.
32. The method of example 31, wherein the length of the payload is at least about 120 meters.
33. The method of any of examples 19 to 32, wherein the payload comprises one or more components of a wind turbine.
34. A system for at least one of loading a payload onto a cargo aircraft or unloading a payload from a cargo aircraft, comprising:
   a plurality of vehicles configured to move along a ground surface;
   one or more support spans extending between at least two vehicles of the plurality of vehicles; and
   a plurality of payload-receiving fixtures coupled to at least one of: (a) a vehicle of the plurality of vehicles; or (b) a support span of the one or more support spans, the plurality of payload-receiving fixtures being configured to secure a location of a payload with respect to the one or more support spans while the plurality of vehicles are moved along a ground surface.
35. The system of example 34, wherein at least one of: (a) the plurality of vehicles; (b) the one or more support spans; or (c) the plurality of payload-receiving fixtures are further configured to couple to one or more fixtures in a cargo bay of a cargo aircraft.
36. The system of examples 34 or 35, wherein the one or more support spans comprise one or more trusses.
37. The system of any of examples 34 to 36,
   wherein the one or more support spans comprise a first rail opposed to a second rail, the first and second rails being disposed on opposite sides of a vehicle of the plurality of vehicles, and
   wherein the plurality of payload-receiving fixtures are coupled to each of the first and second rails.
38. The system of any of examples 34 to 37, wherein at least one vehicle of the plurality of vehicles comprises one or more actuators coupled to a frame of the vehicle, the one or more actuators being configured to receive a payload-receiving fixture of the plurality of payload-receiving fixtures and adjust a position of the payload-receiving fixture relative to the frame.
39. The system of example 38, wherein the one or more actuators are configured to adjust a height of the payload-receiving fixture relative to the frame.
40. The system of example 38 or 39, wherein the one or more actuators are configured to rotate the payload-receiving fixture about a rotation axis extending substantially perpendicular to a longitudinal axis of the payload received by the payload-receiving fixture.
41. The system of any of examples 38 to 40, wherein the one or more actuators further comprise:
   one or more hydraulic pistons configured to operate to adjust the position of the payload-receiving fixture relative to the frame.
42. The system of any of examples 38 to 40, wherein the one or more actuators further comprise:
   a plurality of pulleys; and
   one or more cables disposed between the pulleys and configured to move with respect to the plurality of pulleys to adjust the position of the payload-receiving fixture relative to the frame.
43. The system of any of examples 38 to 40, wherein the one or more actuators further comprise:
   one or more air chambers coupled to the frame and configured to at least one of inflate or deflate to adjust the position of the payload-receiving fixture relative to the frame.
44. The system of any of examples 34 to 43, wherein the plurality of vehicles are controlled by one or more controllers in communication with a power system disposed on one or more vehicles of the plurality of vehicles.
45. The system of any of examples 34 to 44, wherein at least one vehicle of the plurality of vehicles are self-propelled.
46. The system of any of examples 34 to 45, further comprising:
   one or more fixtures disposed in a cargo bay of the aircraft, at least one fixture of the one or more fixtures being configured to couple to a transportation means of at least one vehicle of the plurality of vehicles such that the transportation means moves along the one or more fixtures disposed in the cargo bay of the aircraft to move the payload through a portion of a longitudinal length of the cargo bay.
47. The system of example 46, wherein the one or more fixtures comprise one or more longitudinal rails extending longitudinally through the cargo bay of the aircraft.
48. The system of example 46 or 47, wherein the one or more fixtures comprise one or more mating features configured to complimentarily mate with one or more mating features of a vehicle of the plurality of vehicles to secure the payload in the cargo bay.

49. The system of any of examples 46 to 48, wherein the transportation means of the at least one vehicle further comprises at least one of wheels, skis, skids, linked tracks, articulated legs, or air cushions.
50. The system of any of examples 34 to 49, wherein the payload has a length of at least about 57 meters.
51. The system of example 50, wherein the length of the payload is at least about 65 meters.
52. The system of example 51, wherein the length of the payload is at least about 75 meters.
53. The system of example 52, wherein the length of the payload is at least about 85 meters.
54. The method of example 53, wherein the length of the payload is at least about 100 meters.
55. The method of example 54, wherein the length of the payload is at least about 120 meters.
56. The system of any of examples 34 to 55, wherein the payload comprises one or more components of a wind turbine such that the plurality of payload-receiving fixtures are configured to receive the one or more components of the wind turbine.
57. A vehicle for at least one of loading a payload onto a cargo aircraft or unloading a payload from a cargo aircraft, comprising:
    a frame;
    a plurality of wheels coupled to the frame and configured to contact and roll along a ground surface; and
    one or more actuators coupled to the frame, the one or more actuators being configured to receive a payload-receiving fixture or the one or more actuators having the payload-receiving fixture coupled thereto,
    wherein the one or more actuators are configured to adjust a position of the payload-receiving fixture, and thus a payload received by the payload-receiving fixture, relative to the frame.
58. The vehicle of example 57, wherein the one or more actuators are configured to adjust a height of the payload-receiving fixture, and thus the payload received by the payload-receiving fixture, relative to the frame.
59. The vehicle of example 57 or 58, wherein the one or more actuators are configured to rotate the payload-receiving fixture, and thus the payload received by the payload-receiving fixture, about a rotation axis extending substantially perpendicular to a longitudinal axis of the payload received by the payload-receiving fixture.
60. The vehicle of any of examples 57 to 59, wherein the one or more actuators further comprise:
    one or more hydraulic pistons configured to operate to adjust the position of the payload-receiving fixture, and thus the payload received by the payload-receiving fixture, relative to the frame.
61. The vehicle of any of examples 57 to 59, wherein the one or more actuators further comprise:
    a plurality of pulleys; and
    one or more cables disposed between the pulleys and configured to move with respect to the plurality of pulleys to adjust the position of the payload-receiving fixture, and thus the payload received by the payload-receiving fixture, relative to the frame.
62. The vehicle of any of examples 57 to 59, wherein the one or more actuators further comprise:
    one or more air chambers coupled to the frame and configured to at least one of inflate or deflate to adjust the position of the payload-receiving fixture, and thus the payload received by the payload-receiving fixture, relative to the frame.
63. The vehicle of any of examples 57 to 62, further comprising:
    the payload-receiving fixture, the payload-receiving fixture being coupled to the one or more actuators.
64. The vehicle of any of examples 57 to 63, wherein the vehicle comprises one or more mating features configured to allow the vehicle to be mated to a fixture in a cargo bay of an aircraft for secure transport during flight.
65. The vehicle of any of examples 57 to 64, wherein the vehicle is configured to be controlled by one or more controllers in communication with a power system disposed on the vehicle.
66. The vehicle of any of examples 57 to 65, wherein the vehicle is self-propelled.
67. The vehicle of any of examples 57 to 66, wherein the payload comprises one or more components of a wind turbine such that the payload-receiving fixture is configured to receive the one or more components of the wind turbine.

What is claimed is:

1. A system for at least one of loading a payload onto a cargo aircraft or unloading a payload from a cargo aircraft, comprising:

a plurality of vehicles configured to move along a ground surface;

one or more support spans extending between at least two vehicles of the plurality of vehicles; and a plurality of payload-receiving fixtures coupled to at least one of: (a) a vehicle of the plurality of vehicles; or (b) a support span of the one or more support spans, the plurality of payload-receiving fixtures being configured to secure a location of a payload with respect to the one or more support spans while the plurality of vehicles are moved along a ground surface, wherein at least one vehicle of the plurality of vehicles comprises one or more actuators coupled to a frame of the vehicle, the one or more actuators being configured to receive a payload-receiving fixture of the plurality of payload-receiving fixtures and adjust a position of the payload-receiving fixture relative to the frame, and wherein the one or more actuators are configured to rotate the payload-receiving fixture about a rotation axis extending substantially perpendicular to a longitudinal axis of the payload received by the payload-receiving fixture.

2. The system of claim 1, wherein at least one of: (a) the plurality of vehicles; (b) the one or more support spans; or (c) the plurality of payload-receiving fixtures are further configured to couple to one or more fixtures in a cargo bay of a cargo aircraft.

3. The system of claim 1, wherein the one or more support spans comprise one or more trusses.

4. The system of claim 1, wherein the one or more support spans comprise a first rail opposed to a second rail, the first and second rails being disposed on opposite sides of a vehicle of the plurality of vehicles, and wherein the plurality of payload-receiving fixtures are coupled to each of the first and second rails.

5. The system of claim 1, wherein the one or more actuators are configured to adjust a height of the payload-receiving fixture relative to the frame.

6. The system of claim 1, wherein the one or more actuators further comprise:

one or more hydraulic pistons configured to operate to adjust the position of the payload-receiving fixture relative to the frame.

7. The system of claim 1, wherein the one or more actuators further comprise:

a plurality of pulleys; and one or more cables disposed between the pulleys and configured to move with respect to the plurality of pulleys to adjust the position of the payload-receiving fixture relative to the frame.

8. The system of claim 1, wherein the plurality of vehicles are controlled by one or more controllers in communication with a power system disposed on one or more vehicles of the plurality of vehicles.

9. The system of claim 1, wherein at least one vehicle of the plurality of vehicles are self-propelled.

10. The system of claim 1, wherein the payload comprises one or more components of a wind turbine such that the plurality of payload-receiving fixtures are configured to receive the one or more components of the wind turbine.

11. The system of claim 1, further comprising:

one or more fixtures disposed in a cargo bay of the aircraft, at least one fixture of the one or more fixtures being configured to couple to a transportation means of at least one vehicle of the plurality of vehicles such that the transportation means moves along the one or more fixtures disposed in the cargo bay of the aircraft to move the payload through a portion of a longitudinal length of the cargo bay.

12. The system of claim 11, wherein the one or more fixtures comprise one or more longitudinal rails extending longitudinally through the cargo bay of the aircraft.

13. The system of claim 11, wherein the one or more fixtures comprise one or more mating features configured to complimentarily mate with one or more mating features of a vehicle of the plurality of vehicles to secure the payload in the cargo bay.

14. The system of claim 11, wherein the transportation means of the at least one vehicle further comprises at least one of wheels, skis, skids, linked tracks, articulated legs, or air cushions.

15. A system for at least one of loading a payload onto a cargo aircraft or unloading a payload from a cargo aircraft, comprising:

a plurality of vehicles configured to move along a ground surface;

one or more support spans extending between at least two vehicles of the plurality of vehicles; and a plurality of payload-receiving fixtures coupled to at least one of: (a) a vehicle of the plurality of vehicles; or (b) a support span of the one or more support spans, the plurality of payload-receiving fixtures being configured to secure a location of a payload with respect to the one or more support spans while the plurality of vehicles are moved along a ground surface, wherein at least one vehicle of the plurality of vehicles comprises one or more air chambers coupled to a frame of the vehicle, the one or more air chambers being configured to receive a payload-receiving fixture of the plurality of payload-receiving fixtures and to at least one of inflate and deflate to adjust a position of the payload-receiving fixture relative to the frame.

16. The system of claim 15, wherein at least one of: (a) the plurality of vehicles; (b) the one or more support spans; or (c) the plurality of payload-receiving fixtures are further configured to couple to one or more fixtures in a cargo bay of a cargo aircraft.

17. The system of claim 15, further comprising:

one or more fixtures disposed in a cargo bay of the aircraft, at least one fixture of the one or more fixtures being configured to couple to a transportation means of at least one vehicle of the plurality of vehicles such that the transportation means moves along the one or more fixtures disposed in the cargo bay of the aircraft to move the payload through a portion of a longitudinal length of the cargo bay.

18. A system for at least one of loading a payload onto a cargo aircraft or unloading a payload from a cargo aircraft, comprising:

a plurality of vehicles configured to move along a ground surface;

one or more support spans extending between at least two vehicles of the plurality of vehicles;

a plurality of payload-receiving fixtures coupled to at least one of: (a) a vehicle of the plurality of vehicles; or (b) a support span of the one or more support spans, the plurality of payload-receiving fixtures being configured to secure a location of a payload with respect to the one or more support spans while the plurality of vehicles are moved along a ground surface; and one or more fixtures disposed in a cargo bay of the aircraft, at least one fixture of the one or more fixtures being configured to couple to a transportation means of at least one vehicle of the plurality of vehicles such that the transportation means moves along the one or more fixtures disposed in the cargo bay of the aircraft to move the payload through a portion of a longitudinal length of the cargo bay.

19. The system of claim 18, wherein the one or more fixtures comprise one or more longitudinal rails extending longitudinally through the cargo bay of the aircraft.

20. The system of claim 18, wherein at least one vehicle of the plurality of vehicles comprises one or more actuators coupled to a frame of the vehicle, the one or more actuators being configured to receive a payload-receiving fixture of the plurality of payload-receiving fixtures and adjust a position of the payload-receiving fixture relative to the frame.

* * * * *